United States Patent
Hirano et al.

(10) Patent No.: US 6,569,051 B2
(45) Date of Patent: May 27, 2003

(54) INFINITE SPEED RATIO CONTINUOUSLY VARIABLE TRANSMISSION

(75) Inventors: Hiroyuki Hirano, Kanagawa (JP); Kazuhiro Yamada, Miura (JP); Yasushi Narita, Yokohama (JP); Tatsuya Nagato, Yokosuka (JP); Hiromasa Sakai, Yokosuka (JP); Motoharu Nishio, Yokohama (JP); Hiroaki Kuramoto, Yokosuka (JP); Hirofumi Shimizu, Yokosuka (JP); Masaki Nakano, Yokohama (JP); Eio Sagara, Yokosuka (JP); Masayoshi Kimura, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 13 days.

(21) Appl. No.: 09/754,244

(22) Filed: Jan. 5, 2001

(65) Prior Publication Data

US 2002/0037786 A1 Mar. 28, 2002

(30) Foreign Application Priority Data

| Jan. 7, 2000 | (JP) | ........................................ | 2000-001510 |
| Mar. 31, 2000 | (JP) | ........................................ | 2000-096518 |
| Aug. 17, 2000 | (JP) | ........................................ | 2000-247397 |
| Aug. 18, 2000 | (JP) | ........................................ | 2000-248252 |
| Sep. 21, 2000 | (JP) | ........................................ | 2000-287111 |

(51) Int. Cl.⁷ .............................................. F16H 61/04
(52) U.S. Cl. ....................... 475/208; 475/216; 192/44; 477/37
(58) Field of Search ................................ 475/208, 211, 475/214, 215, 216; 192/35, 44; 477/37

(56) References Cited

U.S. PATENT DOCUMENTS

| 5,401,221 A | * | 3/1995 | Fellows et al. ............. 475/214 |
| 5,823,052 A | | 10/1998 | Nobumoto .................... 74/445 |
| 5,951,428 A | | 9/1999 | Itoh et al. .................... 475/204 |
| 6,045,477 A | * | 4/2000 | Schmidt ...................... 475/207 |
| 6,063,002 A | | 5/2000 | Nobumoto et al. ........... 477/41 |
| 6,123,183 A | | 9/2000 | Ito et al. ..................... 192/220 |
| 6,251,038 B1 | * | 6/2001 | Ishikawa et al. ............. 475/216 |

FOREIGN PATENT DOCUMENTS

| EP | 0 899 485 | 3/1999 |
| JP | 10-267117 | 10/1998 |
| JP | 11-159544 | 6/1999 |
| JP | 2000-234670 | 8/2000 |

* cited by examiner

*Primary Examiner*—Ankur Parekh
(74) *Attorney, Agent, or Firm*—Foley & Lardner

(57) ABSTRACT

An infinite Speed ratio continuously variable transmission comprises a power recirculation mode clutch (9) and direct mode clutch (10). At least one of the power recirculation mode clutch (9) and direct mode clutch (10) comprises an electromagnetic two-way clutch. The electromagnetic two-way clutch maintains the engaged state during excitation and can transmit drive force from both the drive side and non-drive side. On the other hand, when there is a change-over from the energized state to the non-energized state, a one-way clutch state is obtained wherein drive force is permitted only in the transmission direction of drive force in the instant of the change-over to non-excitation. When a drive force is input in the reverse direction to the drive force transmitted in the one-way clutch state, the one-way clutch state is disengaged, and the disengaged state of the clutch is maintained until subsequent re-excitation. Therefore, change-over of the clutch at the rotation synchronous point RSP where the power recirculation mode and direct mode are changed over, can be performed rapidly.

16 Claims, 50 Drawing Sheets

* ENERGIZATION ONLY FOR 100ms AFTER STARTING
  ENERGIZATION, ENGAGING AT APPROX. 50ms

US 6,569,051 B2

INFINITE SPEED RATIO CONTINUOUSLY VARIABLE TRANSMISSION

BACKGROUND OF THE INVENTION

Tokkai Hei 10-267117 published by the Japanese Patent Office on Mar. 24, 1997, discloses an infinite speed ratio continuously variable transmission (hereinafter referred to as IVT) which varies a speed ratio infinitely by combining a fixed speed ratio transmission and planetary gear mechanism with a continuously variable transmission.

SUMMARY OF THE INVENTION

The IVT is provided with two clutches, i.e. a power recirculation mode clutch and a direct mode clutch. The direct clutch is provided between the output shaft of the continuously variable transmission (hereinafter referred to as CVT) and a ring gear of the planetary gear mechanism. The ring gear is connected to an unit output shaft. The power recirculation mode clutch is provided between an output gear of the fixed speed ratio transmission and a carrier of the planetary gear mechanism.

The IVT is operated in a direct mode wherein the direct mode clutch is engaged and the power recirculation mode clutch is disengaged, or in a power recirculation mode wherein the direct mode clutch is disengaged and the power recirculation mode clutch is engaged. The change-over of the above two modes is performed at a rotation synchronous point (RSP) where the speed ratio of the CVT takes a specific value.

When the mode change-over is performed, in order to prevent a change-over shock due to engaging/disengaging of the clutches from occurring, engaging of a clutch is performed slowly via a half-engaged state. A considerable time period is therefore required from the start of the mode change-over until it is completed.

During the mode change-over, the speed ratio of the IVT (referred to hereafter as IVT ratio) must be fixed at the rotation synchronous point RSP, but due to the variations of the vehicle running state, the IVT ratio may deviate from the rotation synchronous point RSP and it also causes a shock in the course of the clutch engagement.

It is therefore an object of this invention to enable a rapid mode change-over of the IVT while preventing the change-over shock from occurring.

In order to the above object, this invention provides an infinite speed ratio continuously variable transmission, comprising: an unit input shaft; a continuously variable transmission which transmits a rotation of the unit input shaft to a first output shaft at an arbitrary speed ratio; a fixed speed ratio transmission which transmits the rotation of the unit input shaft to a second output shaft at a fixed speed ratio, a direct mode clutch; a power recirculation mode clutch, one of the direct clutch and the power recirculation mode clutch comprising an electromagnetic two-way clutch that, when energized, transmits a drive force in a first direction and in a second direction opposite to the first direction, and when changed from the energized state to the non-energized state, transmits the drive force only in the direction of a drive force transmission at the change-over to non-excitation, and when the direction of the drive force transmission changes to an opposite direction, disengages; and a planetary gear set comprising a first rotation element joined to the first output shaft via the direct mode clutch, a second rotation element joined to the second output shaft via the power recirculation mode clutch, and a third rotation element which varies a rotation direction and a rotation speed according to a difference between a rotation speed of the first rotation element and a rotation speed of the second rotation element.

BRIEF DESCRIPTION OF THE DRAWINGS

FIG. 5A is a sectional view through an arrow A in FIG. 3, and FIG. 5B is a sectional view through an arrow B in FIG. 3.

FIG. 6A is a sectional view through the arrow C in FIG. 3 during disengagement, and FIG. 6B is a sectional view through the arrow C in FIG. 3 during engagement.

FIG. 27A shows a power recirculation mode line L when the power recirculation mode clutch is completely engaged, and FIG. 27B shows a direct mode line H when the direct mode clutch is completely engaged.

FIG. 28A shows a running region A below the power recirculation mode line L, FIG. 28B shows a running region C between the power recirculation mode line L and direct mode line H, and FIG. 28C shows a running region B above the direct mode line H.

FIG. 29A shows the power recirculation mode line L when the power recirculation mode clutch is completely engaged, and FIG. 29B shows the direct mode line H when the direct mode clutch is completely engaged.

FIG. 30A shows the running region A below the power recirculation mode line L, FIG. 30B shows the running region C between the power recirculation mode line L and direct mode line H, and FIG. 30C shows the running region B above the direct mode line H.

FIG. 37A shows the power recirculation mode line L when the power recirculation mode clutch is completely engaged, and FIG. 37B shows the direct mode line H when the direct mode clutch is completely engaged.

FIG. 38A shows the running region A below the power recirculation mode line L, FIG. 38B shows the running region C between the power recirculation mode line L and direct mode line H, and FIG. 38C shows the running region B above the direct mode line H.

FIG. 45A shows the power recirculation mode line L when the power recirculation mode clutch is completely engaged.

FIG. 46A shows the running region A below the power recirculation mode line L, FIG. 46B shows the running region C between the power recirculation mode line L and direct mode line H, and FIG. 46C shows the running region B above the direct mode line H.

DESCRIPTION OF THE PREFERRED EMBODIMENTS

FIG. 1–FIG. 7 show an example of applying this invention when a speed ratio infinite continuously variable transmission comprises a toroidal continuously variable transmission.

Figure 1:
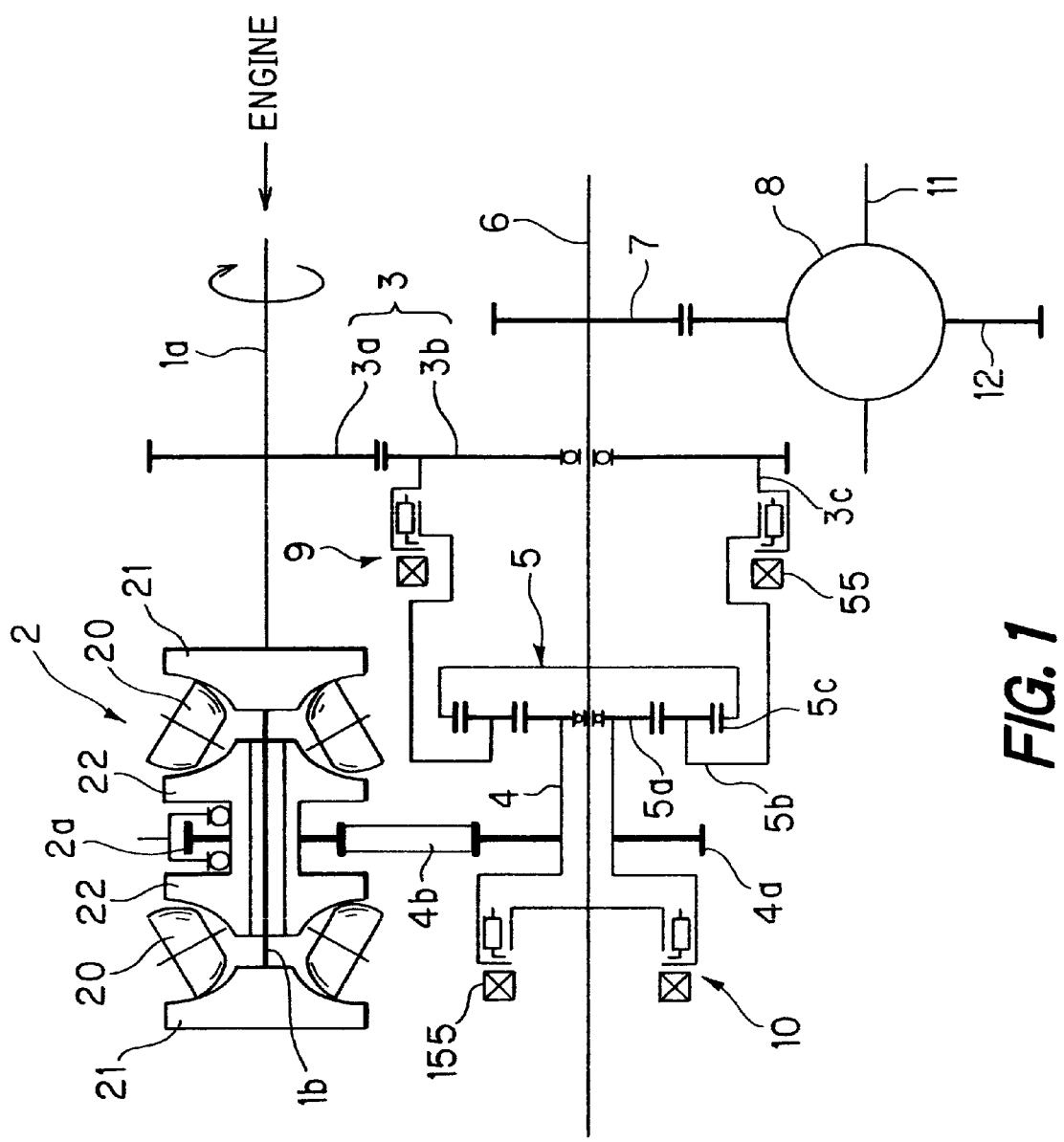
FIG. 1 is a schematic view of an infinite speed ratio continuously variable transmission showing one embodiment of this invention.
Figure 2:
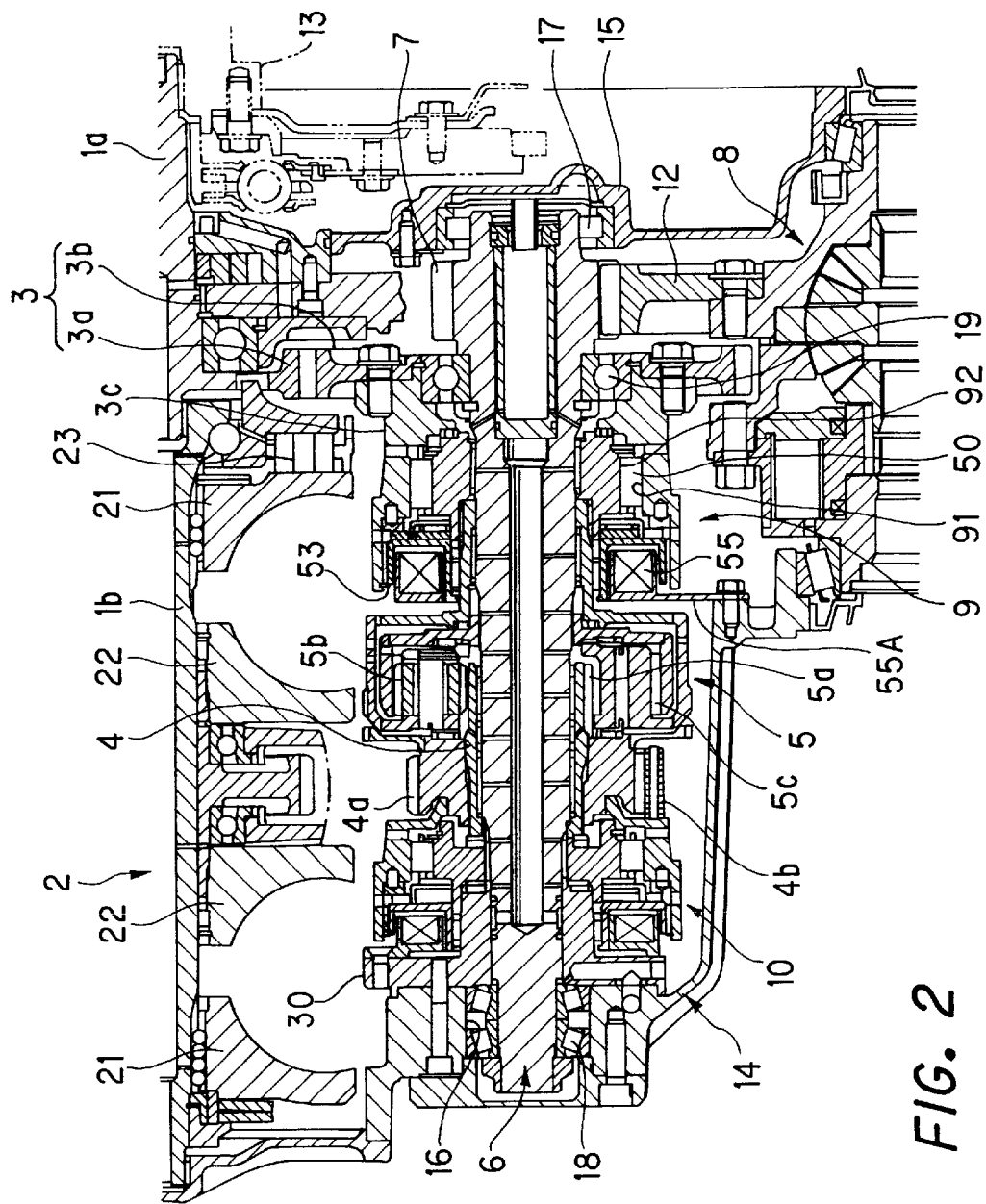
FIG. 2 is a section of the essential parts of the infinite speed ratio continuously variable transmission.

Referring to FIG. 1 and FIG. 2, a toroidal type continuously variable transmission 2 whereof the speed ratio can be varied continuously, and a fixed speed ratio transmission 3 (reducer) comprising a gear 3a and gear 3a, are connected in parallel with a unit input shaft 1a of the speed ratio infinite continuously variable transmission connected with a crankshaft 13 of an engine. Output shafts 4, 3c of these transmissions are disposed on a unit output shaft 6, and are connected by a planetary gear set 5. The output shaft 4 of the continuously variable transmission 2 is connected with a sun gear 5a of the planetary gear set 5, and the output shaft 3c of the fixed speed ratio transmission 3 is connected with a carrier 5b of the planetary gear set 5 via a power recirculation mode clutch 9.

A sun gear 5a is formed at one end of the continuously variable transmission output shaft 4. The continuously variable transmission output shaft 4 receives the drive force of the continuously variable transmission 2 via a sprocket 4a and chain 4a (continuously variable transmission output path), and is supported free to rotate relative to the unit output shaft 6. A direct mode clutch 10 comprising an electromagnetic bidirectional roller clutch is disposed at the other end of this continuously variable transmission output shaft 4. The continuously variable transmission output shaft 4 is selectively joined to the unit output shaft 6, which is the output shaft of the infinite speed ratio continuously variable transmission according to the engaging and disengaging of the direct mode clutch 10.

The gear 3b of the fixed speed ratio transmission 3 is joined to the fixed speed ratio transmission output shaft 3c supported coaxial with and free to rotate relative to the unit output shaft 6. The fixed speed ratio transmission output shaft 3c is selectively joined to the carrier 5b of the planetary gear set 5 via the power recirculation mode clutch 9 which comprises a bidirectional roller clutch.

A transmission output gear 7 is provided on the unit output shaft 6 on the right-hand side of the drawing. This transmission output gear 7 meshes with a final gear 12 of a differential gear 8, and a drive force is transmitted to a drive shaft 11 joined to the differential gear 8 at a predetermined overall gear ratio (unit speed ratio II).

In the continuously variable transmission 2, two pairs of input disks 21 and output disks 22 are of the double cavity, half toroidal type which respectively grip and press power rollers 20, 20. An output sprocket 2a interposed between the pair of output disks 22, 22 is connected with a sprocket 4a formed in the continuously variable transmission output shaft 4 of the unit output shaft 6 arranged in parallel to a unit input shaft. 1a and CVT shaft 1b via a chain 4b, as shown in FIG. 1.

The unit input shaft 1a and CVT shaft 1b are also disposed coaxially, and are joined in the rotation direction via a loading cam mechanism 23 of the continuously variable transmission 2 as shown in FIG. 2. The unit input shaft 1a is joined to a crankshaft 13 of an engine, and forms a gear 3a of the fixed speed ratio transmission 3. The CVT shaft 1b is connected with the two sets of input disks 21, 21, and a drive force is transmitted to the output sprocket 2a by the gripping and pressing of the power rollers 20, 20 shown in FIG. 1 due to a pressing force in the axial direction generated by the loading cam mechanism 23 according to the input torque from unit input shaft 1a.

Figure 9:
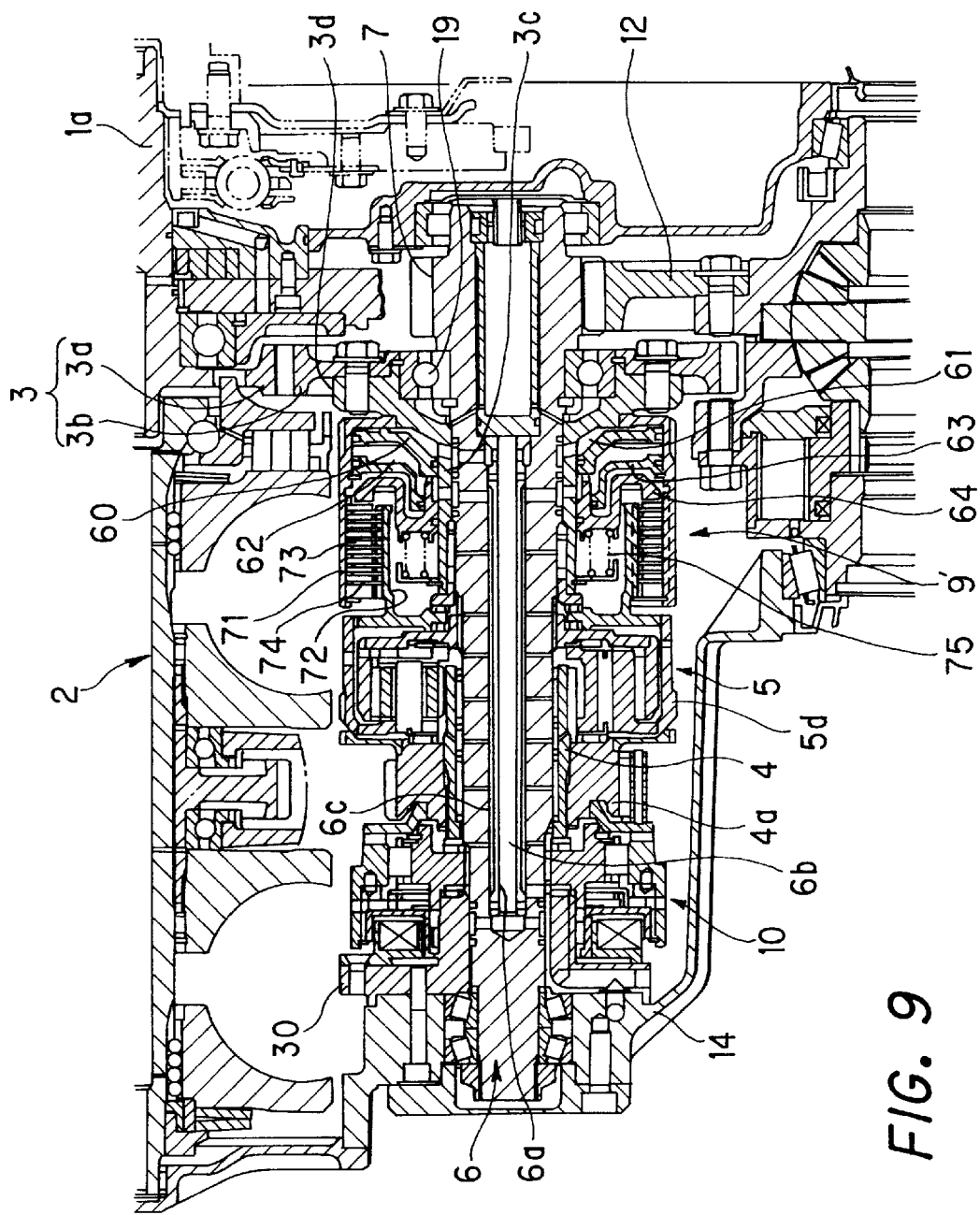
FIG. 9 is a section of essential parts of an infinite speed ratio continuously variable transmission showing a third embodiment.

In this infinite speed ratio continuously variable transmission, there are a direct mode and a power recirculation mode, and these can be used selectively. The direct mode disengages the power recirculation mode clutch 9, engages the direct mode clutch 10 and transmits a drive force according to the speed ratio of the continuously variable transmission 2. The power recirculation mode engages the power recirculation mode clutch 9 and disengages the direct mode clutch 10. Thereby, it performs control of the unit speed ratio II (speed ratio of the unit input shaft 1a and the unit output shaft 6) of the whole infinite speed ratio continuously variable transmission almost continuously from a negative value to a positive value including infinity, as shown in FIG. 9, according to the difference of speed ratio of the continuously variable transmission 2 and the fixed speed ratio transmission 3.

The unit output shaft 6 is supported by a casing 14 and a front casing 15 via bearings provided at both ends, as shown in FIG. 2. The end on the right-hand side of the drawing is supported by the front casing 15 via a bearing 17. On the other hand, the end on the left-hand side of the drawing is supported by a support hole 16 provided on the left-hand side of the casing 14 in the drawing via a bearing 18 comprising a tapered roller bearing.

The front casing 15 is a member which closes the casing 14 which opens on the right-hand side of the drawing.

Here, the bearing 18, a retainer 30, the direct mode clutch 10, sprocket 4a and continuously variable transmission output shaft 4, planetary gear set 5, power recirculation mode clutch 9, output shaft 3c of the fixed speed ratio transmission 3, gear 3b and a transmission output gear 7 are disposed in order from the left-hand end of the unit output shaft 6 in the drawing.

Next, referring to FIG. 2 and FIG. 3, the power recirculation mode clutch 9 comprising an electromagnetic bidirectional way roller clutch (hereafter referred to as an electromagnetic two-way clutch) will be described. This electromagnetic two-way clutch is identical to that disclosed in Tokkai Hei 11-159544 (Koho). The power recirculation mode clutch 9 is disposed on the inner circumference of the fixed speed ratio transmission output shaft 3c which is formed in an envelope shape.

Figure 3:
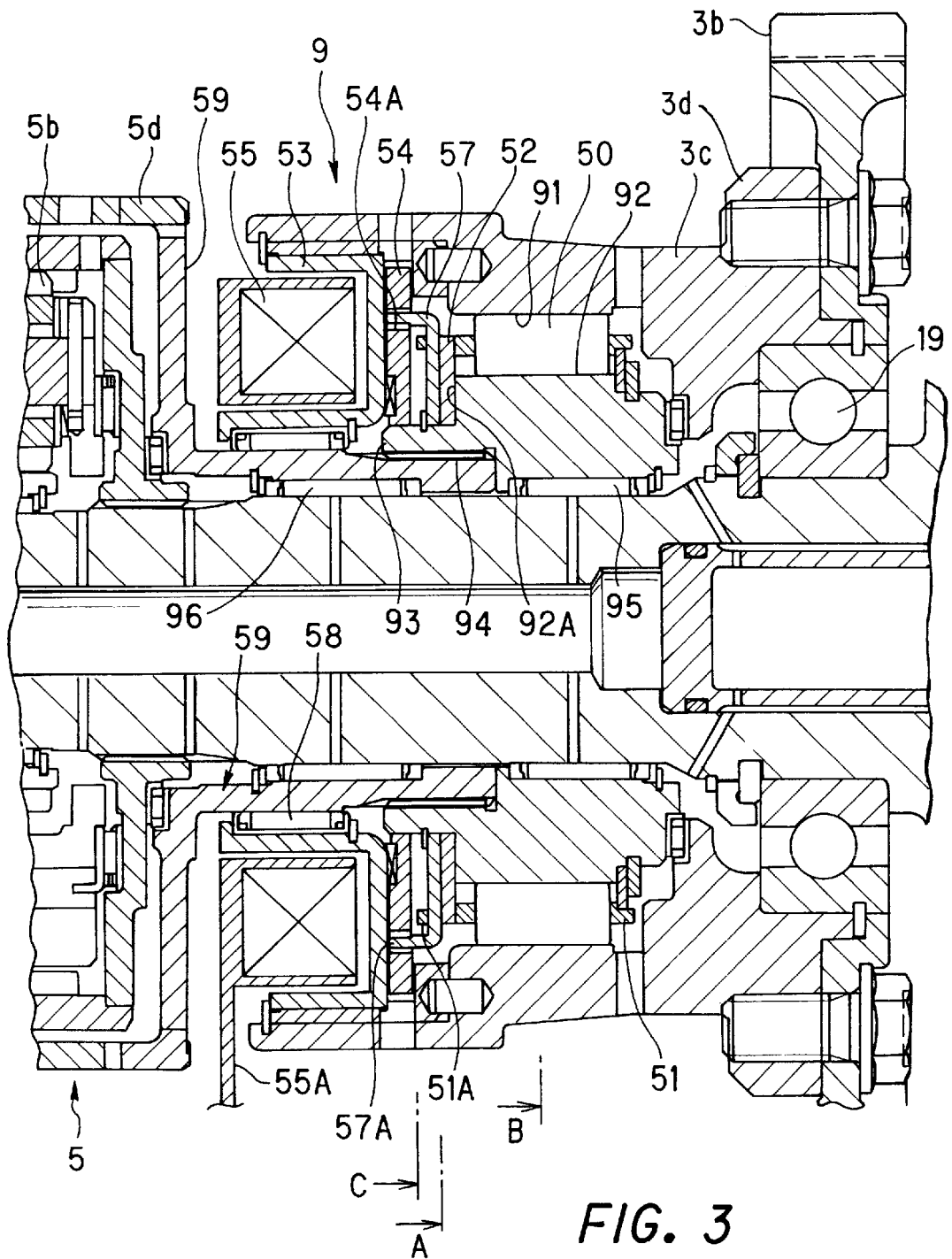
FIG. 3 is a sectional view of a power recirculation mode clutch comprising an electromagnetic two-way clutch.

In FIG. 2 and FIG. 3, a flange 3d is formed at the end of the fixed speed ratio transmission output shaft 3 on the right-hand side of the drawing. A gear 3b is engaged with this flange 3d, and a bearing 19 is interposed in its inner circumference. The fixed speed ratio transmission output shaft 3c is supported free to rotate relative to the unit output shaft 6.

The fixed speed ratio transmission output shaft 3c has one end which opens toward the planetary gear set 5 on the left-hand side of the drawing. This opening is formed in a cylindrical shape, and a circular rotor 53 is fixed to the inner circumference.

The rotor 53 has a U-shaped cross-section opening towards the planetary gear set 5, as shown in FIG. 3. A circular electromagnetic coil 55 is housed in the inner circumference of this rotor 53.

The electromagnetic coil 55 is fixed to the casing 14 via a support member 55A, and a predetermined clearance is formed with the inner circumference of the rotor 53.

An inner circumference 91 of circular cross-section which selectively engages with a roller 50 is formed midway in the fixed speed ratio transmission output shaft 3c, i.e., between the rotor 53 and bearing 19. This inner circumference 91 forms the outer of the electromagnetic two-way clutch. In the following description, this inner circumference will be referred to as an outer race 91.

An inner race 92 is disposed between this outer race 91 and the unit output shaft 6. The inner race 92 is an envelope-like member having a polygonal outer circumference, the unit output shaft 6 being inserted in the inner circumference, as shown in FIG. 5B.

A needle bearing 95 is interposed between the inner circumference of the inner race 92 and the unit output shaft 6, and the inner race 92 is supported free to rotate relative to the unit output shaft 6.

On the other hand, the outer circumference of the inner race 92 is for example octagonal as shown in FIG. 5, the rollers 50 being respectively disposed on flat surfaces. The positions of the rollers 50 in the circumferential direction are limited by a retainer 51 so that they have predetermined positions on the flat surfaces.

Figure 5A:
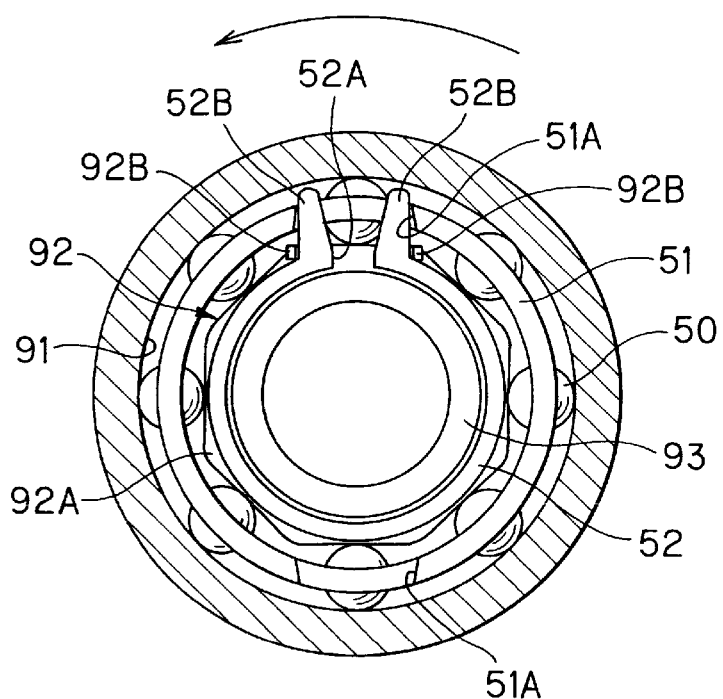
FIGS. 5A and 5B are sectional views of the power recirculation mode clutch during disengagement.
Figure 5B:
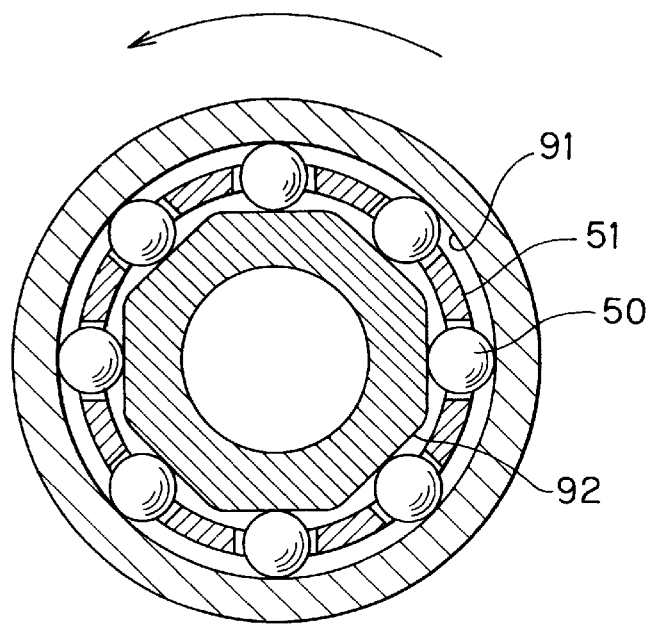

As shown in FIG. 5B, the roller 50 is set so that, when the roller 50 is in a neutral position in the center of the plane of the outer circumference of the inner race 92, it does not come in contact with the outer race 91, and permits relative rotation of the inner race 92 and outer race 91 as mentioned later.

Here, the inner race 92 is provided with a cylindrical part 93 of smaller diameter further towards the rotor 53 (left-hand side of the diagram) than the position in contact with the rotor 50, as shown in FIG. 2 and FIG. 3. A spline 94 is formed on the inner circumference of this cylindrical part 93, and is joined to an intermediate shaft 59 connected to the carrier 5b of the planetary gear set 5.

A needle bearing 96 is interposed between the unit output shaft 6 in the shaft part inner circumference of the intermediate shaft 59, and the intermediate shaft 59 is supported free to rotate relative to the unit output shaft 6. A needle bearing 58 is also interposed between the rotor 53, and the intermediate shaft 59 supports the outer race 91 side of the power recirculation mode clutch 9, i.e., one end of the fixed transmission output shaft 3c, so that it is free to perform relative rotation.

Figure 6A:
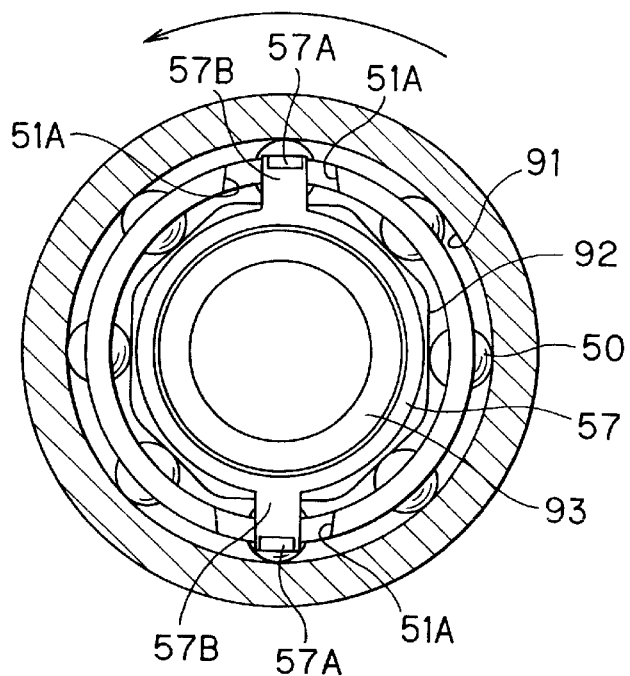
FIGS. 6A and 6B shows connecting members, a holder and a relation between a roller and an inner race according to an engaging state.

Next, the retainer 51 housing the plural rollers 50 projects toward the rotor 53 up to a position in which it can face the outer circumference of the cylindrical part 93 of the inner race 92, as shown in FIG. 3, FIG. 5A and FIG. 6A.

An armature 54 which can come in contact with and separate from the rotor 53 according to the excitation of the electromagnetic coil 55 is disposed between the retainer 51 and rotor 53. This armature 54 comprises a disk-shaped member whereof the inner circumference is inserted in the cylindrical part 93 of the inner race 92. The armature 54 is supported free to displace in the axial direction relative to the inner race 92 and free to rotate around the cylindrical part 93.

Here, a notch 51A is formed at a predetermined position on the periphery of the retainer 51 projecting towards the rotor 53, as shown in FIG. 5A and FIG. 6A, the notch 51A engaging with projections 52B, 57B of a switch spring 52 and a connecting member 57, described hereafter.

The inner circumferences of the switch spring 52 and connecting member 57 are inserted in the cylindrical part 93 of the inner race 92, and are supported free to rotate relative to the inner race 92 as shown in FIG. 3. These members are disposed in the order, switch spring 52 and connecting member 57, from an end surface 92A on the inner race 92 whereof the outer circumference is polygonal.

First, the switch spring 52 comprises a member which can bend having a notch 52A in one part of its annulus as shown in FIG. 5 A. The projections 52B, 52B projecting towards the outer circumference are formed on both sides of the notch 51A, i.e., in a snap ring shape. The pushing force of the switch spring 52 acts in such a direction as to widen the notch 52A.

A pair of pins 92B, 92B which come in contact with the outside of the projections 52B, 52B are implanted on the end face 92A of the inner race 92. The switch spring 52 is pushed from the inside towards the outside of these pins 92B, 92B.

The projections 52B, 52B projecting towards the outer circumference from between the pins 92B, 92B are engaged with the notches 51A, 51A of the retainer 51.

When the electromagnetic coil 55 is not energized and is under no load, as described later, the pins 92B, 92B guide the retainer 51 due to the pushing force of the switch spring 52 to achieve a neutral position in which the roller 50 is situated in the center of the plane of the inner race 92 (position where the roller 50 does not come in contact with the outer race 91, and disengaged position of the power recirculation mode clutch 9), as shown in FIG. 5B.

Next, in FIG. 3, the connecting member 57 is disposed on the side of the armature 54 of the switch spring 52. The connecting member 57 comprises an annular member whereof the inner circumference is inserted into the cylindrical part 93, and projections 57B, 57B which project toward the outer circumference according to the position of the notch 51A, as shown in FIG. 6A. A pawl 57A which projects towards the rotor 53 from the projection 57B is also formed as shown in FIG. 3.

This pawl 57A engages with a hole 54A formed in the armature 54, as shown in FIG. 3. When the armature 54 adheres to the rotor 53, the pawl 57A is driven according to the rotation of the rotor 53, i.e., according to the rotation of the outer race 91. The connecting member 57 transmits the rotation of the rotor 53 to the retainer 51 via the notch 51A.

The action of the power recirculation mode clutch 9 having the aforesaid construction will now be described referring to FIG. 3, FIG. 5 and FIG. 6.

In FIG. 3, when the electromagnetic coil 55 is not energized, the armature 54 separates from the rotor 53, and the connecting member 57 is positioned between the notches 51A, 51A of the retainer 51 as shown in FIG. 6A.

At this time, the switch spring 52 maintains a position in which the projections 52B, 52B are engaged with the pins 92B, 92B of the inner race 92 due to its pushing force, as shown in FIG. 5A. The retainer 51 which engages with the projections 52B is guided to a neutral position wherein the roller 50 is positioned in the center of the plane of the inner race 92.

In this neutral position, the roller 50 does not come in contact with the outer race, and the outer race 91 and inner race 92 are free to rotate relative to one another, which is the disengaged state of the power recirculation mode clutch 9.

On the other hand, when the electromagnetic coil 55 is energized, the armature 54 adheres to the rotor 53, and the rotation of the outer race 91 is transmitted to the retainer 51 via the connecting member 57.

Figure 6B:
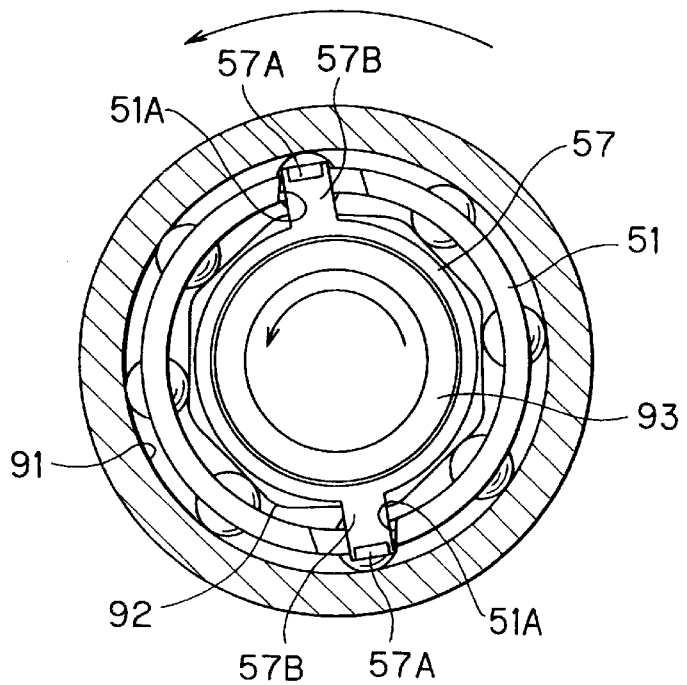

For example, as shown in FIG. 6, when the outer race 91 rotates in the anticlockwise direction of the drawing, the connecting member 57 also rotates anticlockwise due to the excitation of the electromagnetic coil 55, and the projection 57B pushes the notch 51A of the retainer 51 in the anticlockwise direction, as shown in FIG. 6B.

Figure 7A:
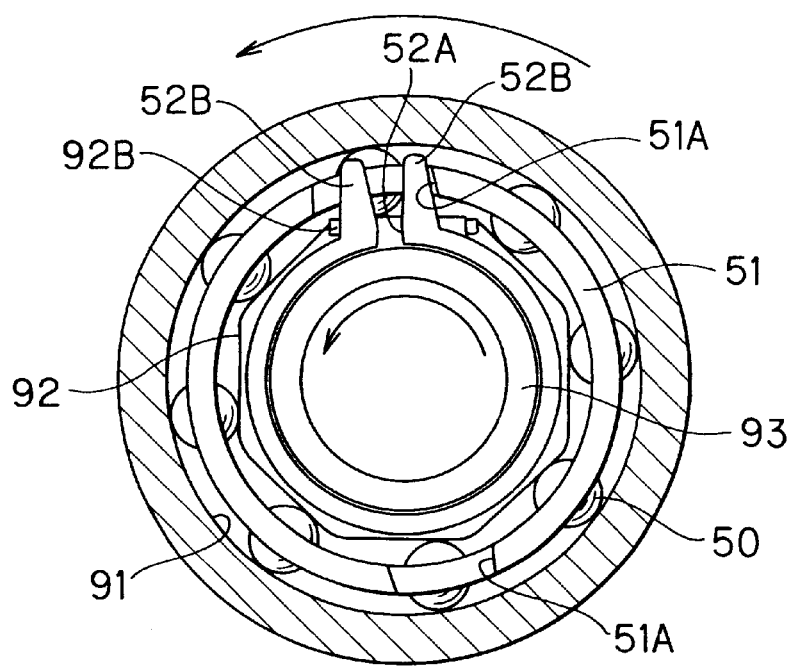
FIGS. 7A and 7B is a sectional view of the power recirculation mode clutch during engagement. FIG. A is a sectional view through an arrow A in FIG. 3, and FIG. B is a sectional view through an arrow B in FIG. 3.
Figure 7B:
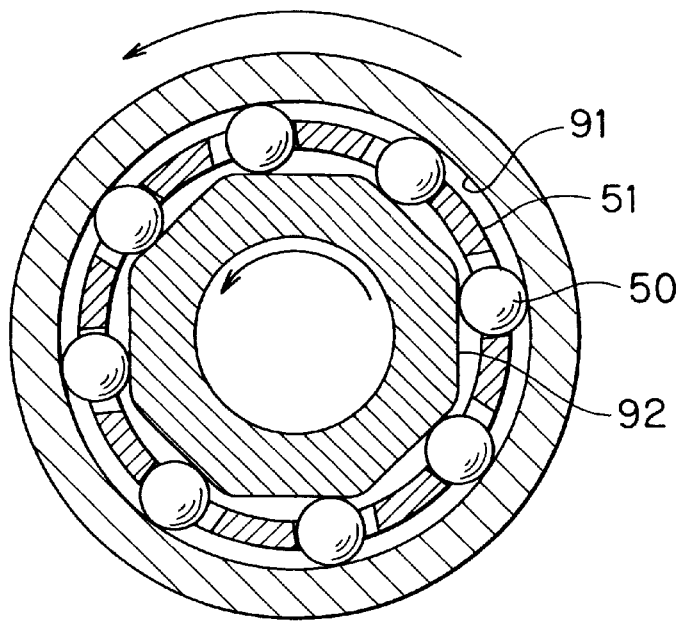

Due to the rotation of the retainer 51 in the anticlockwise direction, the roller 50 rolls in the plane of the outer circumference of the inner race 92 from the center part towards the adjacent plane, and the roller 50 comes in contact with the outer race 91 as shown in FIG. 7B. Due to the rotation of the outer race 91, the roller 50 is gripped by the inner race 92 and outer race 91, the torque from the outer race 91 is transmitted to the inner race 92, and the power recirculation mode clutch 9 enters the engaged state.

At this time, the switch spring 52 twists according to the anticlockwise rotation of the retainer 51, and the projection 52B on the left-hand side of the drawing is stopped by the pin 92B, as shown in FIG. 7A. On the other hand, the projection 52B on the right-hand side of the drawing is pressed against the notch 51A of the retainer 51, and a state is maintained wherein the notch 52A of the switch spring 52 is compressed.

In this engaged state, even if excitation of the electromagnetic coil 55 stops, while torque is transmitted from the outer race 91 to the inner race 92, the roller 50 is gripped between the plane of the inner race 92 and the outer race 91 due to the torque of the outer race 91, and so the power recirculation mode clutch 9 can continue to be in the engaged state.

When the torque from the outer race 91 has disappeared, or when there is an attempt to transmit torque from the inner race 92 to the outer race 91, the roller 50 returns to the aforesaid neutral position of FIG. 5 due to the pushing force of the switch spring 52, and the power recirculation mode clutch 9 enters the disengaged state.

In the above FIG. 5–FIG. 7, the case was described where torque was transmitted from the outer race 91 to the inner race 92, but torque may also be transmitted from the inner race 92 to the outer race 91. In the same way as above, when the electromagnetic coil 55 is energized, the connecting member 57 and retainer 51 rotate in an opposite sense to the situation of FIG. 6B and FIG. 7, the roller 50 displaces to the right-hand side of the drawing and is gripped between the plane of the inner race 92 and the outer race 91, so torque can be transmitted from the inner race 92 to the outer race 91.

Thus, the power recirculation mode clutch 9 which comprises the electromagnetic two-way clutch, can transmit torque between the outer race 91 and inner race 92 due to the excitation of the electromagnetic coil 55.

Next, the direct mode clutch 10 interposed between the continuously variable transmission output shaft 4 and unit output shaft 6 will be described referring to FIG. 4.

The direct mode clutch 10 comprises an electromagnetic two-way clutch identical to the power recirculation mode clutch 9, and differs with respect to its installation position and input/output members.

The direct mode clutch 10 is housed in the inner circumference of an outer race 191 formed in a cylindrical shape.

One end of the outer race 191 is joined to the continuously variable transmission output shaft 4 via a continuously variable transmission output gear 4a, the end facing a retainer 30 on the left-hand side of the drawing is open, and a rotor 153 of circular shape is fixed to the inner circumference of this end.

Figure 4:
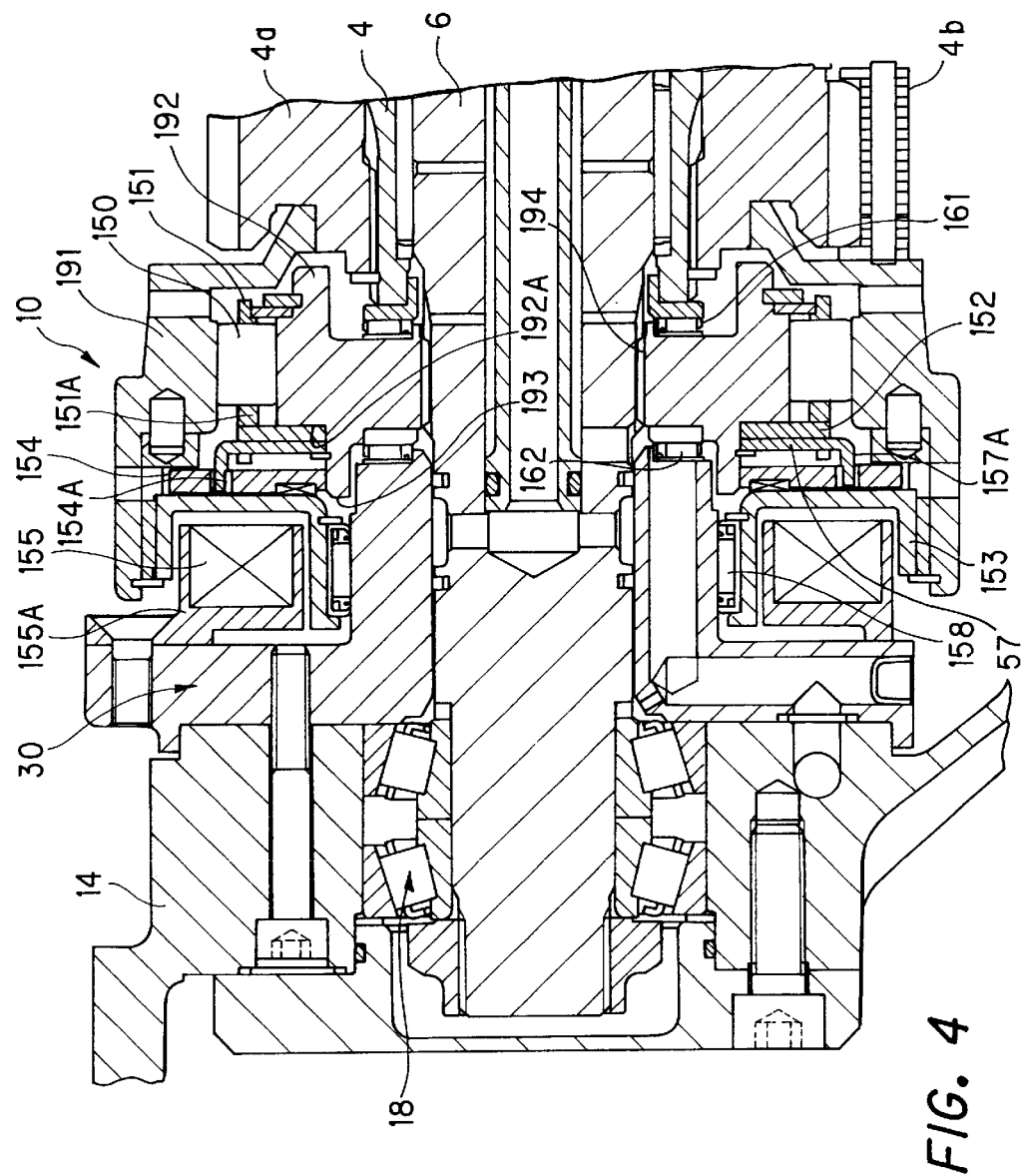
FIG. 4 is a sectional view of a direct mode clutch comprising an electromagnetic two-way clutch.

The rotor 153 comprises a U-shaped section which opens towards the retainer 30, and an electromagnetic coil 155 of circular shape is likewise housed in the inner circumference of this rotor 153, as shown in FIG. 4.

The electromagnetic coil 155 is fixed to a casing 14 via a supporting member 155A, and a predetermined gap is formed with the inner circumference of the rotor 153.

A needle bearing 158 is interposed between the inner circumference of the rotor 153 and the retainer 30, and the rotor 153 and outer race 191 are supported free to rotate relative to the retainer 30 fixed to the casing 14.

An inner circumference of circular cross-section which selectively engages with the roller 150 is formed midway along the outer race 191, i.e., between the rotor 153 and the continuously variable transmission output gear 4a.

An inner race 192 is disposed between this outer race 191 and the unit output shaft 6. As in the case of the aforesaid power recirculation mode clutch 9, the inner race 192 is an envelope-shaped member having a polygonal outer circumference, the unit output shaft 6 being inserted into its inner circumference.

The inner circumference of the inner race 192 and unit output shaft 6 are joined via a spline 194, and the inner race 192 rotates together with the unit output shaft 6.

In the same way as the inner race 92 of the power recirculation mode clutch 9, the outer circumference of the inner race 192 may for example be octagonal, as shown in FIG. 5. Rollers 150 are respectively disposed on the flat surfaces of the inner race 192, their positions in the circumferential direction being restricted by a retainer 151 so that the rollers 150 have predetermined positions in these planes.

Here, the inner race 192 has a cylindrical part 193 of small diameter projecting further towards the rotor 153 than the position in contact with the roller 50 (left-hand side of the drawing), as shown in FIG. 2 and FIG. 4.

Next, the retainer 151 housing the plural rollers 150 projects toward the rotor 153 up to a position where it is facing the outer circumference of the cylindrical part 193 of the inner race 192.

An armature 154 which can come in contact with and separate from the rotor 153 according to the excitation of the electromagnetic coil 155 is disposed between the retainer 151 and rotor 153.

This armature 154 comprises an annular member whereof the inner circumference is inserted into the cylindrical part 193 of the inner race 192, is free to displace in an axial direction relative to the inner race 192, and is supported free to rotate relative to the cylindrical part 193.

Here, a notch 151A is formed at a predetermined position on the periphery of the retainer 151 projecting toward the rotor 153, as shown in FIG. 5A and FIG. 6A, and engages with projections of the switch spring 52 and the connecting member 57 identical to those of the power recirculation mode clutch 9.

The switch spring 52 and connecting member 57 which engage with the notch 51A formed in this retainer 151 have inner circumferences inserted into the cylindrical part 193 of the inner race 192, and are supported free to rotate relative to the inner race 192. The switch spring 52 and connecting member 57 are disposed in that order from one end 192A of the inner race 192 which has a polygonal outer circumference.

The switch spring 52 and connecting member 57 have an identical construction to those of the aforesaid power recirculation mode clutch 9.

Next, in FIG. 4, a pawl 57A projecting toward the rotor 153 is formed also in the connecting member 57 disposed near the armature 154 of the switch spring 52, as in the case of the power recirculation mode clutch 9.

This pawl 57A engages with an aperture 154A formed in the armature 154, and when the armature 154 adheres to the rotor 153, the pawl 57A is driven according to the rotation of the rotor 153, i.e., according to the rotation of the outer race 191. The connecting member 57 transmits the rotation of the rotor 153 to the retainer 151 via the notch 51A.

This direct mode clutch 10 functions in an identical way to the power recirculation mode clutch 9. When the electromagnetic coil 155 is energized, the armature 154 adheres to the rotor 153, and the retainer 151 rotates relative to the inner race 192 while the switch spring 52 twists via the connecting member 57. Due to the gripping of the roller 150 between the plane of the outer circumference of the inner race 192 and the inner circumference of the outer race 191, torque is transmitted from the outer race 191 to the inner race 192, and the direct mode clutch 10 enters the engaged state.

On the other hand, when the electromagnetic coil 105 is not energized and there is practically no load, in the same way as in the case of the aforesaid power recirculation mode clutch 9, the switch spring 52 returns to the neutral position, and the direct mode clutch 10 can be disengaged.

Hence, as described above, by using electromagnetic two-way clutches for the power recirculation mode clutch 9 and direct mode clutch 10, by energizing the electromagnetic coil 55 and not energizing the electromagnetic coil 155, the transmission enters the power recirculation mode wherein only the power recirculation mode clutch 9 is engaged. Conversely, by energizing the electromagnetic coil 155 and not energizing the electromagnetic coil 55, the transmission enters the direct mode wherein only the direct mode clutch 10 is engaged. In particular, change-over of the clutch at the rotation synchronous point RSP where there is a change-over between the power recirculation mode and direct mode, can be performed more rapidly than in an oil pressure multiplate clutch of the aforesaid prior art example.

SPEED RATIO CONTROL

Figure 13:
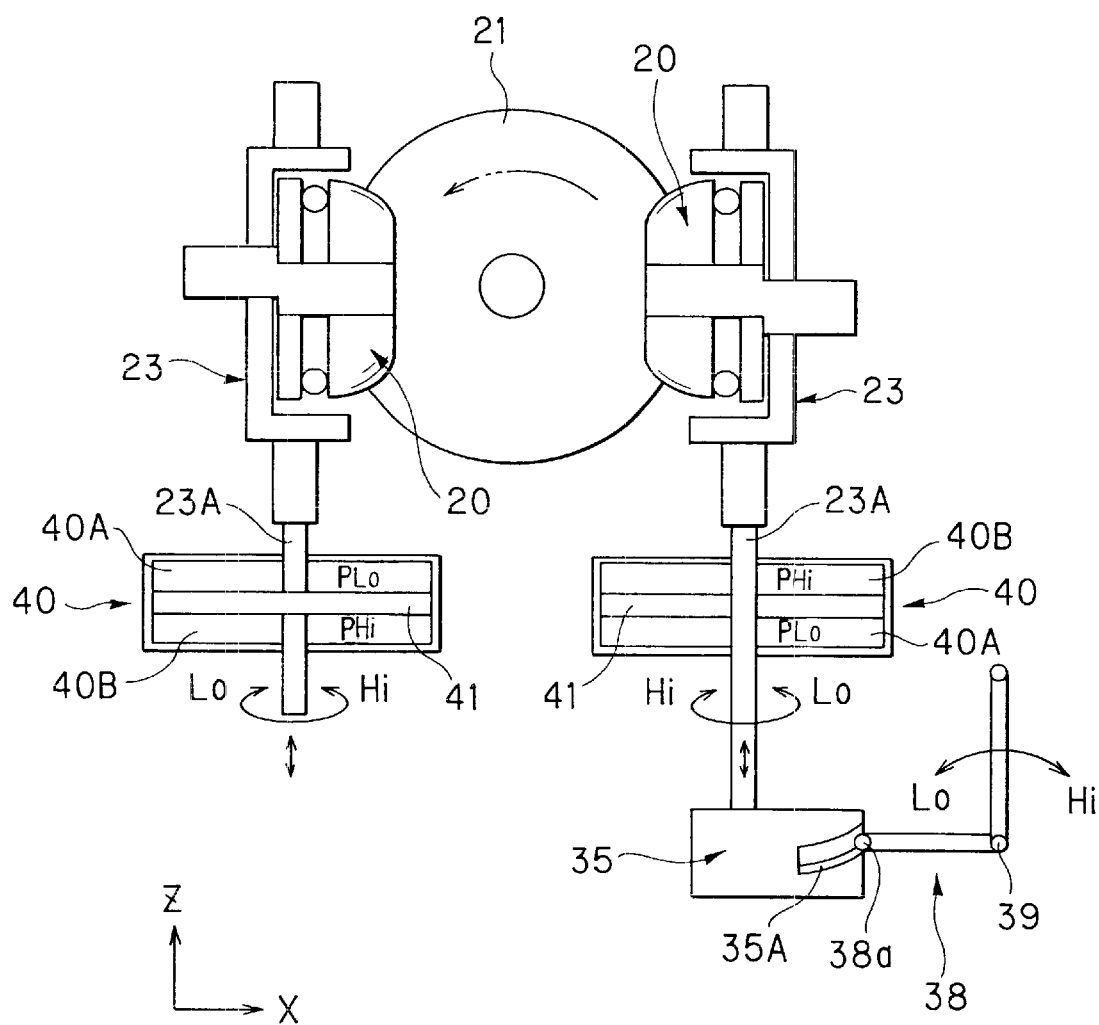
FIG. 13 is a schematic view of a toroidal continuously variable transmission.
Figure 14:
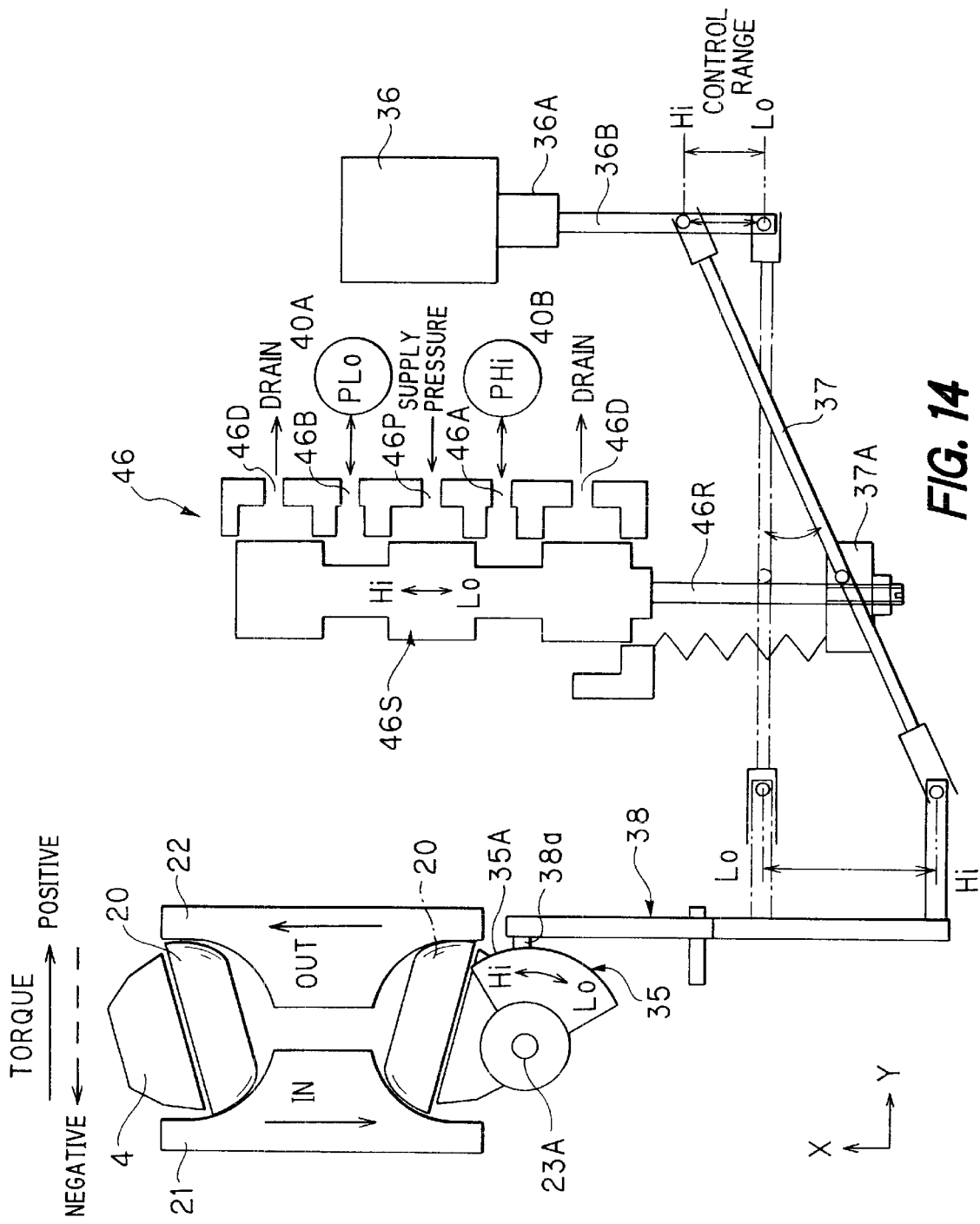
FIG. 14 is likewise a schematic view showing a speed change control mechanism of the toroidal continuously variable transmission.
Figure 15:
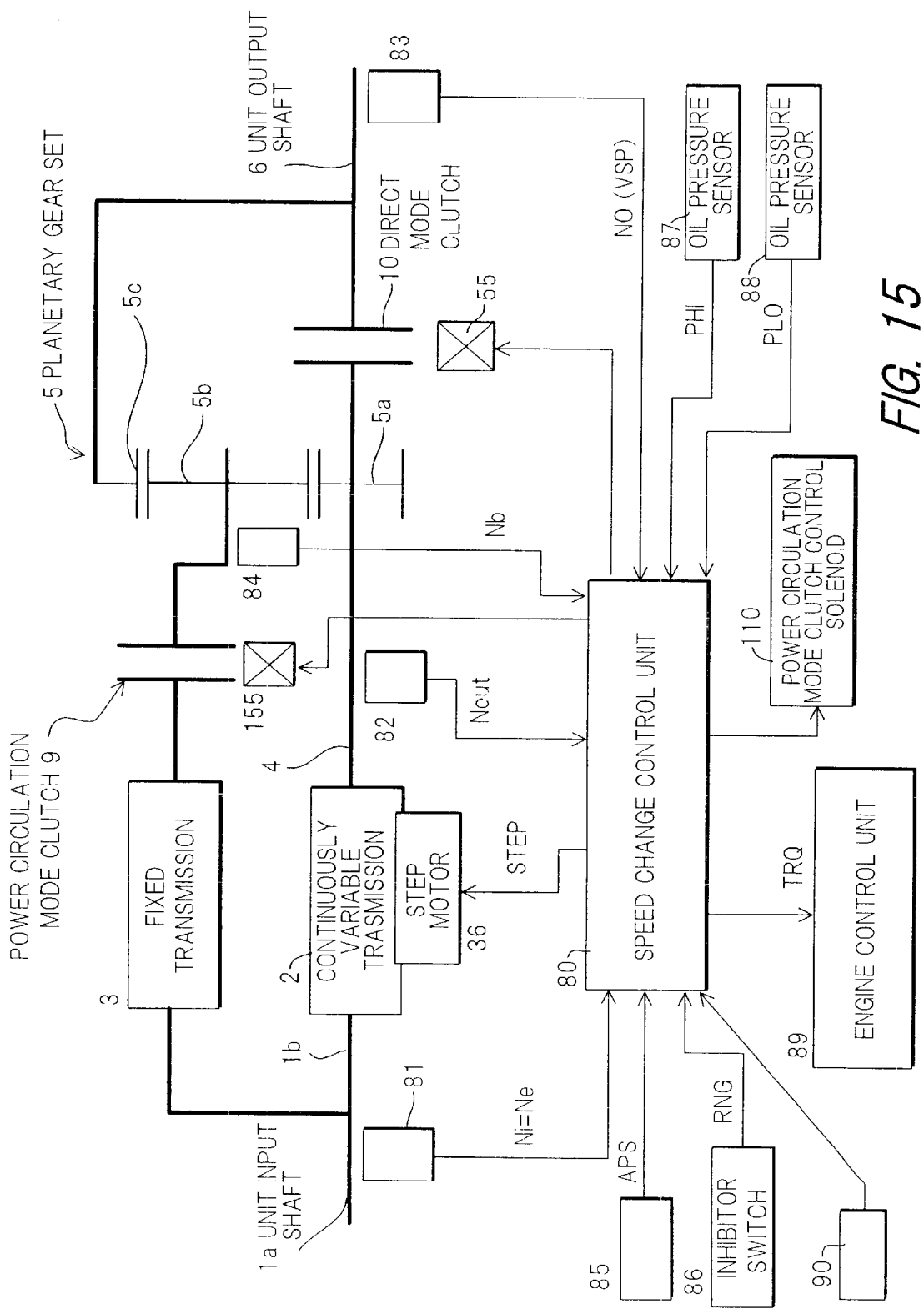
FIG. 15 is a schematic view showing a controller of the infinite speed ratio continuously variable transmission.

FIG. 13 to FIG. 15 show the schematic construction of a speed ratio control device for the first embodiment. FIG. 13 and FIG. 14 are schematic views of the speed change mechanism of a toroidal continuously variable transmission, and FIG. 15 is a schematic view of the speed change mechanism of an infinite speed ratio continuously variable transmission. And following embodiments adopt this speed ratio control.

In FIG. 13, the power rollers 20, 20 are gripped between the opposite faces of the input/output disks 21, 22, and the power roller 20 is supported by a trunnion 23 (roller support member). An axial part 23A is provided in the lower part of the trunnion 23. The axial part 23A is connected to an oil pressure cylinder 40, driven in an axial direction (Z axis direction of the figure), and free to rotate around the axis so that the gyration angle (=speed ratio) of the power roller 20 varies continuously.

Of the plural trunnions supporting the power rollers 20, a precess cam 35 for transmitting the gyration angle of the power roller 20 and axial displacement of the trunnion 23 to a speed change control valve 46, is disposed on one of the axial parts 23.

The precess cam 35 for transmitting the axial displacement and displacement around the axis (gyration angle) to a feedback link 38 is formed at the lower end of the axial part 23A of the trunnion. A cam surface (or cam groove) 35A formed in this precess cam 35 guides an engaging member 38a provided in the feedback link 38. One end of the feedback link 38 engages with the precess cam 35 and the other end engages with one end of a precess link 37, as shown in FIG. 14.

A slider 36B driven in the axial direction by a step motor 36 as an actuator in the claim via a gear mechanism 36A, engages with the other end of the speed change link 37. A rod 46R of the spool 46S which slides on the inner circumference of the speed change control valve 46 via a connecting member 37A, is connected midway along the speed change link 37. The gyration angle of the power roller 20, i.e., the real CVT ratio IC, is transmitted by a mechanical feedback means connected to the speed change link 37 from the precess cam 35, and the speed change control valve 46 displaces according to the drive position on the step motor 36 so as to adjust oil pressures PLo, PHi of oil chambers 40A, 40B of the oil pressure cylinder 40.

Here, in FIG. 13, the power roller 20 gyrates to the Lo side, and the precess cam 35 attached to the axial part 23A of the trunnion also rotates to the Lo side in the figure causing the engaging member 38a to descend. On the other hand, when the precess cam 35 rotates to the Hi side, the engaging member 38a ascends, and the speed change link 37 connected to the feedback link 38 is driven to the Lo side or Hi side in the figure according to the gyration of the power roller 20.

Therefore, in FIG. 14, when the step motor 36 and extends or contracts the slider 36B according to the target speed ratio from a speed ratio control unit 80, a spool 46S displaces according to the displacement of one end of the speed change link 37. Due to the displacement of the spool 46S, a supply pressure port 46P of the speed ratio control valve 46 communicates with a port 46A or a port 46B, and pressurized oil is supplied to the oil chambers 40A, 40B on the Hi or Lo side of the oil pressure cylinder 40 so as to drive the trunnion 23 in the axial direction.

The port 46A or 46B on the side not communicating with the supply pressure port 46P, communicates with a drain port 46D. The oil chambers 40A, 40B formed in the oil pressure cylinder 40 by a piston 41 are set so that, in the facing oil pressure cylinders 40, 40', the arrangement of the oil chambers 40A, 40B is opposite and the opposite trunnions 23, 23 are driven in opposite directions, as shown in FIG. 13.

The power roller 20 gyrates and changes the speed ratio according to the axial displacement of the trunnion. The gyration of this power roller 20 is transmitted to one end of the speed change link 37 via the axial part 23A of the trunnion 23, precess cam 35 and feedback link 38. When the target speed ratio and real speed ratio coincide, the spool 46S returns to a neutral position wherein it closes the ports 46A, 46B, supply pressure port 46P and drain port 46D.

Here, in the direct mode., to transmit torque from the continuously variable transmission 2 to the unit output shaft 6, the vehicle is driven by a positive torque, and the engine brake is activated by a negative torque.

Regarding the torque passing through the continuously variable transmission 2, torque transmitted from the input disk 21 to the output disk 22 is considered as a torque in the positive direction, while torque transmitted from the output disk 22 to the input disk 21 is considered as a torque transmitted in the negative direction, as shown in FIG. 14.

However, in the power recirculation mode, when the power recirculation mode clutch 9 is engaged, the direct mode clutch 10 is disengaged, therefore in FIG. 1, forward/reverse motion of the vehicle and the geared neutral point GNP are determined by a difference between the rotation speed of the carrier 5*b* driven by the fixed transmission 3 and the rotation speed of the sun gear 5*a* according to the CVT ratio of the continuously variable transmission 2. In this power recirculation mode, the direction of the torque passing through the continuously variable transmission 2 varies according to the running direction of the vehicle.

Figure 16:
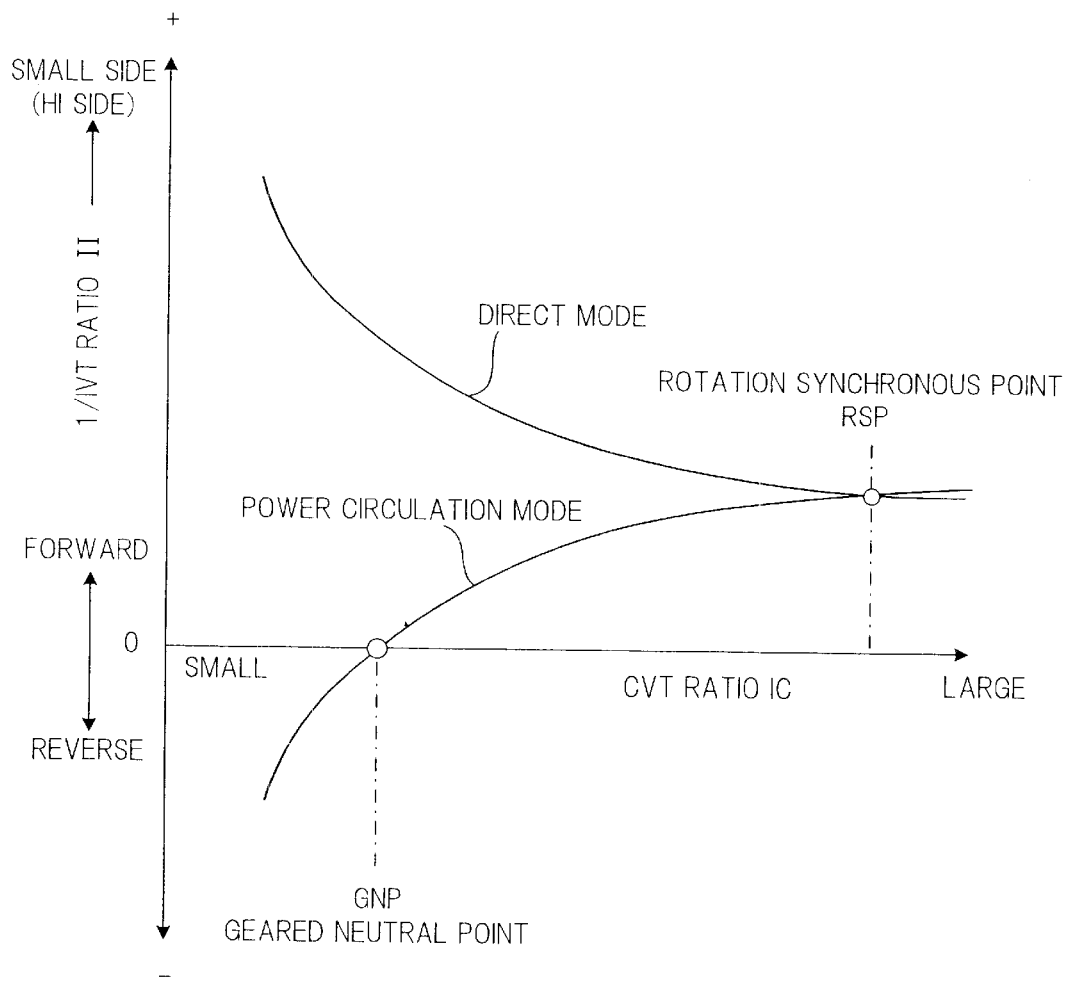
FIG. 16 is a characteristic graph of an inverse 1/II of an IVT ratio II and a ratio IC continuously variable transmission (referred to hereafter as CVT).

First, when the vehicle is moving forward in the power recirculation mode, and the rotation speed of the pinion of the carrier 5*b* is greater than the rotation speed of the sun gear 5*a*, the CVT ratio IC of the continuously variable transmission 2 is on the larger side (Lo side) of the geared neutral point GNP shown in FIG. 16. As shown by the solid line in FIG. 22, the torque transmitted from the engine to the carrier 5*b* via the fixed transmission 3 and power recirculation mode clutch 9 is respectively transmitted by the ring gear 5*c* and sun gear 5*a*.

Figure 22:
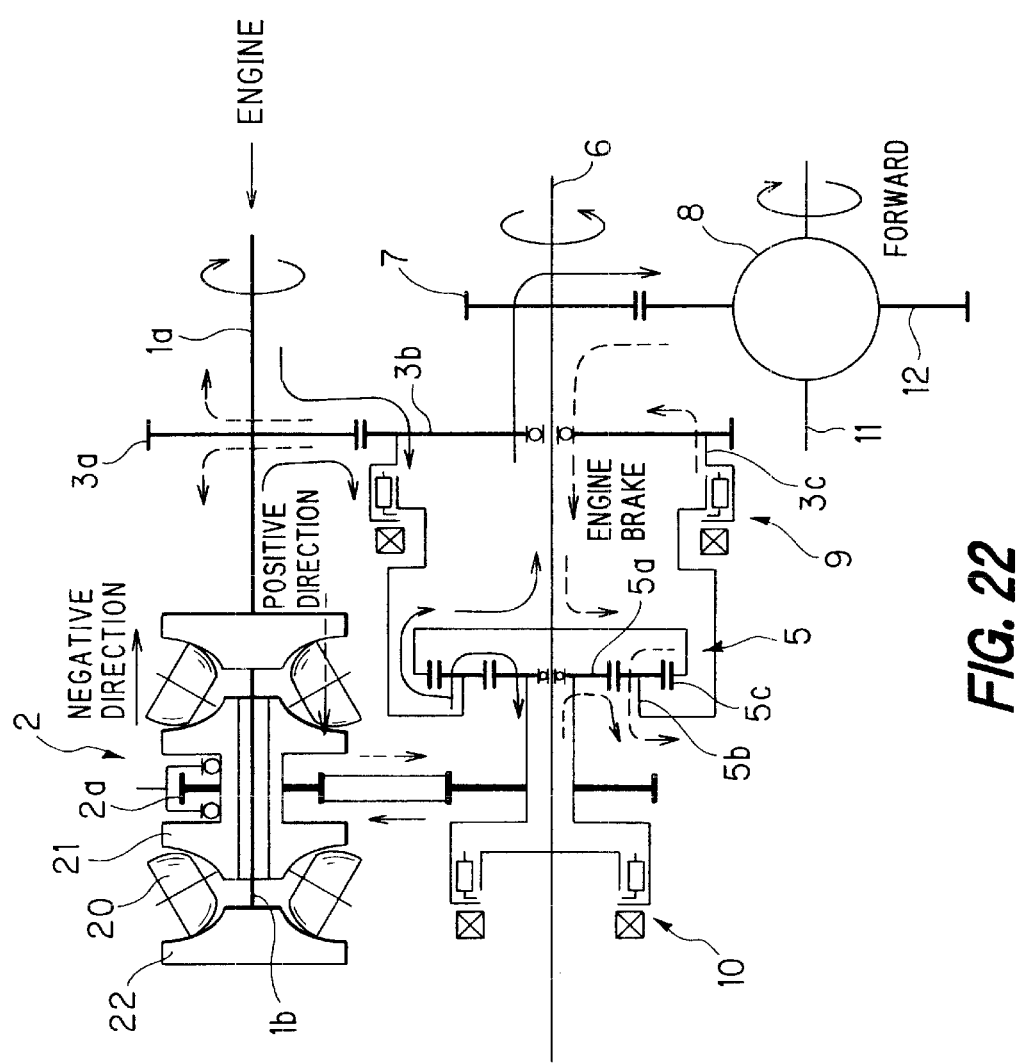
FIG. 22 is a schematic view of the infinite speed ratio continuously variable transmission showing the torque transmission direction when the vehicle is moving forward in the power recirculation mode. The solid line in the figure is the drive side, and the dotted line in the figure is the engine braking side.

The torque transmitted from the carrier 5*b* to the ring gear 5*c* is transmitted to the drive shaft via the unit output shaft 6, transmission output gear 7 and differential gear 8, as shown in FIG. 22. On the other hand, as the torque transmitted from the carrier 5*b* to the sun gear 5*a* is input to the continuously variable transmission 2 from the side of the output gear 22 via a chain 4*a*, and transmitted from the output disk 22 to the input disk 21, the torque passing through the continuously variable transmission 2 is a torque in the negative direction.

It may be noted that the torque transmitted from the output disk 22 to the input disk 21 is transmitted to the fixed transmission 3 from the CVT shaft 1*b* and unit input shaft 1*a*, and drive force is recirculated.

When the vehicle is moving forward in the power recirculation mode, and the engine brake is applied, torque is input to the unit output shaft 6 via the differential gear 8 and transmission output gear 7 from the drive shaft 11, and torque transmitted to the ring gear 5*c* is transmitted to the power recirculation mode clutch 9, fixed transmission 3 and unit input shaft 1*a* from the carrier 5*b* as shown by the dotted line in FIG. 22.

Part of the torque input to the unit input shaft 1*a* is input to the engine. The remaining torque is input to the continuously variable transmission 2 from the CVT shaft 1*b*. At this time, torque passing through the continuously variable transmission 2 is transmitted from the input disk 21 to the output disk 22, and is therefore a positive torque.

The torque transmitted to the output disk 22 is transmitted to the carrier 5*b* via the chain 4*a*, continuously variable transmission output shaft 4 and sun gear 5*a*, and torque in the engine brake direction is recirculated, as shown by the dotted line in FIG. 22.

It may be noted that, in the power recirculation mode clutch 9 comprising an electromagnetic two-way clutch, when the vehicle is moving forward in the power recirculation mode and the transmitted torque is on the drive side, torque is transmitted from the outer race 91 to the inner race 92, and when the transmitted torque is on the engine brake side (driven side), torque is transmitted from the inner race 92 to the outer race 91.

On the other hand, when the vehicle is reversing in the power recirculation mode, when the rotation speed of the sun gear 5*a* is much larger than the rotation speed of the carrier 5*b*, the CVT ratio IC of the continuously variable transmission 2 is on the low side (Hi side) of the geared neutral point GNP shown in FIG. 16. At this time, torque transmitted to the sun gear 5*a* is transmitted by the carrier 5*b* and ring gear 5*c*, so the input torque to the continuously variable transmission 2 is a positive torque transmitted from the input disk 21 to the output disk 22. The torque transmitted to the carrier 5*b* via the sun gear 5*a* is recirculated to the input disk 21 via the fixed transmission 3.

Therefore, when the vehicle is moving forward in the power recirculation mode, the transmitted torque on the drive side can be controlled by controlling the negative torque passing through the continuously variable transmission 2. Consequently, in FIG. 13 and FIG. 14, it is sufficient to control a pressure difference $\Delta P$ between the oil pressure PLo of the oil chamber 40A connected to the supply pressure port 46P and the oil pressure PHi of the oil chamber 40B connected to the drain port.

To control the engine brake when the vehicle is moving forward in the power recirculation mode, the positive torque passing through the continuously variable transmission 2 may be controlled. Therefore, in FIG. 13 and FIG. 14, it is sufficient to control a pressure difference $\Delta P$ between the oil pressure PHi of the oil chamber 40B connected to the supply pressure port 46P and the oil pressure PLo of the oil chamber 40A connected to the drain port 46D.

On the other hand, when the vehicle is reversing in the power recirculation mode, the above situation is reversed, and the transmitted torque on the drive side can be controlled by controlling the positive torque passing through the continuously variable transmission 2. Consequently, in FIG. 13 and FIG. 14, it is sufficient to control a pressure difference $\Delta P$ between the oil pressure PHi of the oil chamber 40B connected to the supply pressure port 46P and the oil pressure of the oil chamber 40A connected to the drain port 46D.

Likewise, to control the engine brake when the vehicle is reversing in the power recirculation mode, the negative torque passing through the continuously variable transmission 2 may be controlled. Therefore, it is sufficient to control a pressure difference $\Delta P$ between the oil pressure of the oil chamber 40A connected to the supply pressure port 46P and the oil chamber 40B connected to the drain port 46D.

The infinite speed ratio continuously variable transmission is controlled by a speed change control unit 80 mainly comprising a microcomputer as shown in FIG. 15. Signals are input to this speed change control unit 80 from an input shaft rotation speed sensor 81 which detects a rotation speed Ni of the unit input shaft 1, i.e., the engine rotation speed Ne, a CVT output shaft rotation speed sensor 82 which detects an output shaft rotation speed Nco of the continuously variable transmission output shaft 4, a vehicle speed sensor 83 which detects the rotation speed No of the unit output shaft 6 as a vehicle speed VSP, a rotation speed sensor 84 which detects a rotation speed Nb of the carrier 5*b* of the planetary gear set 5, and an accelerator depression amount sensor 85 which detects an accelerator pedal depression amount APS (or a throttle opening TVO). A running range RNG detected by an inhibitor switch 86 which responds to a selector lever or selector switch is also input, together with signals from an oil pressure sensor 88 which detects the oil pressure PLo of the oil chamber 40A on the oil cylinder 40, a brake switch 90 which detects the operating state of a foot brake, and an oil pressure sensor 87 which detects the oil pressure PHi of the oil chamber 40B. According to this embodiment, the running range RNG may be a D range (forward range), R range (reverse range), N range (neutral range) and P range (parking range).

The vehicle speed VSP is computed by multiplying the detected rotation speed No of the unit output shaft 6 by a predetermined constant.

The speed change control unit 80 processes the detected values from these sensors as a running state, calculates a target engine rotation speed tNe (=target input shaft rotation speed) from a speed change map, not shown, based on the accelerator pedal depression amount APS and vehicle speed VSP, divides this by the unit output shaft rotation speed No (vehicle speed VSP) to determine a target IVT ratio tII, and drives the step motor 36 which controls the speed change mechanism of the continuously variable transmission 2.

The excitation state of the electromagnetic coil 55 of the power recirculation mode clutch 9 and electromagnetic coil 155 of the direct mode clutch. 10 are respectively controlled based on the running mode determined according to the IVT ratio II, as shown in FIG. 16.

Due to this speed change control mechanism shown in FIG. 15, in the vicinity of the geared neutral point GNP, the transmitted torque can be controlled in the same way as disclosed in Tokugan Hei 11-346178 submitted by the Applicant to the Japanese Patent Office on Dec., 6, 1999. Thus, when the running range RNG is the D range or R range, any desired creep torque can be generated by driving the step motor 36 a small amount from the step number STEP corresponding to the geared neutral point GNP.

Further, when it is necessary to restrict the input torque during a speed change, the speed change control unit 80 sends a desired torque TRQ to an engine control unit 89, and the engine control unit 89 controls the engine torque by adjusting the intake air amount or fuel injection amount of the engine, not shown.

Now, considering the case when the vehicle is running when the selector lever is set to the D range or R range, a brake, not shown, is operated and the vehicle stops, the rotation speed of the unit output shaft 6 when the vehicle is stationary is 0, and therefore, the IVT ratio II is infinite, and the CVT ratio IC takes a value corresponding to the geared neutral point GNP, as shown in FIG. 16.

When the brake is operated, and the vehicle stops when the selector lever is set to the D range or R range, the step motor 36 shown in FIG. 14 is driven, the spool 46S is displaced, a supply pressure PL is supplied to one of the oil chamber 40A or 40B and the other oil chamber is drained so that the differential pressure ΔP between the front and rear of the piston 41 shown in FIG. 13, varies.

At this time, the unit output shaft 6 is restricted by the brake, so the CVT ratio IC is fixed at a value corresponding to the geared neutral point GNP, and the torque can be controlled according to the differential pressure ΔP.

Specifically, when the vehicle speed VSP is 0 Km/h, the geared neutral point GNP or a nearby value is obtained at which the IVT ratio is infinite. At this time, if the step motor 36 is driven to vary the differential pressure ΔP of the oil pressure cylinder 40, any transmission torque (=creep torque) can be controlled respectively for the drive side and engine brake side.

For example, in the power recirculation mode of the D range, as shown in FIG. 22, the direction of the torque passing through the continuously variable transmission 2 is the forward direction of the power recirculation mode, so the torque on the drive side can be controlled by controlling the torque transmitted in the negative direction. If the torque transmitted in the positive direction is controlled, the transmitted torque on the engine brake side can be controlled.

In the power recirculation mode of this D range, to control the transmitted torque in the positive direction passing through the continuously variable transmission 2, torque transmitted from the input disk 21 to the output disk 22 is controlled. Thus, in FIG. 13 and FIG. 14, the oil chamber 40B may be connected to the supply pressure port 46P, the oil chamber 40A connected to the drain port 46D, and the differential pressure ΔP adjusted so that:

$$PHi < PLo$$

Hence, when the vehicle is moving forward in the power recirculation mode, the transmitted torque on the engine brake side can be controlled. Here, if the differential pressure ΔP is:

$$\Delta P = PHi - PLo$$

by making the differential pressure ΔP a positive value, the torque transmitted in the positive direction through the continuously variable transmission 2 can be controlled.

Conversely, to control the torque transmitted in the negative direction, the torque transmitted from the output disk 22 inputs 21 is controlled, so in FIG. 13 and FIG. 14, the oil chamber 40A may be connected to the supply pressure port 46P, the oil chamber 40B connected to the drain port 46D, and the differential pressure ΔP adjusted so that:

$$PLo > PHi$$

Hence, when the vehicle is moving forward in the power recirculation mode, the transmitted torque on the drive side can be controlled. At this time, the differential pressure ΔP is negative.

When the vehicle is reversing in the power recirculation mode in the R range, the direction of torque transmission is the opposite of that in FIG. 22. Therefore, the torque on the engine brake side can be controlled by controlling the torque transmitted in the negative direction passing through the continuously variable transmission 2. If the torque transmitted in the positive direction is controlled, the transmitted torque on the drive side and the creep torque when the vehicle is stationary may be controlled.

Figure 17:
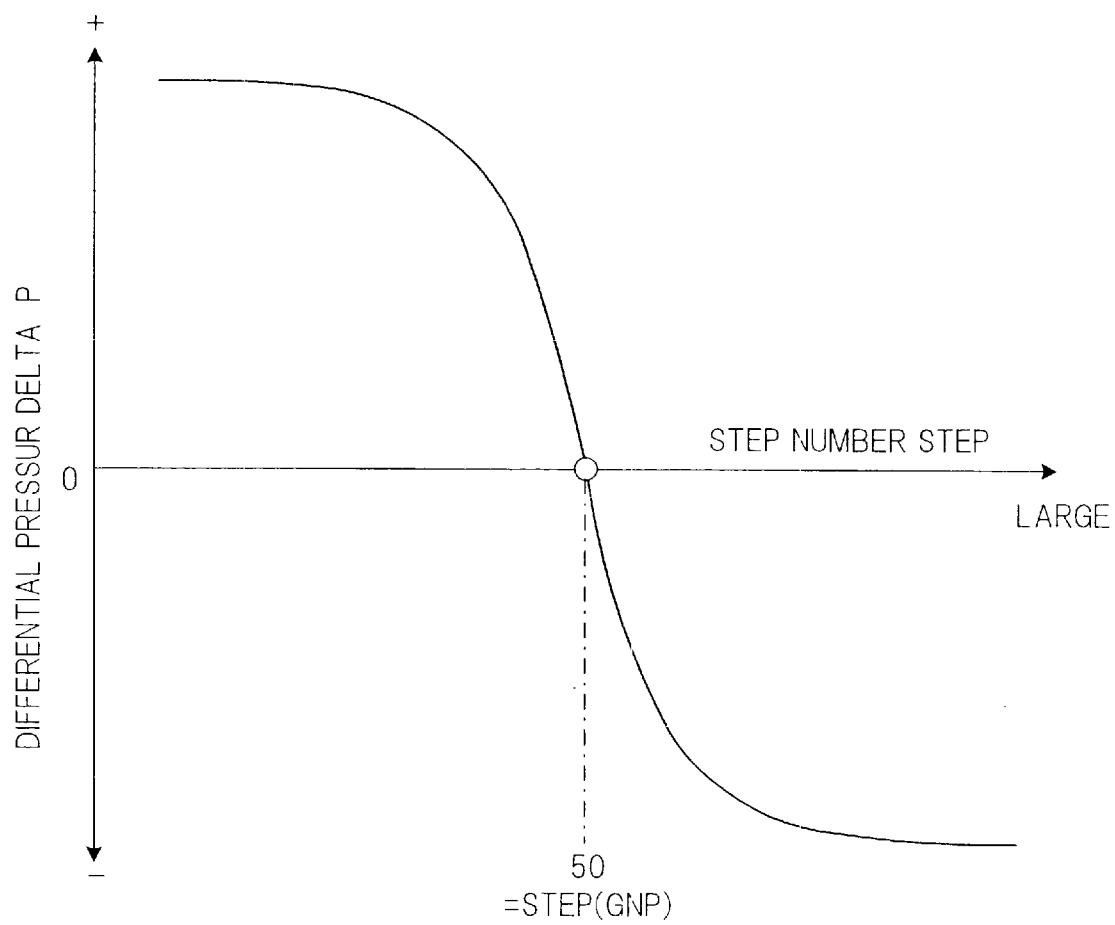
FIG. 17 is a map showing a relation between a step number STEP of a step motor and a differential pressure ΔP.

The aforesaid differential pressure ΔP corresponds to the displacement position (opening amount) of the spool 46S, and when the step motor 36 is driven when the vehicle is stationary in the D range or R range, the differential pressure ΔP varies according to the step number STEP of the step motor 36, as shown in FIG. 17. For example, when the step number STEP (GNP)=50, and a setting is made to realize the geared neutral point GNP at which 1/II=0, the differential pressure ΔP=0 at this geared neutral point GNP, and the stationary state of the vehicle can be maintained while the drive range is still a travel range.

By decreasing the step number STEP from STEP (=GNP)=50 corresponding to the geared neutral point GNP, the transmitted torque in the positive direction can be controlled, and conversely the torque transmitted in the negative direction can be controlled by increasing from 50.

Figure 18:
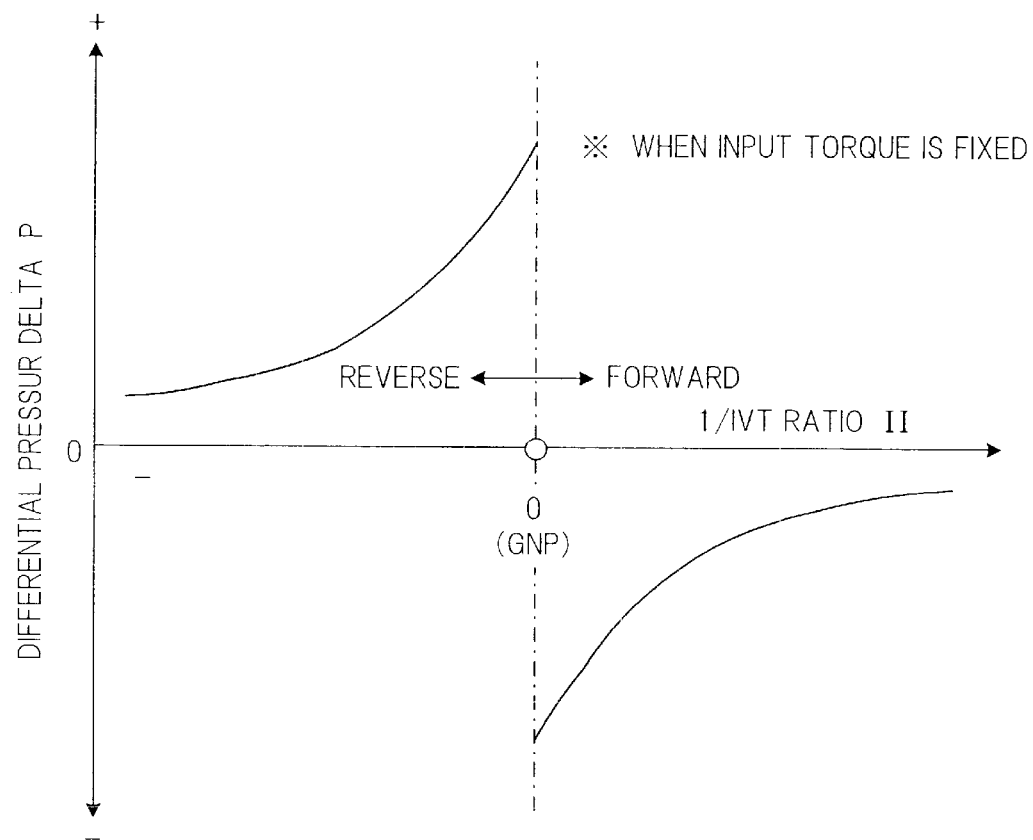
FIG. 18 is a map showing a relation between the inverse of the IVT ratio II and the differential pressure ΔP.

At the geared neutral point GNP, when the vehicle stops, the transmitted torque is 0, i.e., the step number STEP (GNP) of the step motor 36 is set so that the differential pressure ΔP=0 as shown in FIG. 17. Further, when the creep torque is generated, an arbitrary creep torque can be generated by driving by a predetermined step number according to the running direction from the step number STEP corresponding to the geared neutral point GNP. As shown also in FIG. 22, in the power recirculation mode, on the forward side and reverse side of the geared neutral point GNP, the vehicle can be started according to the torque transmission direction by varying the differential pressure ΔP as shown in FIG. 18.

When the vehicle is decelerating and comes to rest, the speed change control unit 80 performs speed change control in the power recirculation mode by engaging the power recirculation mode clutch 9 according to the running state such as the vehicle speed VSP, and after the speed has been varied toward the geared neutral point GNP at which the IVT ratio II is infinite, creep torque is generated in an identical way to the aforesaid Tokkai Gan Hei 11-346178.

Figure 19:
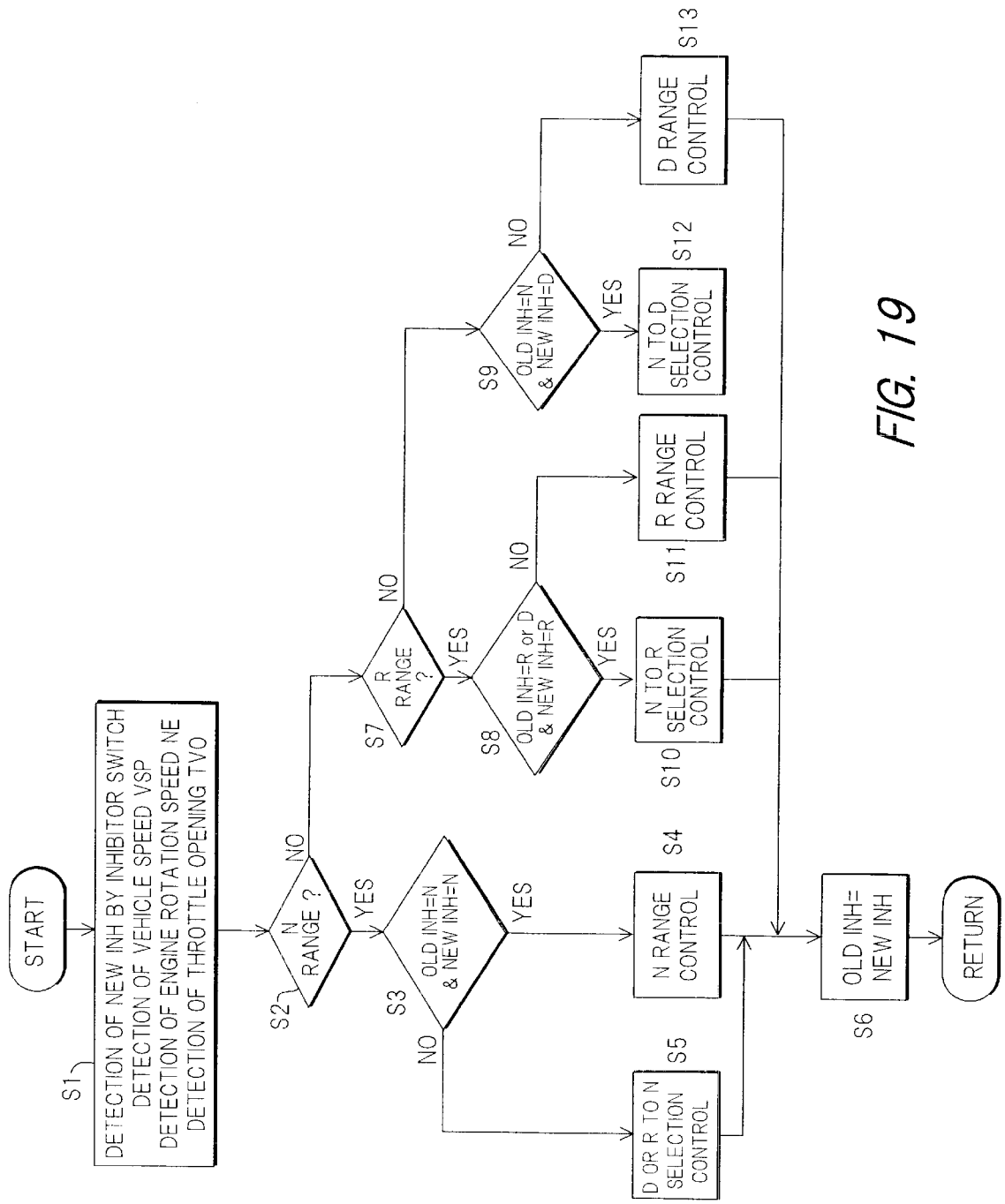
FIG. 19 is a flowchart showing overall selection range control.

FIG. 19 is a flowchart describing the control of the speed change mechanism of the infinite speed ratio continuously variable transmission performed by the speed change control unit 80.

Referring to this flowchart, in a step S1, the present running range is detected from the inhibitor switch 86, and the vehicle speed Vs, engine rotation speed and throttle opening TVO are detected.

In a step S2, it is determined whether or not the running range is the N range. If YES, the routine proceeds to a step S3, if NO, the routine proceeds to a step S7.

In the step S3, it is determined whether or not the running range on the immediately preceding occasion is D or R, and whether or not the present running range is the N range. If YES, the routine proceeds to a step S4, and N range control is performed. If NO, the routine proceeds to a step S5, and selection control is performed from the D range or R range to the N range. The details of this control will be described later. After control is complete, the routine proceeds to a step S6, the running range is stored as the running range on the immediately preceding occasion when control is performed, and control is repeated.

In a step S9, it is determined whether or not the running range on the immediately preceding occasion was N, and the present running range is the D range. If YES, the routine proceeds to a step S12, and selection control from the N range to the D range is performed. If NO, the routine proceeds to a step S13, and D range control is performed. The details of this control will be described later. When control is complete, the routine proceeds to a step S6, the running range is stored as the running range on the immediately preceding occasion when control was performed, and control is repeated.

SELECTION CONTROL FROM D RANGE OR R RANGE TO N RANGE

In this control, when the driver has changed over from a running range, i.e., the D range or R range, to a stop range, i.e., the N range or P range, generation of creep control stops, and the transmitted torque is temporarily inverted. Therefore, the characteristics of the electromagnetic two-way clutch maintaining the torque transmission state are compensated even in the non-energized state, the power circulation transmission path from the engine to the unit output shaft 6 is definitely interrupted, and the running range (N or P range) set by the driver is adopted. The details of this control will now be described based on the flowchart of FIG. 20.

Figure 20:
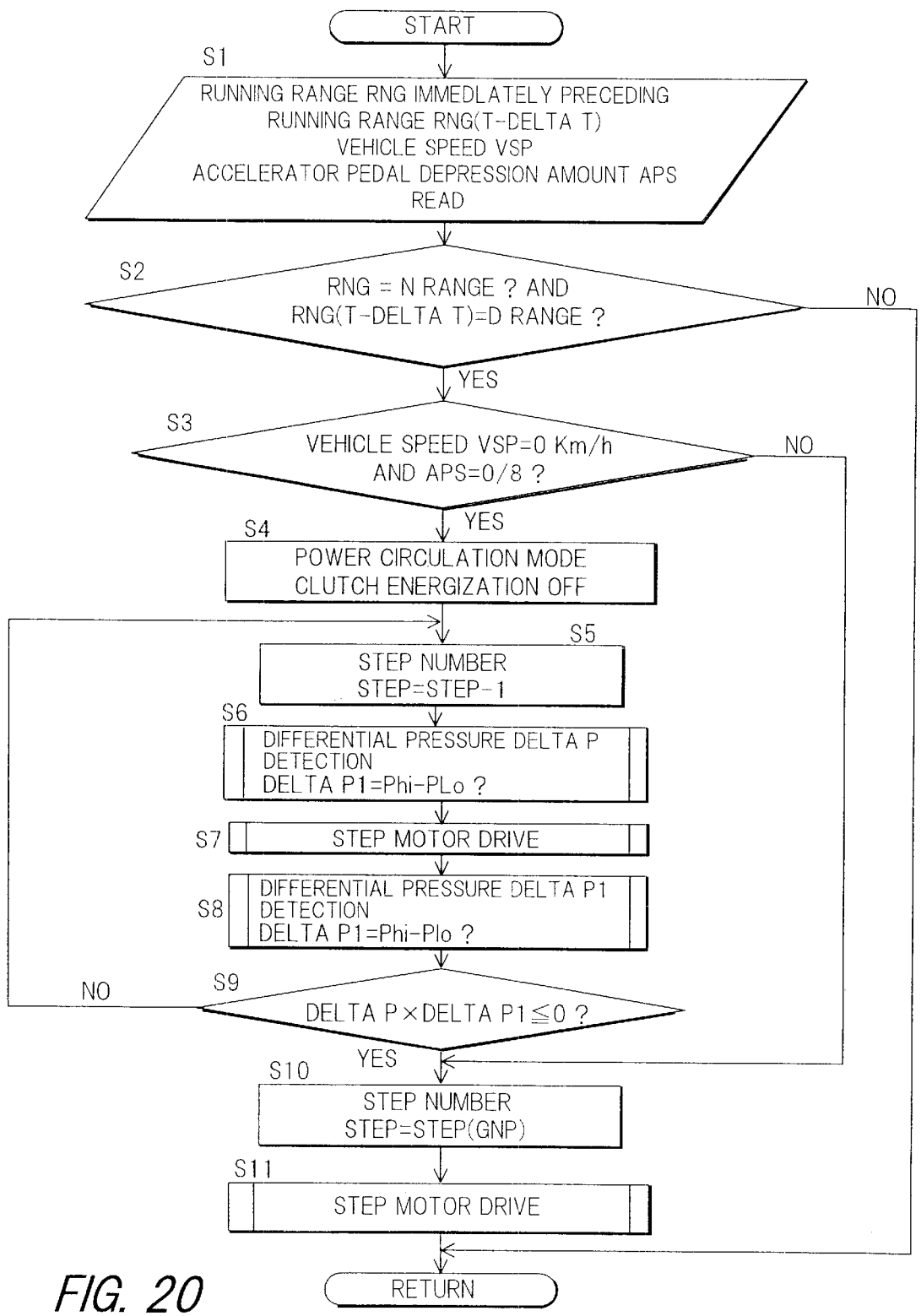
FIG. 20 is a flowchart showing an example of control performed by a speed ratio control unit.

The flowchart of FIG. 20 shows an example of the control performed when there is a change-over from the D range to the N range and the vehicle has stopped. This control is performed at an interval of, for example, 10 msec.

First, in a step S1, the vehicle speed VSP from the vehicle speed sensor 83, running range RNG detected by the inhibitor switch 86, accelerator depression amount ABS from the accelerator depression amount sensor 85, and present running range RNG detected by the inhibitor switch 86, are read. The running range RNG (T−ΔT) on the immediately preceding occasion control was performed is also read.

In a step S2, it is determined whether not the present running range RNG is the N range (or P range) and the running range RNG (T−ΔT) on the immediately preceding occasion control was performed, is the D range. Hence, it can be detected whether the driver changed over the selector lever from the D range to the N range (or P range).

When there was a change-over from the D range to the N range, the routine proceeds to a step S3, and in other cases the routine proceeds to a step S10.

In the step S3, it is determined whether or not the vehicle speed VSP is 0 and the accelerator depression amount APS is 0. If they are both 0, the routine proceeds to a step S4, otherwise the routine proceeds to the step S10.

Next, in the step S4, excitation of the electromagnetic coil of the power recirculation mode clutch 9 is interrupted so that the coil is not energized. To determine the stationary state of the vehicle, it may be determined whether the inverse of the IVT ratio II is 0.

In a step S5, the step number STEP of the step motor 36 is decreased by a predetermined value (herein, 1) from the present value, i.e., $$STEP=STEP-1$$

This is in order to set the differential pressure ΔP of the oil pressure cylinder 40 so that it varies in the positive direction, as shown in FIG. 17.

Specifically, when the vehicle speed VSP=0 Km/h in the D range when the vehicle is stationary, and the creep torque is generated as in the aforesaid Tokugan Hei 11-346178, in FIG. 16, the IVT ratio II is on the Hi (small) side in the forward direction of the GNP at which the IVT ratio II is infinite. Due to this speed change control, the step motor 36 is driven so that the CVT ratio IC is nearer the rotation synchronous point than the GNP. Therefore, the step number STEP is a predetermined position larger than 50=STEP (GNP), as shown in FIG. 17.

By driving the step motor to reduce the CVT ratio IC from the step number STEP which is nearer the rotation synchronous point RSP than the GNP, to less than the step number STEP (GNP) corresponding to the GNP, the differential pressure ΔP is varied in the positive direction.

Specifically, in the power recirculation mode of the D range, as shown also in FIG. 22, the transmitted torque on the drive side passing through the continuously variable transmission 2 is in the negative direction, or in other words, the differential pressure ΔP (=PHi−PLo) supporting the power roller 20 is also negative as shown in FIG. 13 and FIG. 17.

At this time, the running range RNG is changed over to the N range. Although it is not energized, in the power recirculation mode clutch 9, the roller 50 is gripped between the inner race 92 and outer race 91 as shown in FIG. 7 A,B. The power recirculation mode clutch 9 transmits torque from the outer race 91 to the inner race 92, and maintains the state wherein creep torque is generated. Hence, the power recirculation mode clutch 9 is in an engaged state.

Thus, the torque passing through the power recirculation mode clutch 9 is temporarily reversed by reversing the transmitted torque passing through the continuously variable transmission 2.

As the electromagnetic coil 55 is not energized at this time, in FIG. 5A, B, when the torque from the outer race 91 has disappeared, or when it was attempted to transmit torque from the inner race 92 to the outer race 91, the roller 50 returns from the engaged state shown in FIGS. 7A, B to the neutral position shown in FIG. 5A, B due to the pushing force of the switch spring 52. Therefore, the power recirculation mode clutch 9 is disengaged, and hence the step motor 36 is driven so that the differential pressure ΔP temporarily inverts from negative to positive.

Next, in the step S6, the oil pressures PHi, PLo of the oil chambers 40A, 40B detected by the oil pressure sensors 87, 88 shown in FIG. 15 are read, and the differential pressure ΔP at the present time is computed as follows:

$$\Delta P = PHi - PLo$$

In a step S7, the step number STEP calculated in the step S5 is output to drive the step motor 36.

In a step S8, a differential pressure ΔP1 after driving the step motor 36 is calculated from:

$$\Delta P1 = PHi - PLo$$

In a subsequent step S9, the differential pressure ΔP before driving the step motor 36 found in the step S6 is compared with the differential pressure ΔP1 after driving the step motor 36 found in the step S8, and it is determined whether or not the sign of the differential pressure ΔP1 has changed. In this determination, if for example the result of multiplying the differential pressure ΔP and differential pressure ΔP1 is less than 0, it is determined that the sign of the differential pressure ΔP1 has inverted, and the routine proceeds to a step S10. On the other hand, if the sign of the differential pressure ΔP1 has not inverted, the routine returns to the step S5, and the step motor 36 is again driven in the decrease direction of the step number STEP.

In the steps 10, 11 in which the sign of the differential pressure ΔP1 inverted, the step number STEP is returned to the predetermined STEP (GNP)=50 so that the IVT ratio II is the GNP at which the stationary state of the vehicle can be maintained. Therefore, the power recirculation mode clutch 9 is disengaged, the power transmission path from the engine to the unit output shaft 6 is interrupted, and the N range or P range which was set as the running range RNG is definitively realized.

On the other hand, if NO was determined in the determination of the step S2, there has been no change over to the N range, so processing is terminated without modification and creep torque control, not shown, is performed.

Further, if NO was determined in the determination of the step S3, the accelerator pedal was depressed in the N range or P range, so the routine proceeds to the step S10 and the GNP is maintained.

Figure 21:
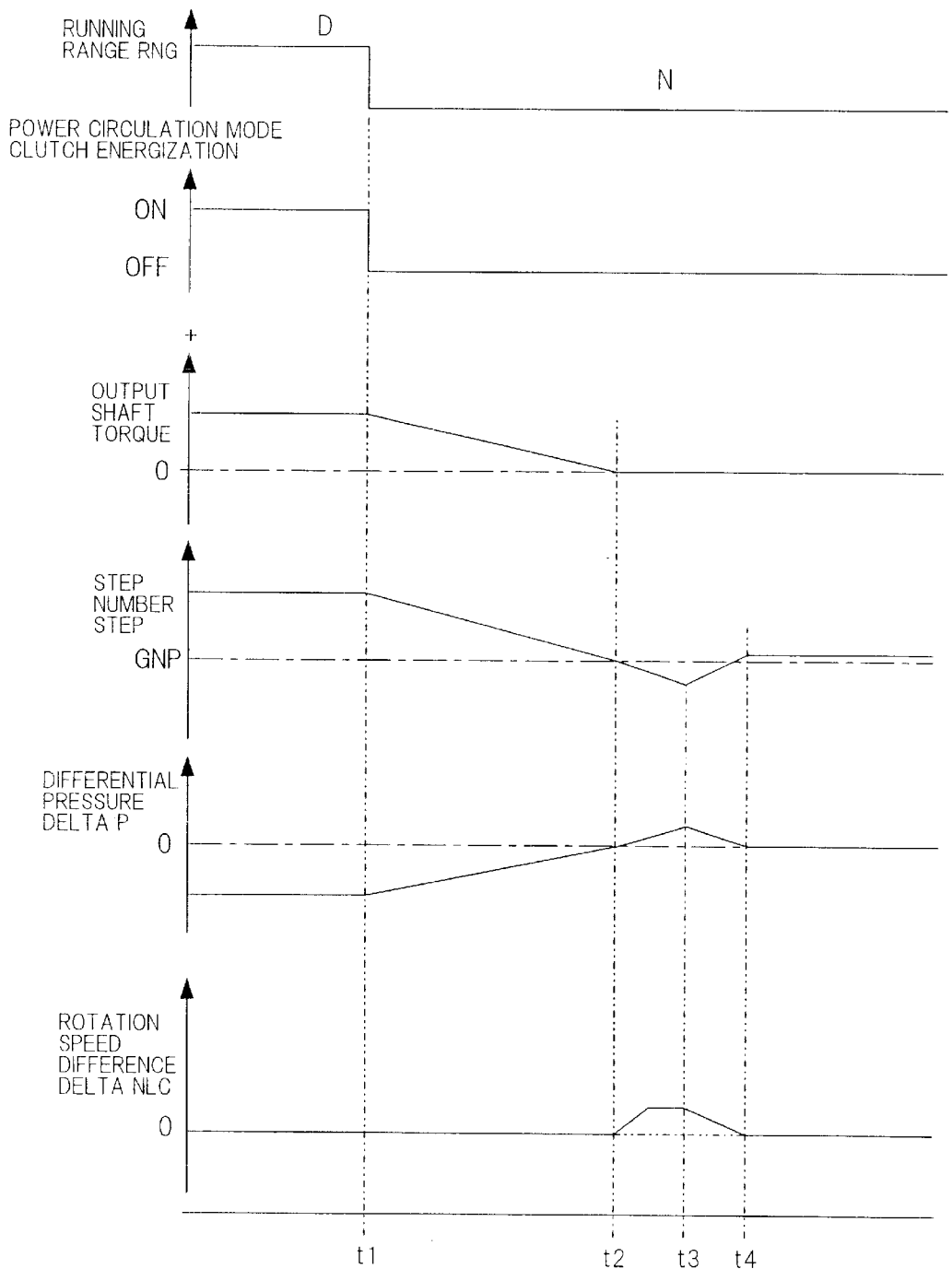
FIG. 21 is a graph showing the variation of running states when there is a change over to the N range after the vehicle stops in the D range, and shows the relation between the running range RNG, power recirculation mode clutch energizing state, output shaft torque, step number STEP of the step motor, differential pressure ΔP of an oil pressure cylinder, and rotation speed difference ΔNLC of an outer race and inner race.

Due to the above control of the steps S1–S11, when there was a change over to the N range or P range after the vehicle stopped in the D range, excitation control of the power recirculation mode clutch 9 and control of the transmitted torque are performed with the timing shown in the graph of FIG. 21. Consequently, the power recirculation mode clutch 9 is disengaged, the power transmission path from the engine to the unit output shaft 6 is interrupted, and the stop range set by the selector lever is implemented.

In other words, after the vehicle has stopped in the D range, the torque transmitted to the unit output shaft 6 (output shaft torque in the diagram) is positive, and a creep torque in the forward direction is generated.

When the selector lever, not shown, changes over from the D range to a stop range, i.e. the N range or P range, at a time t1, the processing of the step S4 and subsequent steps is performed from this time t1. First, excitation of the electromagnetic coil 55 of the power recirculation mode clutch 9 is stopped. Also, to decrease the step motor 36 toward the step number STEP corresponding to the GNP (GNP), the differential pressure ΔP of the oil pressure cylinder 40 is varied from a negative value which transmits torque on the drive side when the vehicle is moving forward in the power recirculation mode, in the positive direction wherein torque on the drive side is not transmitted, as shown in FIG. 17.

At a time t2, the step motor 36 inverts the transmitted torque due to inversion of the differential pressure ΔP from negative to positive via the step number STEP (GNP) corresponding to the GNP, and attempts to transmit torque from the inner race 92 to the outer race 91.

At this time, the power recirculation mode clutch 9 in the non-energized state changes from the engaged state shown in FIG. 7A, B to the disengaged state shown in FIG. 5A, B due to the pushing force of the switch spring 52, as described above, and the gripped roller 50 is released. As a result, the outer race 91 and inner race 92 can rotate relative to one another.

A case will now be described where, due to dimensional errors and assembly errors in manufacture, the differential pressure ΔP does not invert even if the step number STEP (GNP) corresponding to the GNP is obtained. In this case, as shown at the time t3, the step motor 36 is driven to the side lower than the step number STEP (GNF) corresponding to the GNP, the differential pressure ΔP inverts to positive, and the power recirculation mode clutch 9 is definitely disengaged.

After the time t3, the step motor 36 returns so as to obtain the GNP corresponding to a stop range, i.e., the N range or P range. Subsequently, at a time t4, the step number STEP returns to the predetermined step number STEP (GNP)=50 so that the IVT ratio II is the GNP at which the stationary state of the vehicle can be maintained, and the power recirculation mode clutch 9 enters the disengaged state. As a result, when the vehicle is in the vicinity of the GNP, the power transmission path from the engine to the unit output shaft 6 is interrupted, and the N range or P range set by the running range RNG can definitely be realized.

In the flowchart of FIG. 20, the case was described where the vehicle was stopped in the D range, but when it is stopped in the R range, the power recirculation mode clutch 9 can definitely be released when there is a change-over to the N range or P range by performing an identical control. Also, as mentioned above, when the vehicle is reversing in the power recirculation mode, the torque passing through the continuously variable transmission 2 is in the positive direction on the drive side, so the step number STEP may be increased to make the differential pressure ΔP change from positive to negative.

Figure 23:
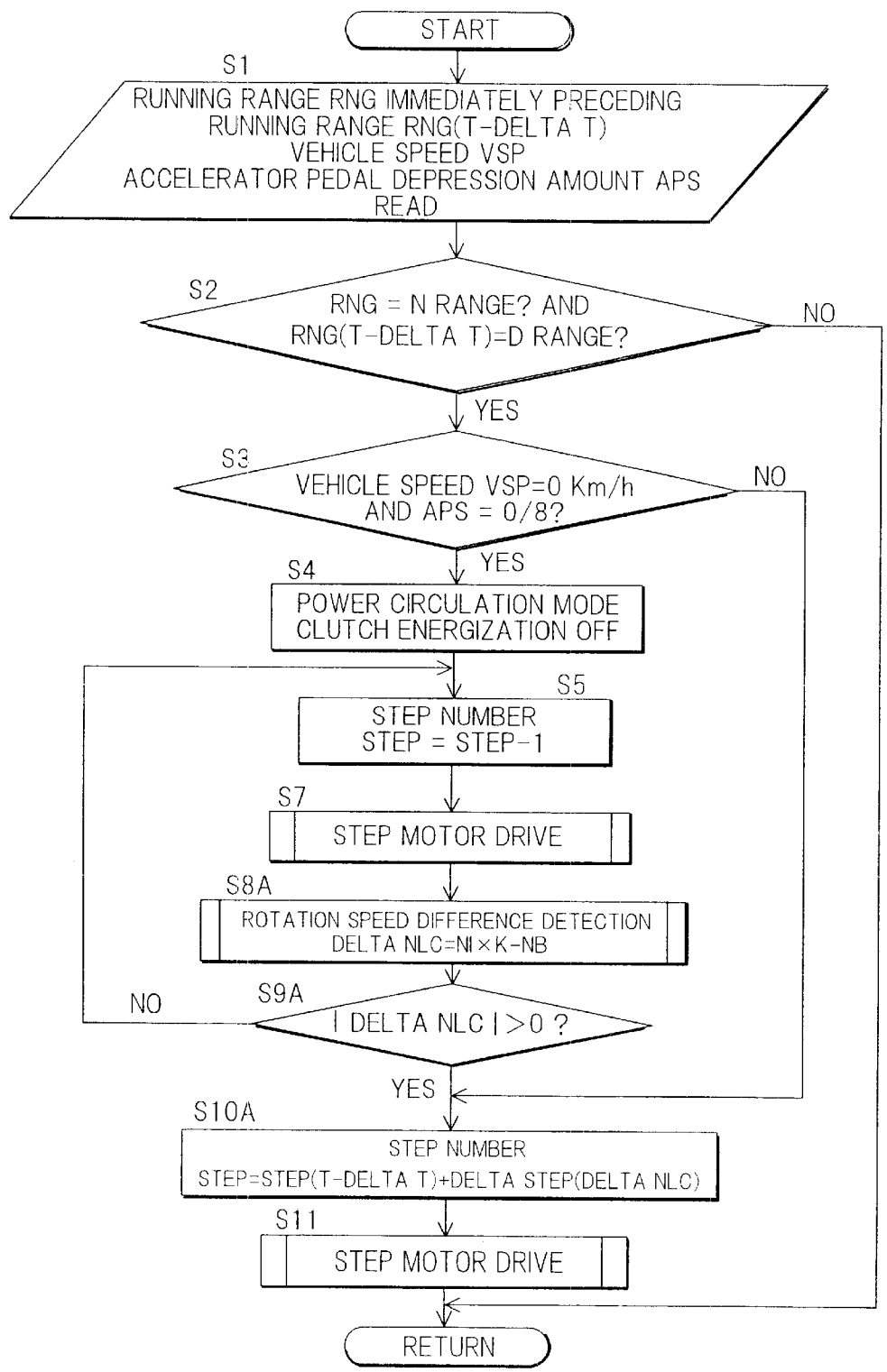
FIG. 23 is a flowchart showing another example of the control performed by the speed change control unit.

FIG. 23 is a flowchart showing another selection control from the D range or R range to the N range. In the flowchart shown in FIG. 20, the part which determines disengagement of the power recirculation mode clutch 9 according to the differential pressure ΔP is based on the rotation speed difference ΔNLC of the outer race 91 and inner race 92. The remaining features are identical to those of the aforesaid flowchart.

The rotation speed of the outer race 91 is identical to the rotation speed of the fixed transmission output shaft 3c, and it may be determined from Ni xk, where Ni is the input shaft rotation speed detected by the input shaft rotation speed sensor 81 and k is the gear ratio of the fixed transmission 3, as shown in FIG. 15. Also, the rotation speed of the inner race 92 is the same as the rotation speed of the carrier 5b of the planetary gear set 5, so the carrier rotation speed Nb detected by the rotation speed sensor 84 may be used as it is, as shown in FI G. 15.

Hence, the rotation speed difference ΔNLC of the outer race 91 and inner race 92 may be computed from:

$$\Delta NLC = Ni \times k - Nb.$$

In FIG. 23, as the steps S1–S7 are respectively identical to those of FIG. 20, the step S8A and subsequent steps will be described.

After driving the step motor 36 in the direction where the transmitted torque inverts when the vehicle is moving forward in the power recirculation mode, in a step S8A, the input shaft rotation speed Ni from the input shaft rotation sensor 81 shown in FIG. 15 and the carrier rotation speed Nb from the rotation speed sensor 84 are read, and the rotation speed difference ΔNLC is computed as described above.

Next, in a step S9A, when the value of this rotation speed difference ΔNLC is not 0, the neutral position where relative rotation of the outer race 91 and inner race 92 is possible, i.e. the disengaged state of the power recirculation mode clutch 9, is determined as shown in FIG. 5, and the routine proceeds to a step S10A. On the other hand, when the rotation speed difference ΔNLC is 0, the roller 50 is gripped between the outer race 91 and inner race 92, it is determined that the clutch is in the engaged state where torque is transmitted from the outer race 91 to the inner race 92, and the routine returns to the step 5. After returning to the step S5, the step motor 36 is again driven in the direction where the transmitted torque is 0.

In steps 10A, 11 where it is determined that the power recirculation mode clutch 9 is in the disengaged state, a step number ΔSTEP (ΔNLC) according to the rotation speed difference ΔNLC is added to the step number STEP (T−ΔT) on the immediately preceding occasion control was performed, the present step number STEP is returned to the step number STEP (GNP) corresponding to the GNP, and processing is terminated.

In this case, after the rotation speed difference ANLC has increased larger than 0 immediately after the time t2 when the transmitted torque inverts from negative, the disengaged state of the power recirculation mode clutch 9 is detected as shown in FIG. 21. Subsequently, at the time t4, the step number STEP is returned to the predetermined step number STEP (GNP)=50 so that the IVT ratio II is the GNP at which the stationary state of the vehicle can be maintained. As a result, when the vehicle stops in the vicinity of the GNP, the motive power transmission path from the engine to the unit output shaft 6 is interrupted, and the N range or P range set by the running range RNG can be definitely implemented.

In the flowchart of FIG. 23, the case was described where the vehicle stops in the D range, but an identical control may be performed when the vehicle stops in the R range. Specifically, when there is a change over to the N range or P range, the power recirculation mode clutch 9 can be definitely disengaged, and when the vehicle is reversing in the power recirculation mode, the torque passing through the continuously variable transmission 2 is on the drive side in the positive direction. Thus, the step number STEP can be increased so that the transmitted torque changes from the negative direction to the positive direction, as described above.

In the aforesaid embodiment, the direct mode clutch was also an electromagnetic two-way clutch, but the direct mode clutch alone may be an oil pressure clutch identical to that of the prior art example.

SELECTION CONTROL FROM N RANGE TO D RANGE OR R RANGE

The control performed when there is selection control from the N range to the D range or R range will now be described referring to the flowchart of FIG. 24. Control of excitation to the electromagnetic coil 55 of the power recirculation mode clutch 9 in the power recirculation mode is performed based on the rotation speed difference before and after the power recirculation mode clutch 9. This flowchart is performed at an interval of, for example, 10 msec.

Figure 24:
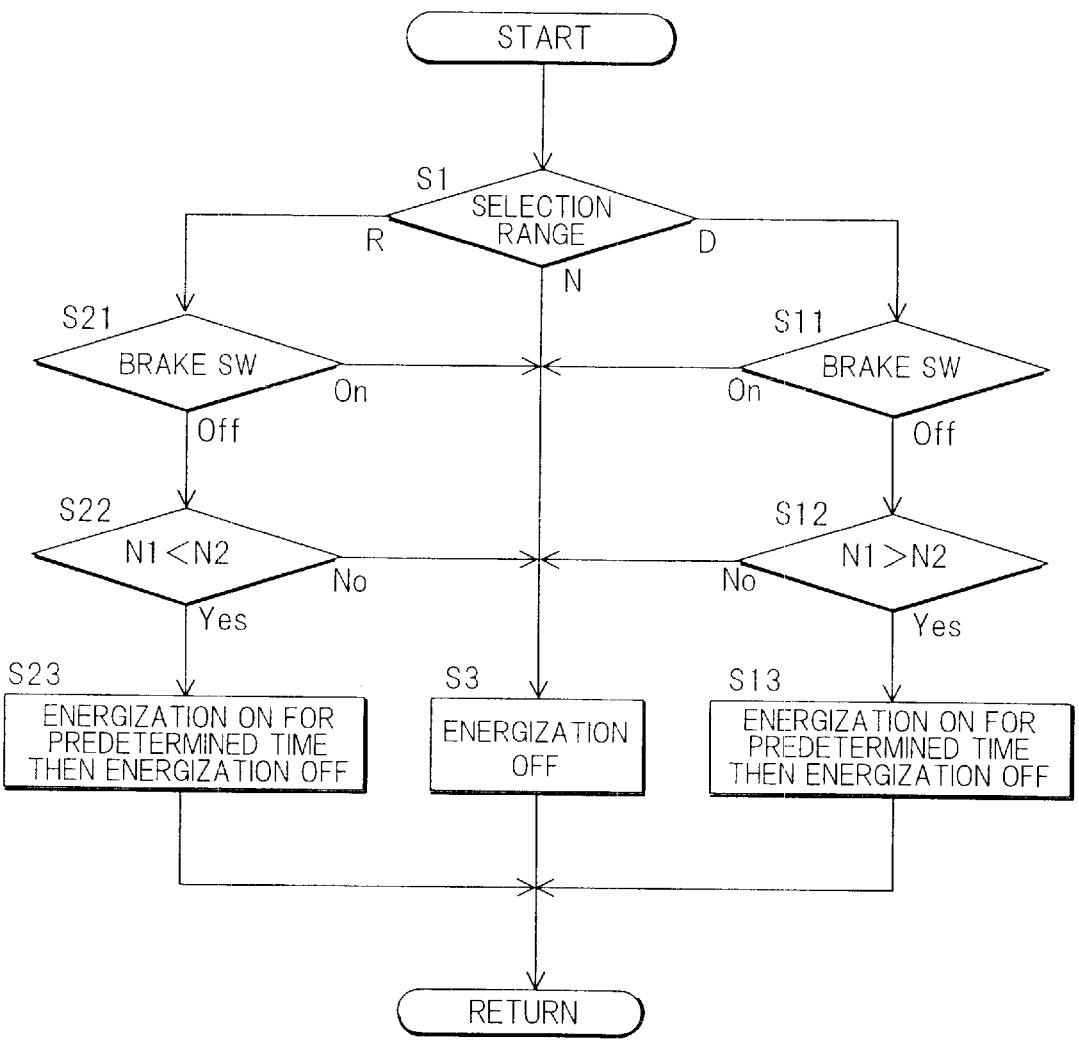
FIG. 24 is a flowchart showing an example of energizing control of the power recirculation mode clutch performed by the speed change control unit.

A rotation speed N1 of the front element (outer race 91) of the power recirculation mode clutch 9 in the flowchart of FIG. 24, is calculated by dividing the rotation speed detected by the input shaft rotation speed sensor 81 (engine rotation speed Ne) by the gear ratio of the fixed transmission 3. For a rotation speed N2 of the rear element (inner race 92) of the power recirculation mode clutch 9, the rotation speed detected by the rotation speed sensor 84 (rotation speed Nb of the carrier 5b) is used. The rotation speed N2 of the rear element (inner race 92) of the power recirculation mode clutch 9 may be calculated by computation from the output shaft rotation speed Nco of the continuously variable transmission output shaft 4 and rotation speed No of the unit output shaft 6.

First, in a step S1, the running range RNG is detected by the inhibitor switch 86. If it is the N range (neutral range), the routine proceeds to the step S3, if it is the D range (forward range), the routine proceeds to a step S1, and if it is the R range (reverse range), the routine proceeds to a step S21.

In the step S3 (neutral range), it is determined that it is not necessary to re-engage the power recirculation mode clutch 9 (continued disengagement of the clutch 9), so the routine is terminated without performing control while the electromagnetic coil 55 remains non-energized (OFF).

When the routine proceeds to the step S11 (forward range), the operating state of the foot brake is detected by a brake switch 90. If the brake is ON (depressed state), the routine proceeds to the step S3, whereas if the brake is OFF (released state), the routine proceeds to a step S12.

In the step S12, the rotation speed N1 of the forward element (outer race 91) and rotation speed N2 of the rear element (inner race 92) of the power recirculation mode clutch 9 are detected or computed, the two are compared, and if N1>N2, the routine proceeds to a step S13, whereas if N1<=N2, the routine proceeds to the step S3.

When the routine proceeds to the step S13, it is determined that it is necessary to re-engage the power recirculation mode clutch 9 (to transmit forward drive torque by engaging the clutch 9 which is in the disengaged state), and the electromagnetic coil 55 is energized for a predetermined time.

Also, when the routine proceeds to the step S21 (reverse range), the operating state of the foot brake is detected by the brake switch 19. If the brake is ON (depressed state), the routine proceeds to the step S3, and if the brake is OFF (released state), the routine proceeds to a step S22.

In the step S22, the rotation speed Ni of the forward element (outer race 91) and rotation speed N2 of the rear element (inner race 92) of the power recirculation mode clutch 9 are detected or computed, the two are compared, and if N1>N2, the routine proceeds to a step S23, whereas if N1<=N2, the routine proceeds to the step S3.

When the routine proceeds to the step S23, it is determined that it is necessary to re-engage the power recirculation mode clutch 9 (to transmit forward drive torque by engaging the clutch 9 which is in the disengaged state), and the electromagnetic coil 55 is energized for a predetermined time.

In the steps 13, 23, if the energizing time of the electromagnetic coil 55 is too short, it may not be possible to engage the clutch 9, and if it is too long, it may not be possible to disengage the clutch 9 if the torque inverts during this time. Therefore, if the time required for engaging is approximately 50 msec, it is set to about 100 msec.

Figure 25:
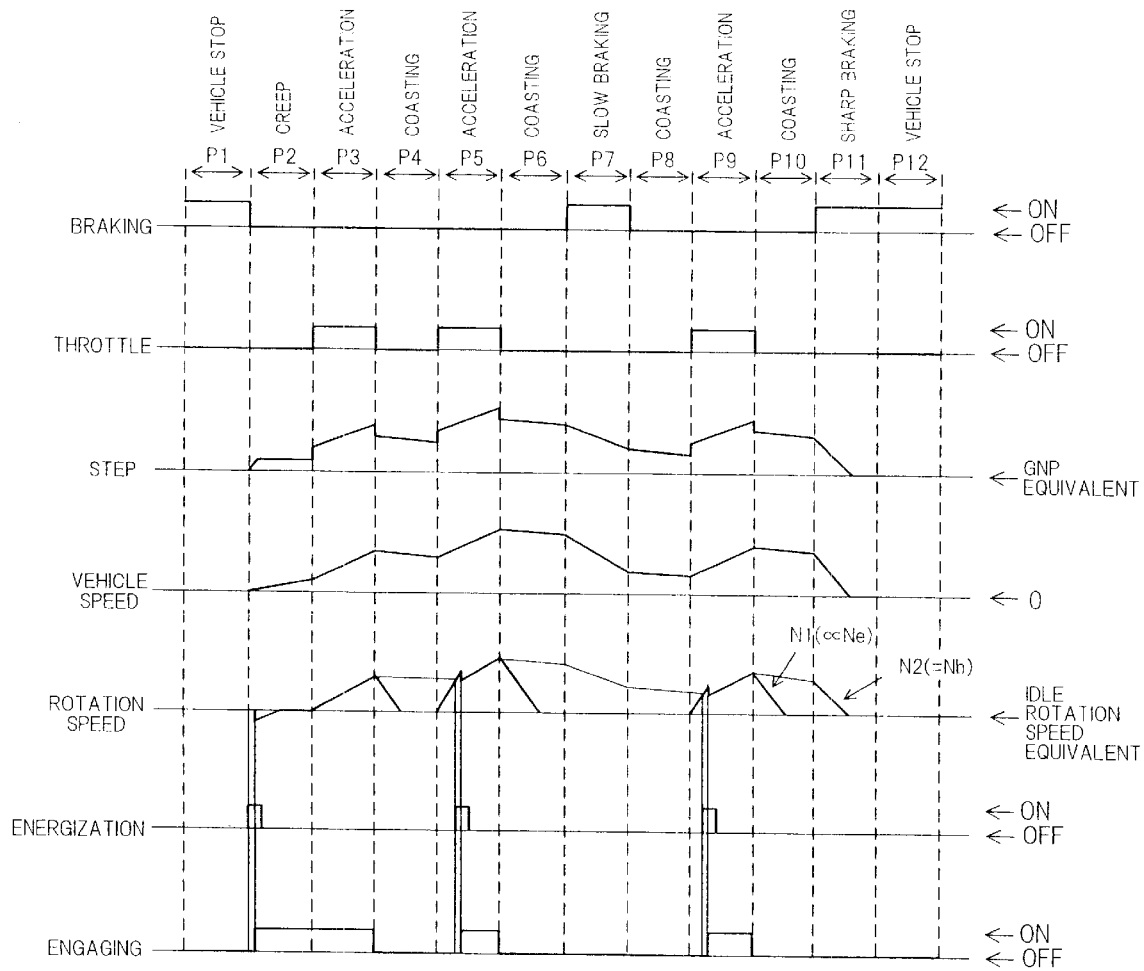
FIG. 25 is a time chart when the vehicle is moving forward in the power recirculation mode.

Next, a time chart when the vehicle is moving forward in the power recirculation mode is shown in FIG. 25.

P1 is a state in the forward range when the brake is depressed and the vehicle is stationary. In this state, the power recirculation mode clutch 9 is not engaged, and the engine rotation speed Ne is an idle rotation speed. Further, the CVT ratio IC of the continuously variable transmission 2 is controlled to a value corresponding to the GNP by the step motor 36.

P2 is a state where the brake is released and the vehicle starts under creep. In this case, by driving the step motor 36 from a step number corresponding to the GNP to the Lo side (forward side) in the instant when the brake is released from the state P1, the continuously variable transmission 2 shifts to the Lo side, and the rotation speed N2 (=rotation speed Nb of the carrier 5b) of the rear element (inner race 92) of the power recirculation mode clutch 9 decreases (due to decrease of the rotation speed of the sun gear 5a). On the other hand, as the rotation speed N1 of the forward element (outer race 91) (approx.=engine rotation speed Ne) of the power recirculation mode clutch 9 is invariant, N1>N2 (step S12 of FIG. 24) is satisfied, and excitation of the power recirculation mode clutch 9 is performed. When the power recirculation mode clutch 9 is engaged, the rotation speeds N1, N2 coincide (as the inertia on the N1 side is smaller than the inertia on the N2 side, N1 decreases), and they return to the original rotation speed due to engine idle rotation speed control. In this engaged state, as the power recirculation mode clutch 9 transmits creep torque, the power recirculation mode clutch 9 is not disengaged even if excitation is stopped.

P3 is a state where the accelerator pedal is depressed and the vehicle accelerates. In this case, the engine rotation speed Ne is controlled based on the accelerator pedal depression amount APS and vehicle speed VSP, and the step motor 36 is driven to obtain the target IVT ratio tII. In this state also, the power recirculation mode clutch 9 transmits drive torque, so the power recirculation mode clutch 9 is retained in the engaged state even if excitation is not performed.

P4 is a state where the accelerator pedal is released and the vehicle is coasting. In this case, the coast state (deceleration state: direction of torque transmitted by power recirculation mode clutch 9 inverts) is obtained in the instant when the accelerator pedal is released, so the power recirculation mode clutch 9 is disengaged, and the rotation speed N1 (∝ engine rotation speed Ne) of the forward element (outer race 91) of the power recirculation mode clutch 9 decreases.

P5 is a state where the accelerator pedal is depressed and the vehicle is again accelerating. In this case, the power recirculation mode clutch 9 is not engaged in the instant when the accelerator pedal was depressed, so the engine rotation speed N1 (∝ engine rotation speed Ne) of the forward element (outer race 91) of the power recirculation mode clutch 9 rises, overtakes the rotation speed N2 of the rear element (inner race 92) of the power recirculation mode clutch 9 at a certain time, and as N1>N2 (step S12 of FIG. 24) is satisfied, excitation of the power recirculation mode clutch 9 is performed. When the power recirculation mode clutch 9 is engaged, the rotation speeds N1, N2 coincide (as the inertia on the N1 side is less than the inertia on the N2 side, N1 decreases), and acceleration starts again. In this state, the power recirculation mode clutch 9 transmits a drive torque, so the power recirculation mode clutch 9 is not disengaged even if excitation is stopped.

P6 is a state where the accelerator pedal is released and the vehicle is coasting, and is identical to P4.

P7 is a state where the vehicle is decelerating on a slow brake. As the brake is ON, the power mode clutch 9 is not energized, and remains disengaged.

P8 is a state where the accelerator pedal is released and the vehicle is coasting, and is identical to P4, P6.

P9 is a state where the accelerator pedal is depressed and the vehicle is accelerating again, and is identical to P5.

P10 is a state where the accelerator pedal is released and the vehicle is coasting, and is identical to P4, P6, P8.

P11 is a state where the vehicle decelerates to rest due to sudden braking.

P12 is identical to P1.

In P2, P5, P9, the engine rotation speed Ne decreases sharply in the instant when the power recirculation mode clutch 9 is engaged, but this difference appears in the interval from when N1>N2 is detected to approximately 50s msec later, and as it is not so large as it appears in the diagram (it is shown emphasized in the diagram), there is practically no engaging shock.

The case of forward motion in the power recirculation mode was described. When the vehicle is reversing, as the direction of the torque transmitted by the power recirculation mode clutch 9 is reversed, in P2, the continuously variable transmission 2 shifts to the Hi side due to the driving of the step motor 36 from the step number corresponding to the GNP to the Hi side (reverse side) in the instant when the brake is released. The rotation speed N2 (=rotation speed Nb of carrier 5b) of the rear element (inner race 92) of the power recirculation mode clutch 9 rises, and when N1<N2 (step S22 in FIG. 24) is satisfied, excitation of the power recirculation mode clutch 9 is performed. In P5, P9, the power recirculation mode clutch 9 is not engaged in the instant when the accelerator pedal is depressed, so due to the rise of the engine speed Ne, the rotation speed N2 of the rear element (inner race 92) of the power recirculation mode clutch 9 overtakes the rotation speed N1 of the front element (outer race 91) of the power recirculation mode clutch 9 at a certain time, and when N1<N2 (step S22 in FIG. 24) is satisfied, excitation of the power recirculation mode clutch 9 is performed.

Thus, an electromagnetic two-way clutch is used for the power recirculation mode clutch 9, and the rotation speeds N1, N2 of the forward/rear elements (outer race 91 inner race 92) of the power recirculation mode clutch 9 are compared. The power recirculation mode clutch 9 is energized and the power recirculation mode clutch 9 is engaged when the vehicle starts under creep (when the brake is released) when the vehicle is moving forward, i.e., N1>N2, or reversing, i.e., N1<N2, and during acceleration, so a suitable creep torque and drive torque can be transmitted when the vehicle starts under creep, accelerates, or re-accelerates, and forward motion or reverse motion are definitively accomplished. As excitation is interrupted when the power recirculation mode clutch 9 is engaged, power consumption can be reduced, and fuel cost-performance is enhanced. Moreover, as the clutch is a two-way clutch, it is unnecessary to provide two one-way clutches for forward motion and reverse motion.

When the vehicle is decelerating, the power recirculation mode clutch 9 is disengaged, so even if for example the step motor 36 returns to the GNP too rapidly, coasting torque is not transmitted and excessive engine braking does not occur.

On the other hand, to prevent the engine rotation speed from decreasing sharply (P2, P5, P9) in the instant when the power recirculation mode clutch 9 is engaged when the vehicle starts under creep (when the brake is released) and when it re-accelerates, it may be attempted to start excitation of the power recirculation mode clutch 9 earlier.

Specifically, in the forward motion range, in the step S12 of FIG. 24, when the rotation speeds N1, N2 of the front/rear elements (outer race 91, inner race 92) of the power recirculation mode clutch 9 shift from N1<=N2-α to N1>N2-α, the routine proceeds to the step S13.

In the reverse motion range, in the step S22 of FIG. 24, when the rotation speeds N1, N2 of the front/rear elements (outer race 91, inner race 92) of the power recirculation mode clutch 9 shift from N1>=N2+α to N1<N2+α, the routine proceeds to the step S23.

By so doing, the power recirculation mode clutch 9 is energized and the power recirculation mode clutch 9 is engaged before drive torque is transmitted, so engaging shocks are definitively prevented.

The permitted rotation speed a may be a constant, but it may also be determined according to the variation rate of the engine rotation speed at that time. Also, excitation of the power recirculation mode clutch 9 is continued for a predetermined time even after N1>N2 when the vehicle is moving forward, and N1<N2 when the vehicle is reversing.

In the aforesaid embodiment, when the power recirculation mode clutch 9 is engaged, the excitation time was controlled using a timer, but the invention is not limited to this arrangement, and instead, the rotation speeds on the side of the outer race 91 and the side of the inner race 92 may respectively be detected or computed, and excitation stopped when the two rotation speeds are identical.

In the aforesaid embodiment, the direct mode clutch 10 was also an electromagnetic two-way clutch, however the direct mode clutch 10 alone may be an oil pressure clutch identical to that of the prior art example.

D RANGE CONTROL

Figure 26:
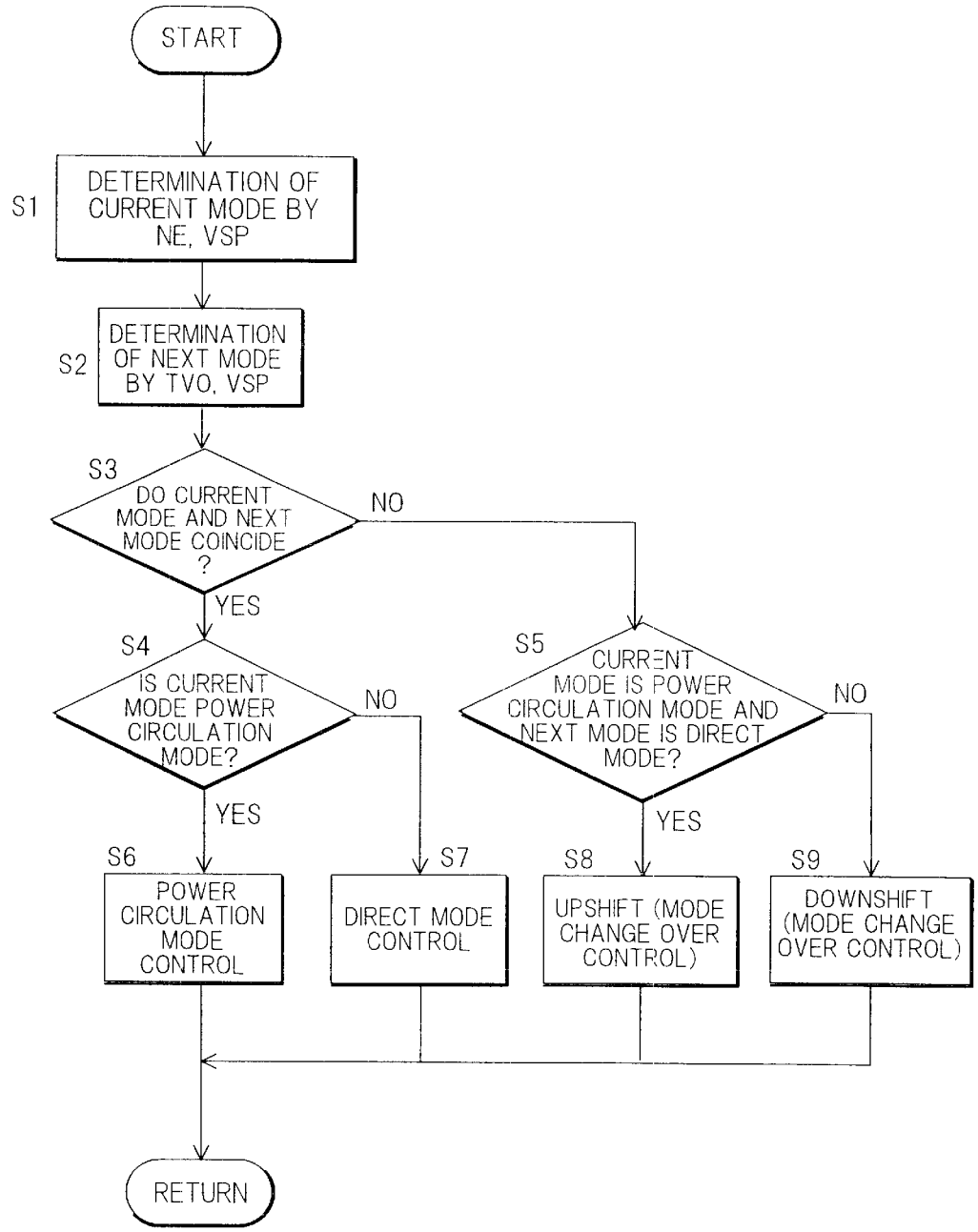
FIG. 26 is a flowchart showing the overall speed change mode control.

The flowchart of FIG. 26 shows an example of the control performed when the vehicle is running in the D range, and it is executed at a predetermined interval, for example 10 msec.

First, in a step S1, the unit input shaft rotation speed N1 (=engine rotation speed Ne) from the input shaft rotation speed sensor 81 and the unit output shaft vehicle speed VSP are read, and the present running mode is determined. Next, in a step S2, the running mode on the next occasion control is performed is determined based on the throttle opening TVO and vehicle speed VSP.

In a step S3, it is determined whether or not the present mode and the subsequent mode coincide. When they coincide, the routine proceeds to a step S4, and when they do not coincide, the routine proceeds to a step S5.

In the step S4, it is determined whether or not the present mode is the power recirculation mode. If YES, the routine proceeds to a step S6, and power recirculation mode control is performed. If NO, the routine proceeds to a step S7, and direct mode control is performed.

In the step S5, it is determined whether or not the present mode is the power recirculation mode, and the next mode is the direct mode. If YES, the routine proceeds to a step S8, and mode change-over up-shift control is performed. If NO, the routine proceeds to a step S9, and mode change-over downshift control is performed.

Next, mode control and mode change-over control will be described in more detail.

1. Power Recirculation Mode Control

Figure 27A:
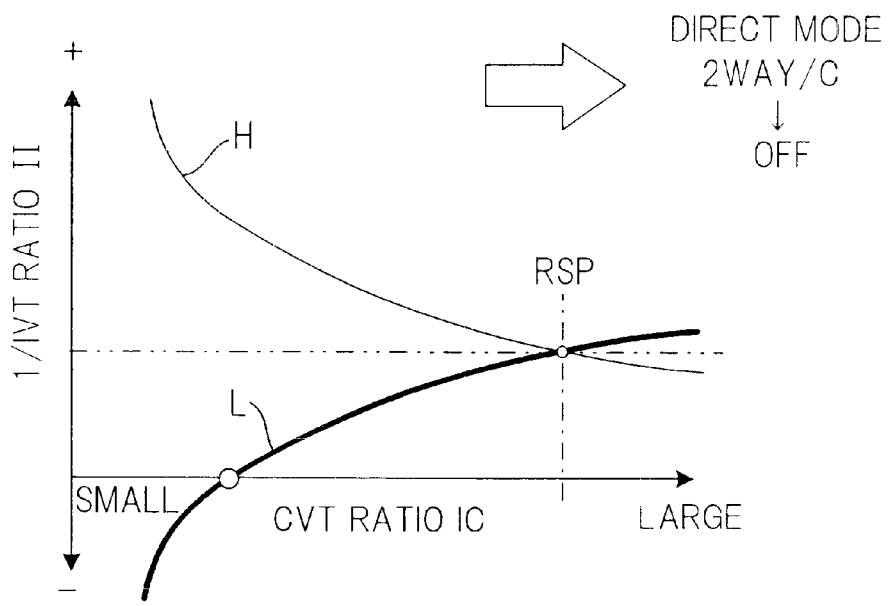
FIGS. 27A and 27B is a characteristic diagram of the inverse 1/II of the IVT ratio II and the CVT ratio IC in the same running mode.

Referring to FIG. 16 and FIG. 27, when the present running mode is the power recirculation mode, the intersection of the real speed ratio 1/rII and real CVT ratio rIC showing the present running state lies on a power recirculation mode line L in FIG. 16, and is as shown in FIG. 27A).

In the case of FIG. 27A, there is no change of running state and the engaged state of the power recirculation mode clutch 9 is maintained, so there is no need for re-excitation, and only speed ratio control of the CVT ratio IC is performed. Specifically, there is no change-over of running mode, so when the drive (acceleration) state is continued or the coasting (deceleration) state is continued, the situation is as in FIG. 27A.

Figure 28A:
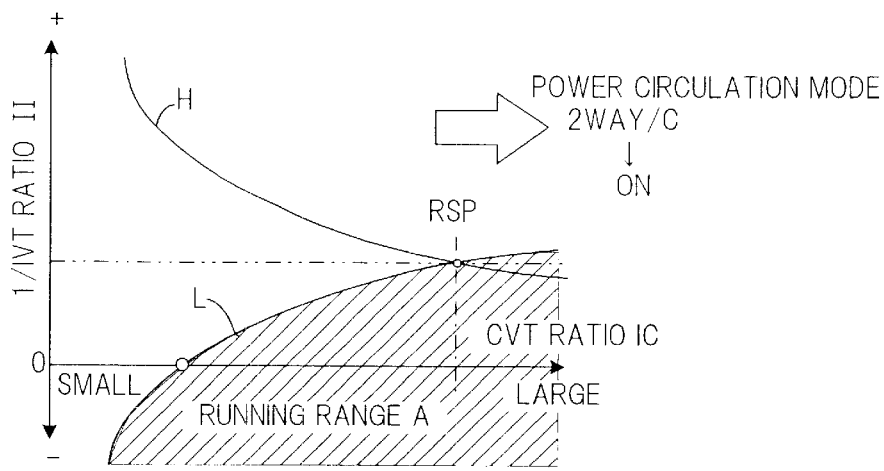
FIGS. 28A–28C shows running regions according to the characteristic diagram of the inverse 1/II of the IVT ratio II and the CVT ratio IC in the same running mode.

On the other hand, when the power recirculation mode clutch 9 is engaged on the coasting side (deceleration side) of the power recirculation mode, the transmitted torque reverses from the engine brake side to the drive side when the accelerator pedal is depressed, for example. At this time, the power recirculation mode clutch 9 is disengaged and the input shaft rotation speed Ni rises, so the operating point corresponding to the aforesaid real speed ratio 1/rII and real CVT ratio rIC lies in a running region A which is lower than the power recirculation mode line L, as shown in FIG. 28A.

In this case, the power recirculation mode clutch 9 is temporarily energized, and again returns to the engaged state. The excitation time for the power recirculation mode clutch 9 may be a short time of, for example, 1 second.

Figure 31:
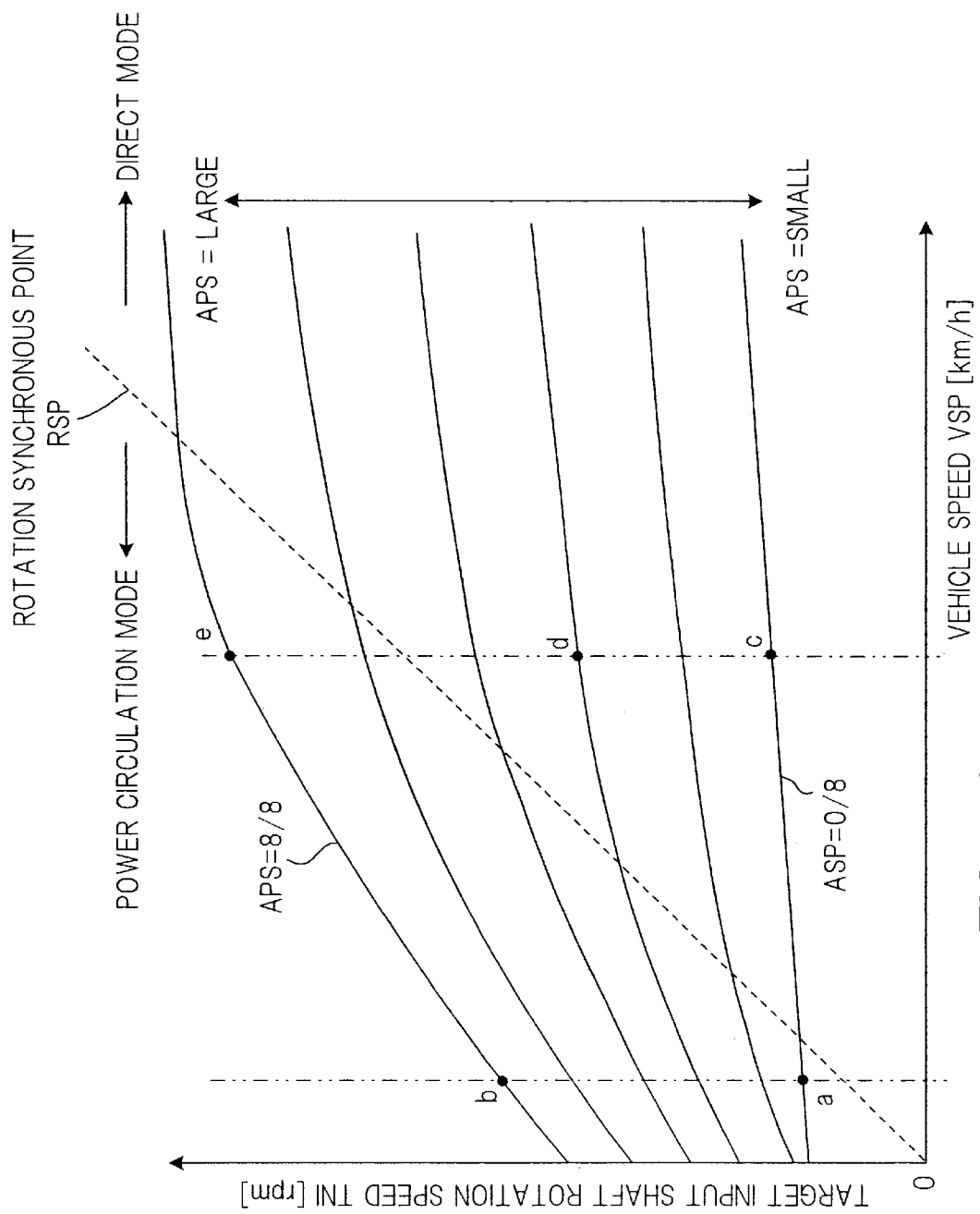
FIG. 31 is a speed change map showing a final target input shaft rotation speed tNi according to a vehicle speed VSP and accelerator pedal depression amount APS.

When the power recirculation mode clutch 9 is engaged on the coasting side of the power recirculation mode, the relation between the vehicle speed VSP, final target input shaft rotation speed tNi and accelerator pedal depression amount APS lies, for example, at a point A in the speed change map of FIG. 31.

When the accelerator pedal is depressed from this state to shift to a point B in FIG. 31, the running state changes from the coasting side to the acceleration side, and the final target input shaft rotation speed tNi (final target engine rotation speed) rises.

Due to the increase of this final target input shaft rotation speed tNi, the final target IVT ratio tII increases, the final target speed ratio 1/tII which is the inverse of this value decreases, the final target CVT ratio tic moves to the low side in the map of FIG. 16, and the step motor 36 is driven to the low side of the CVT ratio IC.

At this time, as torque transmission is reversed, the power recirculation mode clutch 9 in the non-energized state which was engaged on the coasting side, is disengaged, and as the unit input shaft 1a, continuously variable transmission 2 and unit output shaft 6 are independent and free to rotate, the real speed ratio 1/rII moves to the low side according to the rise of engine rotation speed. As a result, the operating point determined by the real speed ratio 1/rII and real CVT ratio rIC lies in the running region A shown in FIG. 28A.

Figure 28B:
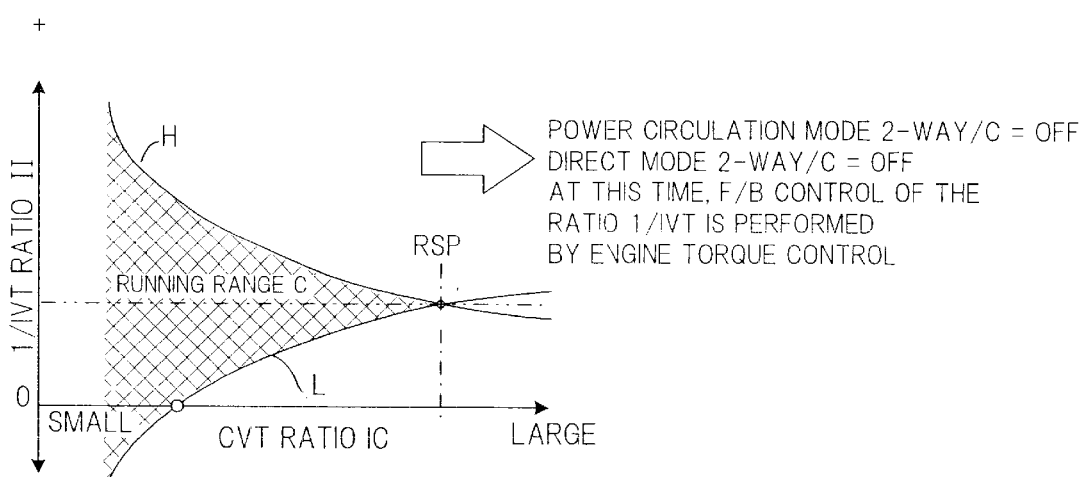

Conversely, when the power recirculation mode clutch 9 is engaged on the drive side (acceleration side) of the power recirculation mode, when the transmitted torque reverses from the drive side to the coasting side (deceleration side) due to release of the accelerator pedal, the power recirculation mode clutch 9 is disengaged, the input shaft rotation speed Ni decreases, and the operating point corresponding to the aforesaid real speed ratio 1/rII and real CVT ratio rIC then lies in a region C between the power recirculation mode line L and direct mode line H, as shown in FIG. 28B.

In this case, neither the power recirculation mode clutch 9 nor the direct mode clutch 10 are energized, and feedback control of the speed ratio 1/II is performed by controlling the engine torque so as to obtain a final speed ratio 1/tII.

When the power recirculation mode clutch 9 is engaged on the drive side of the power recirculation mode, the relation between the vehicle speed VSP, final target input shaft rotation speed tNi and accelerator pedal depression amount APS lies, for example, at the point B in the speed change map of FIG. 31.

When the accelerator pedal is depressed from this state to shift to the point A in FIG. 31, the running state changes from the drive side to the coasting side, and the final target input shaft rotation speed tNi (final target engine rotation speed) decreases.

Due to the decrease of this final target input shaft rotation speed tNi, the final target IVT ratio tII decreases, the final target speed ratio 1/tII which is the inverse of this value increases, the final target CVT ratio tic moves to the high side in the map of FIG. 16, and the step motor 36 is driven to the high side of the CVT ratio IC.

At this time, as torque transmission is reversed, the power recirculation mode clutch 9 in the non-energized state which was engaged on the drive side, is disengaged, and as the unit input shaft 1a, continuously variable transmission 2 and unit output shaft 6 are independent and free to rotate, the real speed ratio 1/rII moves to the high side according to the decrease of engine rotation speed. As a result, the operating point determined by the real speed ratio 1/rII and real CVT ratio rIC lies in the running region C shown in FIG. 28B.

2. Direct Mode Control

Figure 27B:
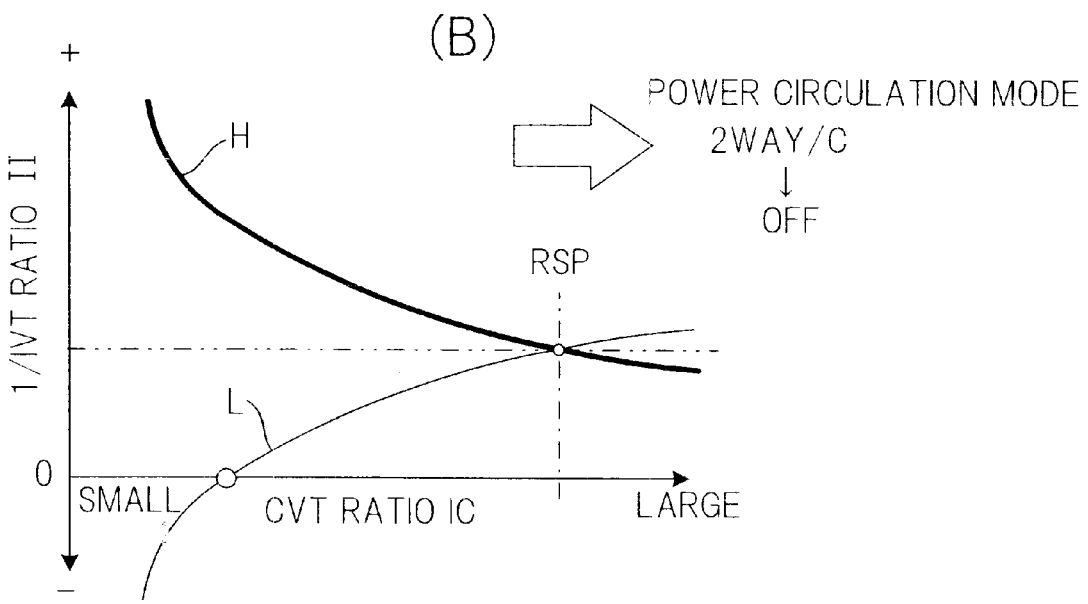

Referring to FIG. 16 and FIG. 27, when the present running mode is the direct mode, the intersection of the real speed ratio 1/rII and real CVT ratio rIC showing the present running state lies on the direct mode line H in FIG. 16, and is as shown in FIG. 27B.

In the case of FIG. 27B, there is no change of running state and the engaged state of the direct mode clutch 10 is maintained, so there is no need for re-excitation, and only speed ratio control of the CVT ratio IC is performed. Specifically, there is no change-over of running mode, so when the drive (acceleration) state is continued or the coasting (deceleration) state is continued, the situation is as in FIG. 27B.

Next, the running regions when the running state changes in the direct mode will be described.

Figure 28C:
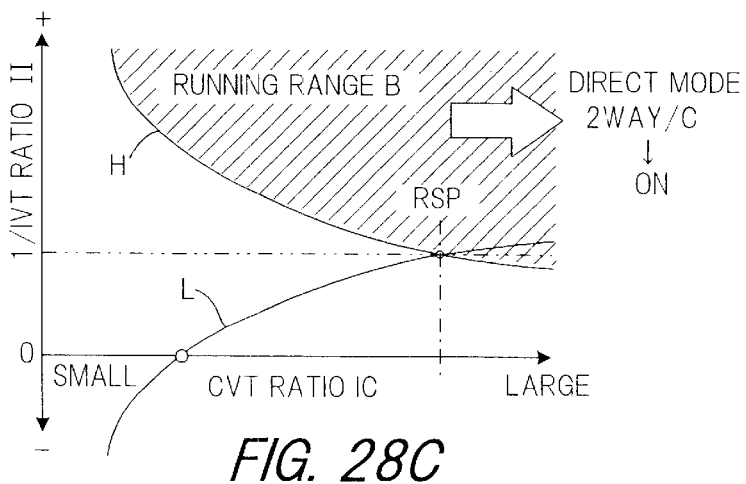

First, when the direct mode clutch 10 is engaged on the drive side (acceleration side) of the direct mode, and the transmitted torque reverses from the drive side to the coasting side (deceleration side) due to release of the accelerator pedal, for example, the direct mode clutch 10 is disengaged and the input shaft rotation speed Ni decreases, so the operating point corresponding to the aforesaid real speed ratio 1/rII and real CVT ratio rIC lies in a running region B above the direct mode line H, as shown in FIG. 28C.

In this case, the direct mode clutch 10 is temporarily energized, and again returns to the engaged state. The energizing time of the direct mode clutch 10 may be a short time such as, for example, one second. When the direct mode clutch 10 is engaged on the drive side of the direct mode, the relation between the vehicle speed VSP, final target input shaft rotation speed tNi and accelerator pedal depression amount APS lies, for example, at a point D in the speed change map of FIG. 31.

When the accelerator pedal is released from this state to shift to a point C in FIG. 31, the running state changes from the drive side to the coasting side, and the final target input shaft rotation speed tNi (final target engine rotation speed) decreases.

Due to the increase of this final target input shaft rotation speed tNi, the final target IVT ratio tII decreases, the final target speed ratio 1/tII which is the inverse of this value increases, the final target CVT ratio tic moves to the low side in the map of FIG. 16, and the step motor 36 is driven to the low side of the CVT ratio IC.

At this time, as torque transmission is reversed, the direct mode clutch 10 in the non-energized state which was engaged on the drive side, is disengaged, and as the unit input shaft 1a, continuously variable transmission 2 and unit output shaft 6 are independent and free to rotate, the real speed ratio 1/rII moves to the high side according to the decrease of engine rotation speed. As a result, the operating point determined by the real speed ratio 1/rII and real CVT ratio rIC lies in the running region B shown in FIG. 28C.

Conversely, when the direct mode clutch 10 is engaged on the coasting side (deceleration side) of the direct mode, when the transmitted torque reverses from the coasting side to the drive side due to depression of the accelerator pedal, for example, the drive mode clutch 10 is disengaged, the input shaft rotation speed Ni rises, so the operating point corresponding to the aforesaid real speed ratio 1/rII and real CVT ratio rIC lies in the running region C between the direct mode line H and power recirculation mode line L, as shown in FIG. 28B.

In this case, neither the power recirculation mode clutch 9 nor the direct mode clutch 10 are energized, and feedback control of the speed ratio 1/II is performed by controlling the engine torque so as to obtain the final speed ratio 1/tII.

When the direct mode clutch 10 is engaged on the coasting side of the direct mode, the relation between the vehicle speed VSP, final target input shaft rotation speed tNi and accelerator pedal depression amount APS lies, for example, at the point C in the speed change map of FIG. 31.

When the accelerator pedal is depressed from this state to shift to the point D in FIG. 31, the running state changes from the coasting side to the drive side, and the final target input shaft rotation speed tNi (final target engine rotation speed) increases. Due to the increase of this final target input shaft rotation speed tNi, the final target IVT ratio tII increases, the final target speed ratio 1/tII which is the inverse of this value decreases, the final target CVT ratio tIC moves to the high side in the map of FIG. 16, and the step motor 36 is driven to the high side of the CVT ratio IC.

At this time, as torque transmission is reversed, the direct mode clutch 10 in the non-energized state which was engaged on the coasting side, is disengaged, and as the unit input shaft 1a, continuously variable transmission 2 and unit output shaft 6 are independent and free to rotate, the real speed ratio 1/rII moves to the low side according to the rise of engine rotation speed. As a result, the operating point determined by the real speed ratio 1/rII and real CVT ratio rIC lies in the running region C shown in FIG. 28B.

Therefore, by comparing the operating point determined by the real speed ratio 1/rII and real CVT ratio rIC, with the power recirculation mode line L and direct mode line H, it is determined whether the running region of the infinite speed ratio of the continuously variable transmission is in any of the running regions A, B, C shown in FIGS. 28A–C when there is no change of running state shown in FIG. 27A, B, i.e., the engaging state of the electromagnetic two-way clutch is determined from the change of running state.

Re-excitation of the electromagnetic two-way clutch or feedback control of the IVT ratio II by controlling the engine torque, is then performed based on the running region.

Specifically, when it is determined that the present running region is A, the power recirculation mode clutch 9 is temporarily energized, the power recirculation mode clutch 9 which was temporarily disengaged due to reverse of transmitted torque is re-engaged, and speed ratio control is performed. Likewise, when it is determined that the present running region is B, the drive mode clutch 10 is temporarily energized, the drive mode clutch 10 which was temporarily disengaged due to reverse of transmitted torque is re-engaged, and speed ratio control is performed.

When it is determined that the present running range is C, neither the direct mode clutch 10 nor the power recirculation mode clutch 9 is energized, and the speed ratio 1/II is feedback controlled to the final speed ratio 1/tII by controlling the engine torque.

When there is no change of running state as shown in FIG. 27A, B, the electromagnetic two-way clutch is engaged in the non-energized state, so only speed ratio control is performed without performing excitation.

3. Mode Change-Over Control (Up-shift)

Next, up-shift will be described when a change over of running mode is performed.

Figure 29A:
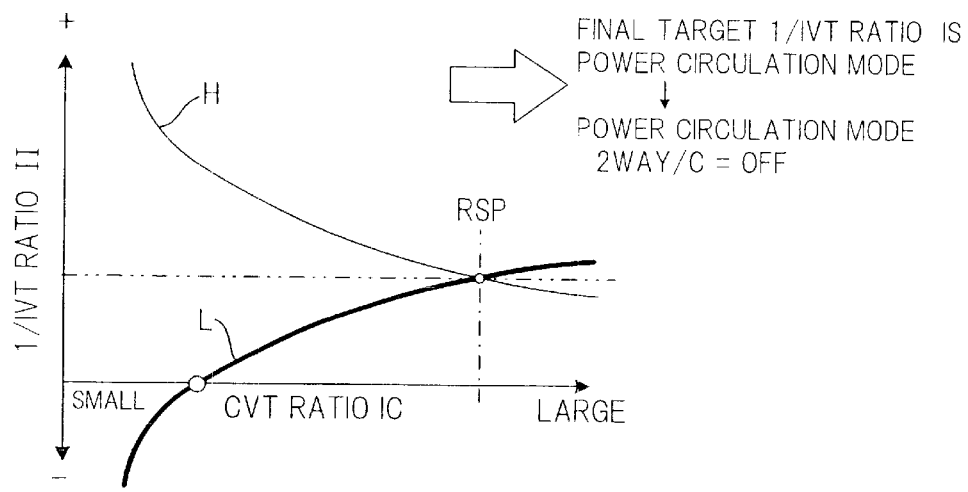
FIGS. 29A and 29B is a characteristic diagram of the inverse 1/II of the IVT ratio II and the CVT ratio IC when there is a change over to the direct mode.

When the electromagnetic two-way clutch is in the engaged state, if the operating point corresponding to the real speed ratio 1/rII and real CVT ratio rIC is plotted on the map of FIG. 16, when the present running mode is the power recirculation mode, this operating point is situated on the power recirculation mode line L in FIG. 16, as shown by FIG. 29A.

FIG. 29A shows the case where the change-over of running mode is performed in a constant running state. After the electromagnetic two-way clutch on the change-over side is temporarily energized at the rotation synchronous point RSP shown in FIG. 16, the engaged state is maintained so there is no need for re-excitation, and only speed ratio control of the CVT ratio IC is performed without performing excitation.

Specifically, in the case where the accelerator pedal depression amount APS is constant, and an auto-up is performed wherein the running mode is changed over from the power recirculation mode to the direct mode, when the rotation synchronous point RSP is reached (in the running region B described later) from the state of FIG. 29A, after the direct mode clutch 10 is temporarily energized, there is again a shift to the state of FIG. 29B which is a non-energized state.

Figure 30A:
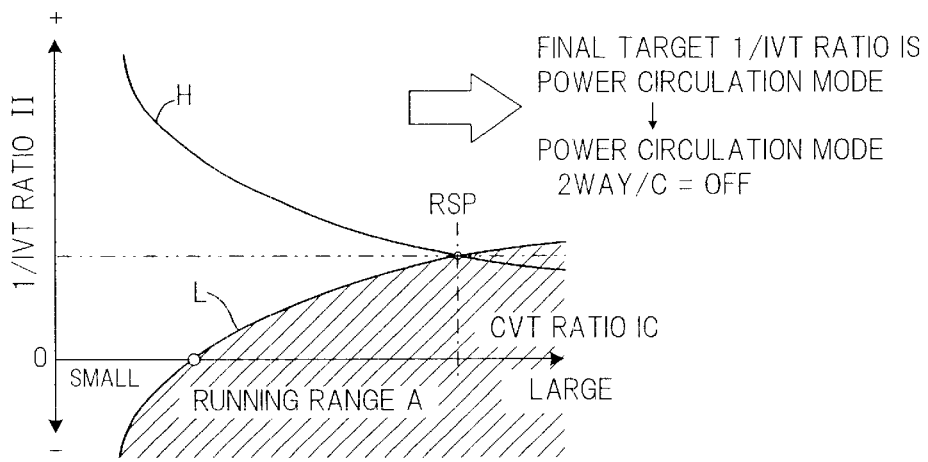
FIGS. 30A–30C shows running regions according to the characteristic diagram of the inverse 1/II of the IVT ratio II and the CVT ratio IC when there is a change-over of running mode.
Figure 30B:
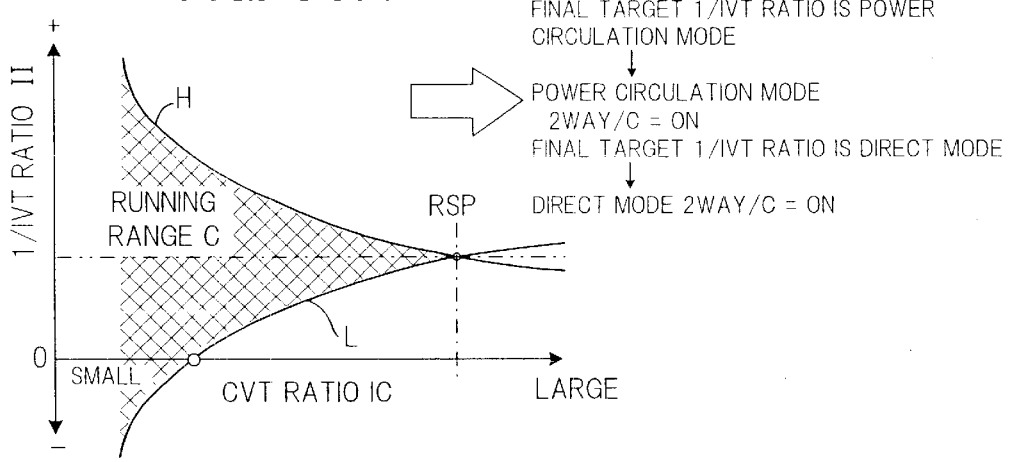

Next, as shown in FIG. 30B, when the operating point corresponding to the real speed ratio 1/rII and real CVT ratio rIC lies between the power recirculation mode line L and direct mode line H, it is determined that the running region is C.

In the case of this running region C, if the final target speed ratio 1/tII is the power recirculation mode, the power recirculation mode clutch 9 is energized and engaged, whereas if the final target speed ratio 1/tII is the direct mode, the direct mode clutch 10 is energized and engaged.

Figure 30C:
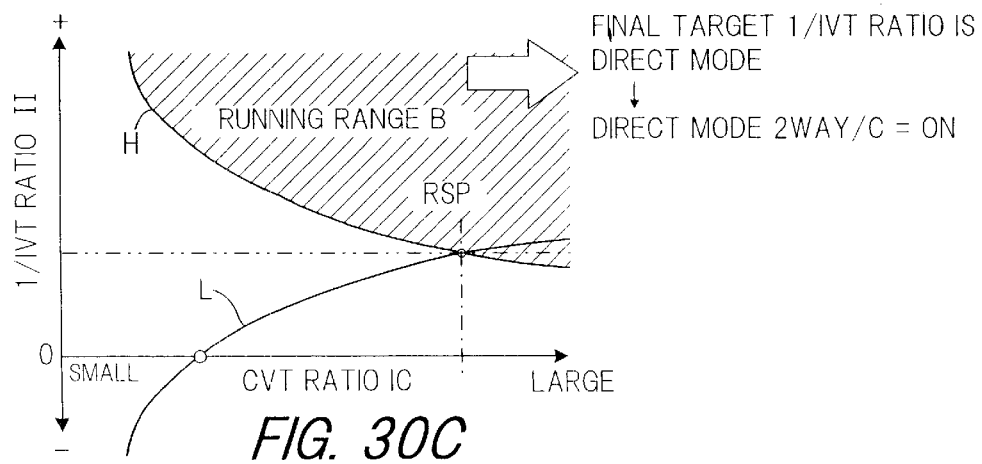

Further, as shown in FIG. 30C, when the operating point corresponding to the real speed ratio 1/rII and real CVT ratio rIC lies above the direct mode line H, it is determined that the running region is B.

In the case of this running region B, if the final target speed ratio 1/II is the direct mode, the direct mode clutch 10 is energized and engaged.

In this way, by first setting the running regions A–C and excitation state of the two-way clutch as a map in addition to the power recirculation mode line L and direct mode line H, the engaging state of the electromagnetic two-way clutch can easily be controlled according to variation of the running state.

4. Mode Change-over (Down-shift)

Next, down-shift will be described when a change over of running mode is performed.

Figure 29B:
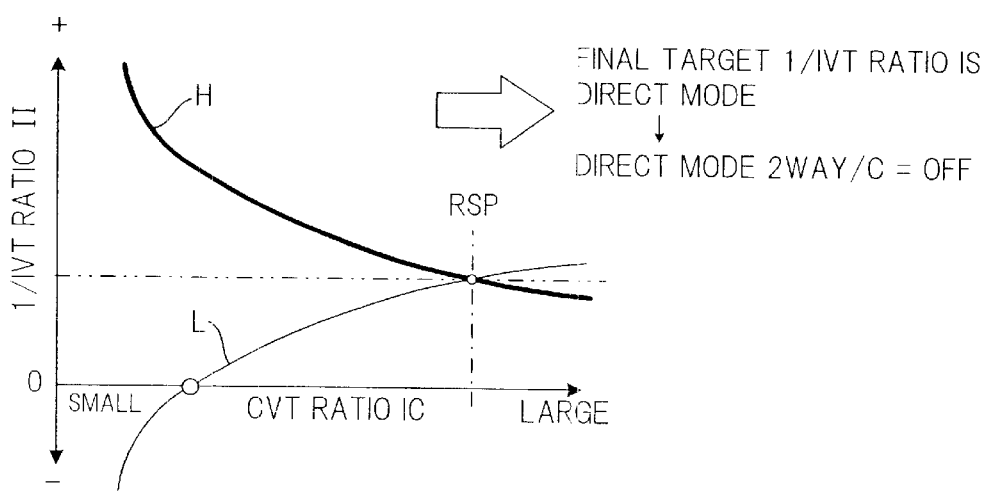

When the electromagnetic two-way clutch is in the engaged state, if the operating point corresponding to the real speed ratio 1/rII and real CVT ratio rIC is plotted on the map of FIG. 16, when the present running mode is the power recirculation mode, this operating point is situated on the direct mode line H in FIG. 16, as shown by FIG. 29B.

FIG. 29B shows the case where the change-over of running mode is performed in a constant running state. After the electromagnetic two-way clutch on the change-over side is temporarily energized at the rotation synchronous point RSP shown in FIG. 16, the engaged state is maintained so there is no need for re-excitation, and only speed ratio control of the CVT ratio IC is performed without performing excitation.

Specifically, in the case where the accelerator pedal depression amount APS=0 (release state), and a coast down is performed wherein the running mode is changed over from the direct mode to the power recirculation mode, when the rotation synchronous point RSP is reached (in the running region A described later) from the state of FIG. 29B, after the power recirculation mode clutch 9 is temporarily energized, there is again a shift to the state of FIG. 29A which is a non-energized state.

On the other hand, as shown in FIG. 30A, when the operating point corresponding to the real speed ratio 1/rII and real CVT ratio rIC lies below the power recirculation mode line L, it is determined that the running region is A.

In the case of this running region A, if the final target speed ratio 1/tII is the power recirculation mode, the power recirculation mode clutch 9 is temporarily energized and engaged. The energizing time of the power recirculation mode clutch 9 may be a short time such as, for example, one second.

In this way, by first setting the running regions A–C and excitation state of the two-way clutch as a map in addition to the power recirculation mode line L and direct mode line H, the engaging state of the electromagnetic two-way clutch can easily be controlled according to variation of the running state.

5. Functions and Advantages

Next, the functions and advantages of the aforesaid control will be described.

Figure 32:
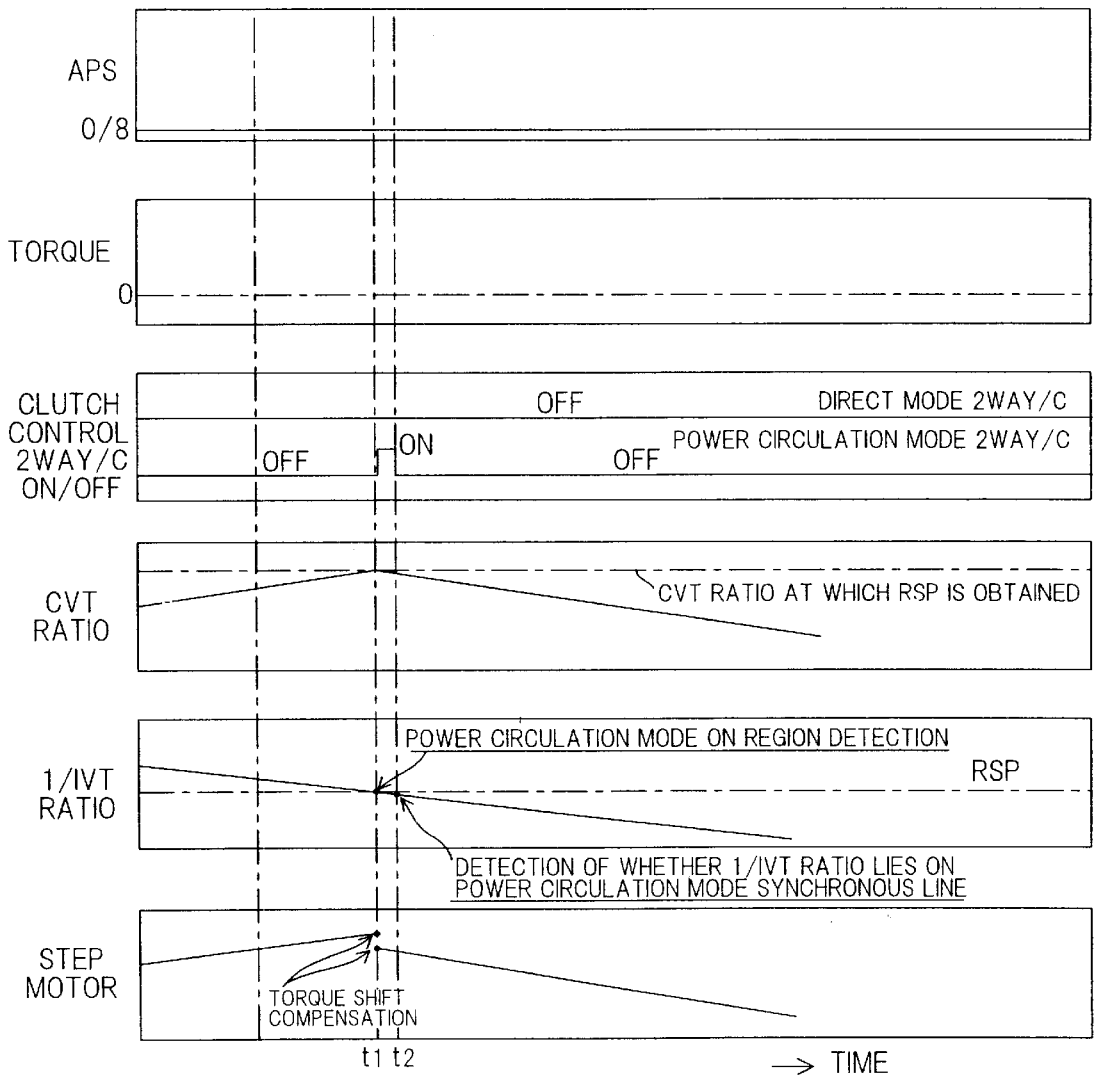
FIG. 32 is a graph when the vehicle is coasting, showing a relation between the accelerator pedal depression amount APS, torque, clutch energizing state, CVT ratio, 1/IVT ratio, step number of the step motor and time.

First, FIG. 32 shows the case where the accelerator pedal is effectively in a released state, and a coast-down (power OFF downshift) is performed wherein there is a downshift from the direct mode to the power recirculation mode.

Due to the decrease of the vehicle speed VSP, the real speed ratio 1/II decreases, and the CVT ratio IC increases towards the value corresponding to the rotation synchronous point RSP. At this time, the final target speed ratio 1/tII is set to the power recirculation mode according to the accelerator pedal depression amount APS and vehicle speed VSP.

Up to the time 1/tII in FIG. 32, neither the direct mode 10 nor power recirculation mode 9 is energized, and the direct mode clutch 10 is engaged.

At the time t1, the real speed ratio 1/rII is less than the value corresponding to the rotation synchronous point RSP, and as the operating point determined from the real speed ratio 1/rII and real CVT ratio rIC lies within the running region A shown in FIG. 30A, the power recirculation mode 9 is energized and engaged as described above. At the time when the power recirculation mode clutch 9 is engaged, the direction of the transmitted torque is reversed, so the direct mode clutch 10 which was engaged without excitation, is disengaged.

At this time t1, in the toroidal continuously variable transmission 2, the direction of the transmitted torque reverses, so the direction of the torque shift also reverses, the torque shift compensation amount varies and the real CVT ratio rIC does not change, but the step number of the step motor 36 varies according to the variation amount of the torque shift compensation amount.

Next, at a time t2 in FIG. 32, the operating point determined by the real speed ratio 1/rII and real CVT ratio rIC is situated on the power recirculation mode line L as shown in FIG. 29A, and therefore the power recirculation mode clutch 9 is again not energized.

Therefore, the power recirculation mode clutch 9 is temporarily energized for a short time (e.g., 1 sec) from the time t1 to t2, and engaging can be completed.

Hence, by setting the running regions and excitation state of the electromagnetic two-way clutch in the maps of FIG. 29, FIG. 30, the electromagnetic two-way clutch which is energized can easily be determined by the final target speed ratio 1/tII merely by detecting the running region of the operating point determined by the real speed ratio 1/rII and real CVT ratio rIC, and optimum control of the excitation timing can be performed according to the speed change state.

Next, the case will be described when a depression downshift (power ON downshift) is performed without change-over of running mode after the power recirculation mode is changed over to the direct mode due to foot release up-shift (power OFF up-shift) in FIG. 33.

Figure 33:
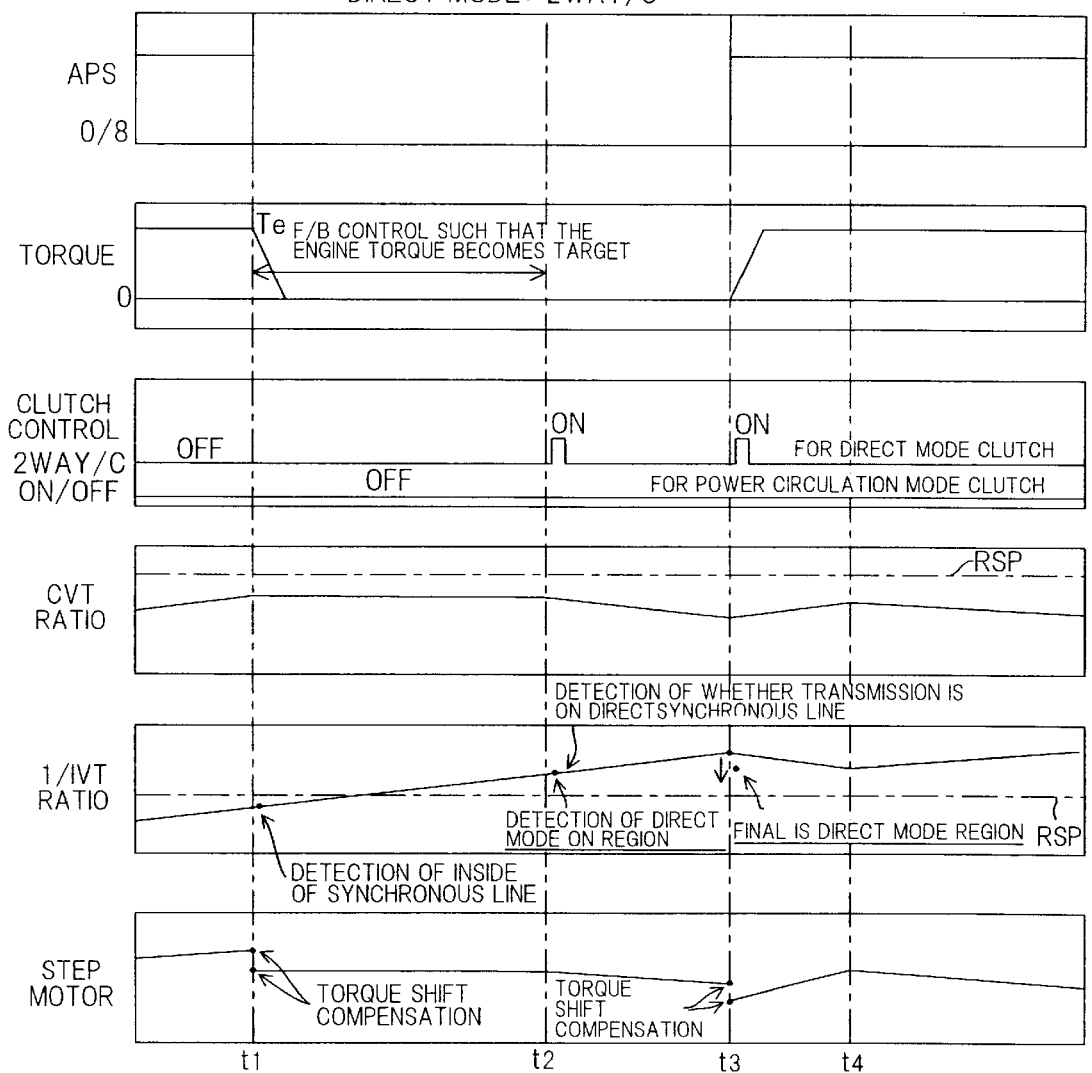
FIG. 33 is a graph from foot release shift-up to depression downshift, showing a relation between the accelerator pedal depression amount APS, torque, clutch energizing state, CVT ratio, 1/IVT ratio, step number of the step motor and time.

First, at the time t1 in FIG. 33, when the vehicle is running in the power recirculation mode, the driver releases the accelerator pedal and shifts from the drive state to the coasting state.

Due to this variation of running state, as the torque passing through the power recirculation mode clutch 9 reverses, the power recirculation mode clutch 9 which was engaged in the non-energized state, is disengaged and the engine rotation speed decreases due to the release of the accelerator pedal, so the real speed ratio 1/rII apparently increases.

Specifically, up to the time t1, the real speed ratio 1/rII and real CVT ratio rIC vary along the power recirculation mode line L in FIG. 16, but from the time t1 at which the power recirculation mode clutch 9 is disengaged, the real speed ratio 1/rII tends to vary towards the upper part of FIG. 16.

When the real speed ratio 1/rII shifts to the upper part of the figure in this way, the engine, not shown, is racing and an up-shift is performed, so to prevent this engine racing of the engine, the speed change control unit 80 sends a request torque TRQ to the engine control unit 89, and the input torque is limited to restrict the racing of the engine (time t1–t2).

From the time t1 to the time t2, the running range determined by the real speed ratio 1/rII and real CVT speed ratio rIC is C, and the two electromagnetic two-way clutches are both disengaged.

At the time t2 when the real speed ratio 1/rII rises to the running region B of FIG. 30C, the direct mode clutch 10 is energized and engages.

Immediately after the direct mode clutch 10 is engaged, at the operating point determined by the real speed ratio 1/rII and real CVT ratio rIC, it coincides with the direct mode line H, and therefore immediately enters the non-energized state. As a result, the direct mode clutch 10 is temporarily energized at the time t2, and changes over to the direct mode.

Next, at the time t3 in FIG. 33, the driver again depresses the accelerator pedal, and the running state changes from the coasting state to the drive side. However, at this time, the final target speed ratio 1/tII does not produce a change-over of running mode in the direct mode.

At the time t3, the direction of transmitted torque reverses due to this change of running state, so the direct mode clutch 10 which was engaged, disengages. Therefore, from this time t3, the direct mode clutch 10 is temporarily energized, and the engaged state is maintained.

From the time t4, the vehicle speed VSP increases due to increase of the drive torque and there is a change to an up-shift, but as the direction of the transmitted torque does not change, the direct mode clutch 10 maintains the engaged state and torque transmission can be performed.

Next, the case will be described where, after there is a change-over of running mode from the direct mode to the power recirculation mode due to a depression downshift (power ON downshift) in FIG. 34, an auto-up speed change (power OFF up-shift) is performed due to increase of the vehicle speed VSP.

Figure 34:
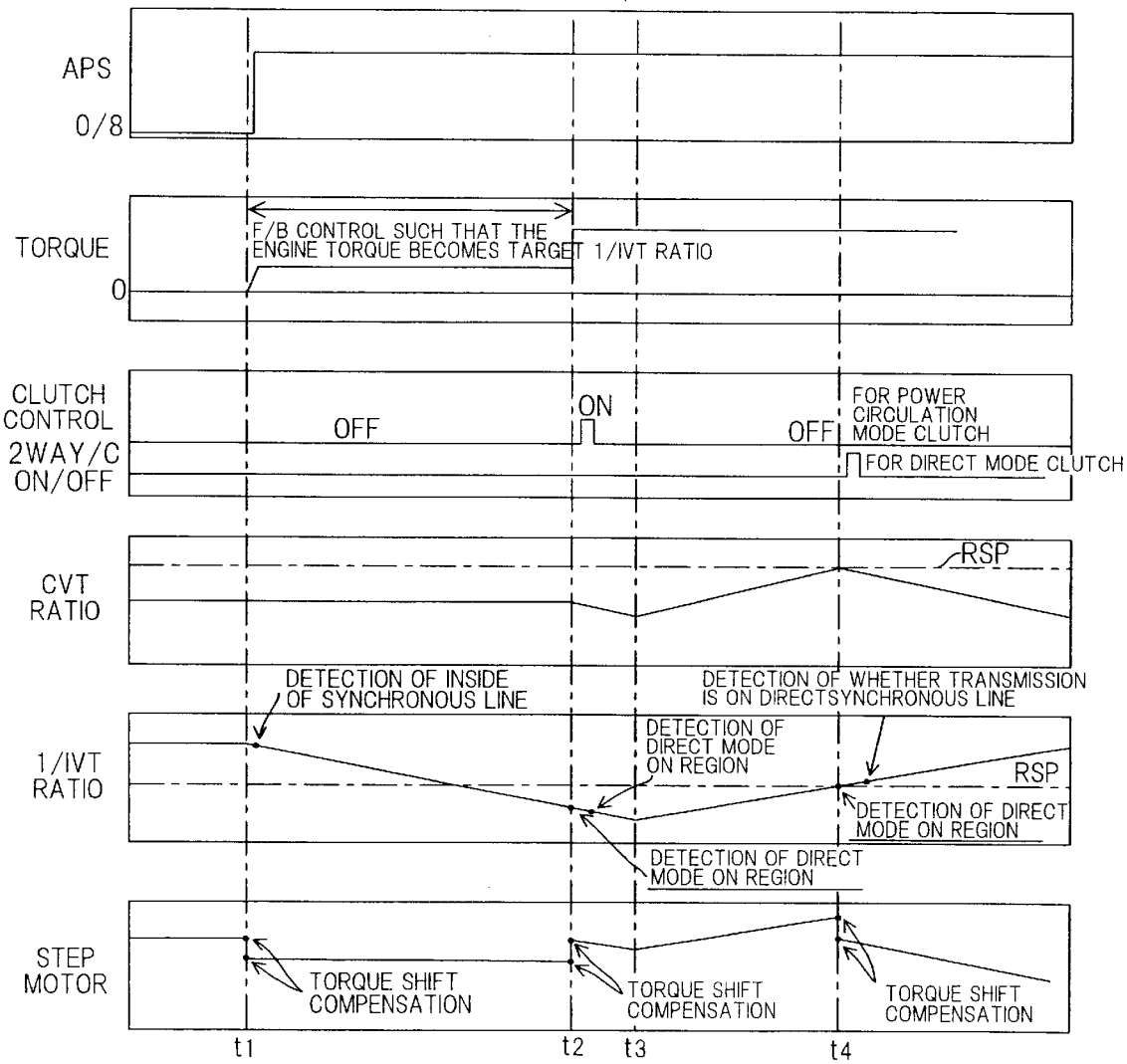
FIG. 34 is a graph from depression downshift to auto-up, showing a relation between the accelerator pedal depression amount APS, torque, clutch energizing state, CVT ratio, 1/IVT ratio, step number of the step motor and time.

First, at the time t1 in FIG. 34, in the coasting state of the direct mode, the driver depresses the accelerator pedal to accelerate the vehicle, the direction of transmitted torque reverses and the direct mode clutch 10 is disengaged, while the step motor 36 also reverses the direction of torque shift, so the torque shift compensation amount is reversed.

From the time t1 to the time t2, in the state where both the direct mode clutch 10 and power recirculation mode clutch 9 are disengaged, the accelerator pedal is depressed, so the engine rotation speed rises on the racing, and the real speed ratio 1/rII apparently undergoes a downshift. During this interval, the vehicle is in the running region C of FIG. 30B, the engine torque is controlled, and the speed ratio is controlled to obtain a predetermined IVT ratio.

At the time t2, the operating point determined by the real speed ratio 1/rII and real CVT ratio rIC is in the running region A of FIG. 30A, the power recirculation mode clutch 9 is energized and engaged, and there is a change over to the power recirculation mode. Excitation of the power recirculation mode clutch 9 is only temporary until the operating point of the real speed ratio 1/rII and real CVT ratio rIC coincides with the power recirculation mode line L, and subsequently, the clutch is in the state shown in FIG. 29A and not energized.

From the time t3, the transmission changes to up-shift according to the increase of the vehicle speed VSP, and at the time t4, as the vehicle enters the running region B of FIG. 30C, the power recirculation mode clutch 10 is energized and there is a change-over from the power recirculation mode to the direct mode. Excitation of the direct mode clutch 10 is only temporary until the operating point of the real speed ratio 1/rII and real CVT ratio rIC coincides with the direct mode line H, and subsequently, the clutch is in the state shown in FIG. 29 B and not energized.

As described above, as the power recirculation mode clutch 9 and direct mode clutch 10 are both electromagnetic two-way clutches, the time required for change over of running mode is shortened compared to an oil pressure clutch, and rapid speed change can be performed. The intersection point of the real speed ratio 1/rII and real CVT ratio rIC is compared with the aforesaid power recirculation mode line L and direct mode line H on a map based on the CVT ratio-IVT ratio characteristics (power recirculation mode line L, direct mode line H) when both clutches are fully engaged, and excitation/non-excitation of the electromagnetic two-way clutches is controlled according to the running regions to which this intersection point belongs. Hence, the timing of the excitation or non-excitation of the two-way clutches can easily and surely be controlled when there is a change-over of running mode or variation of running state, etc., loss of torque around the time when speed change is complete during a power ON down-shift can be prevented, torque change around the time when speed change is complete during a power OFF up-shift can be reduced, and speed change quality can be enhanced.

As the power recirculation mode clutch 9 is an electromagnetic two-way clutch, at low speed in the power recirculation mode, the engine can be prevented from stalling simply by disengaging the power recirculation mode clutch 9 due to reverse of torque even if the brake is applied suddenly. Further, as the direct mode clutch 10 is an electromagnetic two-way clutch, at high speed in the direct mode, the engine can be prevented from stalling simply by disengaging the direct mode clutch 10 due to reverse of torque even if the brake is applied suddenly.

Figure 8:
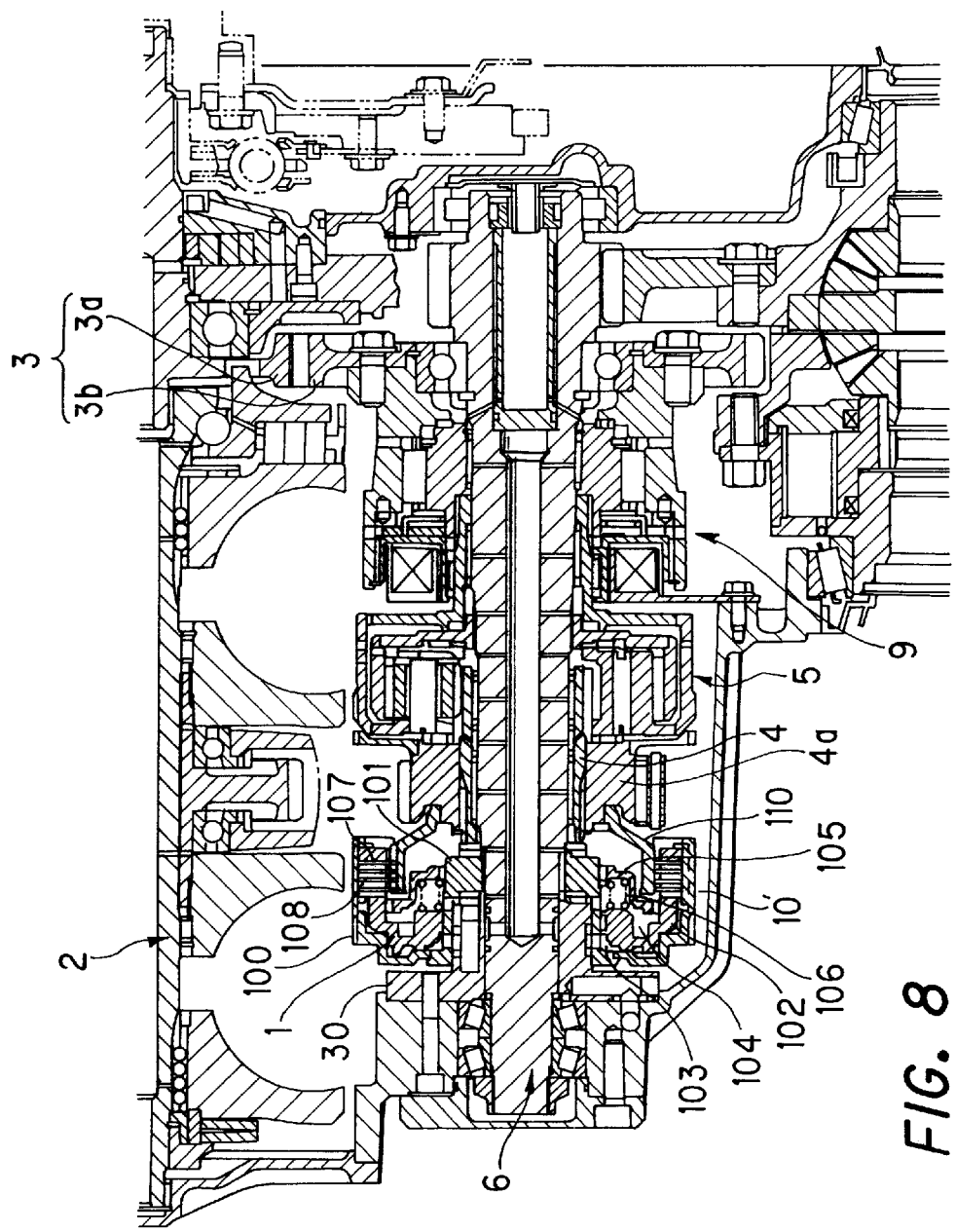
FIG. 8 is a section of essential parts of an infinite speed ratio continuously variable transmission showing a second embodiment.

FIG. 8 shows a second embodiment wherein, instead of the electromagnetic two-way clutch of the first embodiment, a direct mode clutch 10' is replaced by an oil pressure multiplate clutch from the prior art, the remaining features of the construction being identical to those of the first embodiment.

In FIG. 8, a sleeve 101 of cylindrical shape forming the inner circumference of the direct mode clutch 10' is disposed facing the retainer 30 joined to the casing 14, and this sleeve 101 is spline-jointed to the unit output shaft 6.

An outer race 100 of cylindrical shape extending towards the sprocket 4a joined to the continuously variable transmission output shaft 4, is joined from the end of this sleeve 101 on the left-hand side of the drawing.

A piston 102 free to displace in the axial direction is housed between the inner circumference of this outer race 100 and the outer circumference of the sleeve 101. An oil chamber 103 is formed between the base of the sleeve 101 and the piston 102 on the left-hand side of the diagram.

A projection which can come into contact with and separate from plates 108 supported on the inner circumference of the outer race 100 is formed on the outer circumference of the piston 102 parallel to the unit output shaft 6.

Disks 107 are interposed between these plates 108, and an inner race 110 cylindrical shape supported by these disks 107 is joined to the sprocket 4a.

A centrifugal oil pressure cancel piston 10 is disposed between the inner circumference of the projection of the piston 102 and the sleeve 101, a centrifugal oil pressure cancel chamber 104 is formed with the piston 102, and a return spring 106 which pushes the piston 102 toward the left of the drawing is interposed.

Oil pressures are respectively supplied from the casing 14 via an oil passage formed in the retainer 30 to the oil chamber 103 and centrifugal oil pressure cancel chamber 104.

When the oil pressure of the oil chamber 103 increases, the piston 102 displaces against the return spring 106, the plates 108 and disks 107 are gripped, the torque from the sprocket 4a is transmitted from the inner race 110 to the outer race 100, and the unit output shaft 6 is driven via the sleeve 101.

Hence, when the direct mode clutch 10' is an oil pressure multiplate clutch and the power recirculation mode clutch 9 is an electromagnetic two-way clutch, change-over of the clutch at the rotation synchronous point RSP proceeds as follows.

When there is an up-shift to the direct mode beyond the rotation synchronous point RSP from the power recirculation mode, engaging of the direct mode clutch 10' should begin when the rotation synchronous point RSP in the power recirculation mode is reached, the electromagnetic coil 55 of the power recirculation mode clutch 9 not being energized, and an IVT ratio IIr corresponding to the rotation synchronous point RSP maintained until the direct mode clutch 10' generates an engaging force. This is due to the fact that, as the power recirculation mode clutch 9 is electromagnetic, it has a very fast response, whereas the response of the oil pressure direct mode clutch 10' is slow.

Consequently, the time for which the rotation synchronous point RSP is maintained is longer than in the first embodiment. However, the clutch capacity of the direct mode clutch 10' can be controlled by controlling the oil pressure. Therefore, the clutch change-over to the direct mode can be performed smoothly after placing the direct mode clutch 10' in a half clutch state by not energizing the electromagnetic coil 55 of the power recirculation mode clutch 9, and driving the transmission from the rotation synchronous point RSP in the power recirculation mode to the rotation synchronous point RSP in the direct mode. This avoids a speed change shock when an up-shift is performed.

Conversely, when there is a downshift from the direct mode to the power recirculation mode, the oil pressure is gradually decreased when the rotation synchronous point RSP in the direct mode is reached so as to obtain the half clutch state, the electromagnetic coil 55 is energized, and the power recirculation mode clutch 9 is engaged.

By disengaging the direct mode clutch 10' when the rotation synchronous point RSP in the, power recirculation mode is reached, the shift to the power recirculation mode can be rapidly performed using the half clutch state, and speed change shocks can be suppressed also during a downshift.

FIG. 9 shows a third embodiment wherein a power recirculation mode clutch 9' is replaced by an oil pressure multiplate clutch of the prior art instead of the electromagnetic two-way clutch of the first embodiment, the remaining features of the construction being identical to those of the first embodiment.

In FIG. 9, a fixed transmission output shaft 3c is disposed on the inner circumference of the power recirculation mode clutch 9', and an outer race 71 supporting plural plates 73 is joined to the flange 3d of the fixed transmission output shaft 3c.

A piston 60 free to displace in the axial direction is housed in the inner circumference of the outer race 71 adjacent to the flange 3d, and an oil chamber 61 is formed between this piston 60 and the flange 3d.

A pressing member 64 which is pushed toward the piston 60 by a spring 75 and is free to come into contact with and separate from the plates 73, is housed free to displace in an axial direction on the inner circumference of this piston 60.

A centrifugal oil pressure cancel piston 63 is disposed between this pressing member 64 and the inner circumference of the outer race 71, and a centrifugal oil pressure cancel chamber 62 is formed with the piston 60.

On the other hand, disks 74 are interposed between the plural plates 73, and an inner race 72 supporting these disks 74 is disposed on the inner circumference of the outer race 71.

This inner race 72 is joined to a supporting member 5d of the carrier 5b on the base side.

Two oil passages 6b, 6c are formed via an envelope-shaped separator 6a on the inner circumference of the unit output shaft 6. These oil passages 6b, 6c receive the oil pressure supplied from the casing 14 via the retainer 30, and the oil passage 6b communicates with the oil chamber 61. On the other hand, the oil chamber 6c formed on the outer circumference of the separator 6a communicates with the centrifugal oil pressure cancel chamber 62. When the oil pressure of the oil chamber 61 increases, the piston 60 displaces against the spring 75. The piston 60 drives the pressing member 64 to grip the plates 73 and disks 74, transmits a torque to the inner race 72 from the fixed transmission output shaft 3c, and drives the carrier 5b.

When the power recirculation mode clutch 9' is an oil pressure multiplate clutch, and the direct mode clutch 10 is an electromagnetic two-way clutch, clutch change-over at the rotation synchronous point RSP proceeds as follows.

In the same way as in the aforesaid first embodiment, when there is an up-shift to the direct mode beyond the rotation synchronous point RSP from the power recirculation mode, as the direct mode clutch 10' is electromagnetic, it has a very fast response, whereas the response of the oil pressure power recirculation mode clutch 9' is slow. Therefore, the oil pressure of the power recirculation mode clutch 9' must be gradually disengaged by decreasing the oil pressure when the rotation synchronous point RSP in the power recirculation mode is reached, the electromagnetic coil 155 of the direct mode clutch 10 energized, and the IVT ratio II corresponding to the rotation synchronous point RSP maintained until the power recirculation mode clutch 9' is fully disengaged.

Consequently, the time for maintaining the rotation synchronous point RSP is longer than in the first embodiment. However, clutch change-over can be performed rapidly by the electromagnetic direct mode clutch 10 which has a fast response, while variably controlling the engaging capacity of the power recirculation mode clutch 9', by oil pressure control. Therefore, the clutch change-over to the direct mode can be performed smoothly after placing the power recirculation mode clutch 9' in a half clutch state by energizing the electromagnetic coil 155 of the direct mode clutch 10, and driving the step number of the step motor from the rotation synchronous point RSP in the power recirculation mode to the rotation synchronous point RSP in the direct mode. This suppresses speed change shocks when an up-shift is performed.

Figure 11:
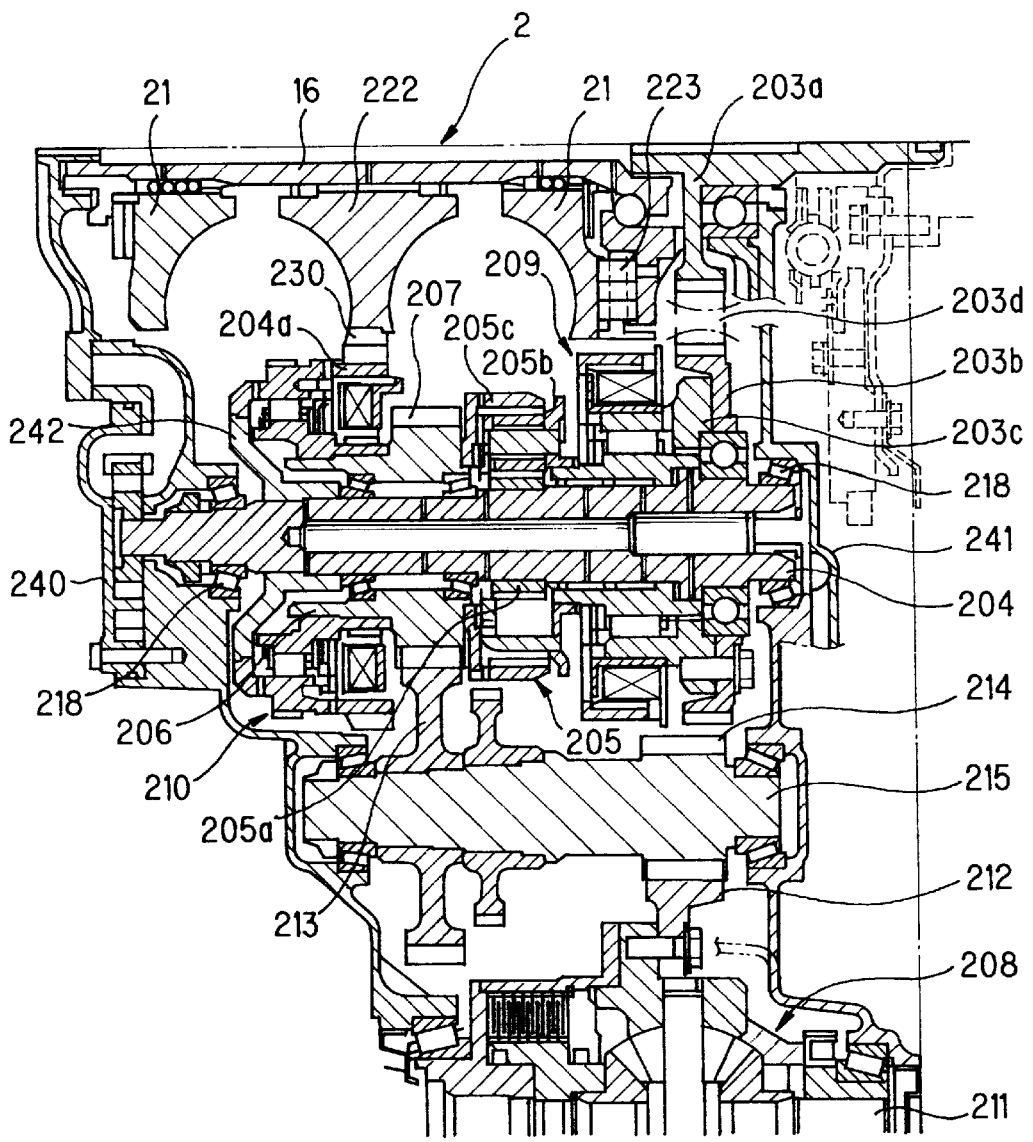
FIG. 11 is likewise a section of the essential parts of the infinite speed ratio continuously variable transmission.

Conversely, when there is a down-shift from the direct mode to the power recirculation mode, in FIG. 11, the electromagnetic coil 155 is not energized when the rotation synchronous point RSP in the direct mode is reached, and a half clutch state is obtained by gradually increasing the oil pressure supplied to the power recirculation mode clutch 9'.

Hence, a rapid shift to the power recirculation mode can be obtained using the half clutch state by completely engaging the power recirculation mode clutch 9' when the rotation synchronous point RSP in the power recirculation mode is reached, and speed change shocks at that time are also suppressed.

Figure 10:
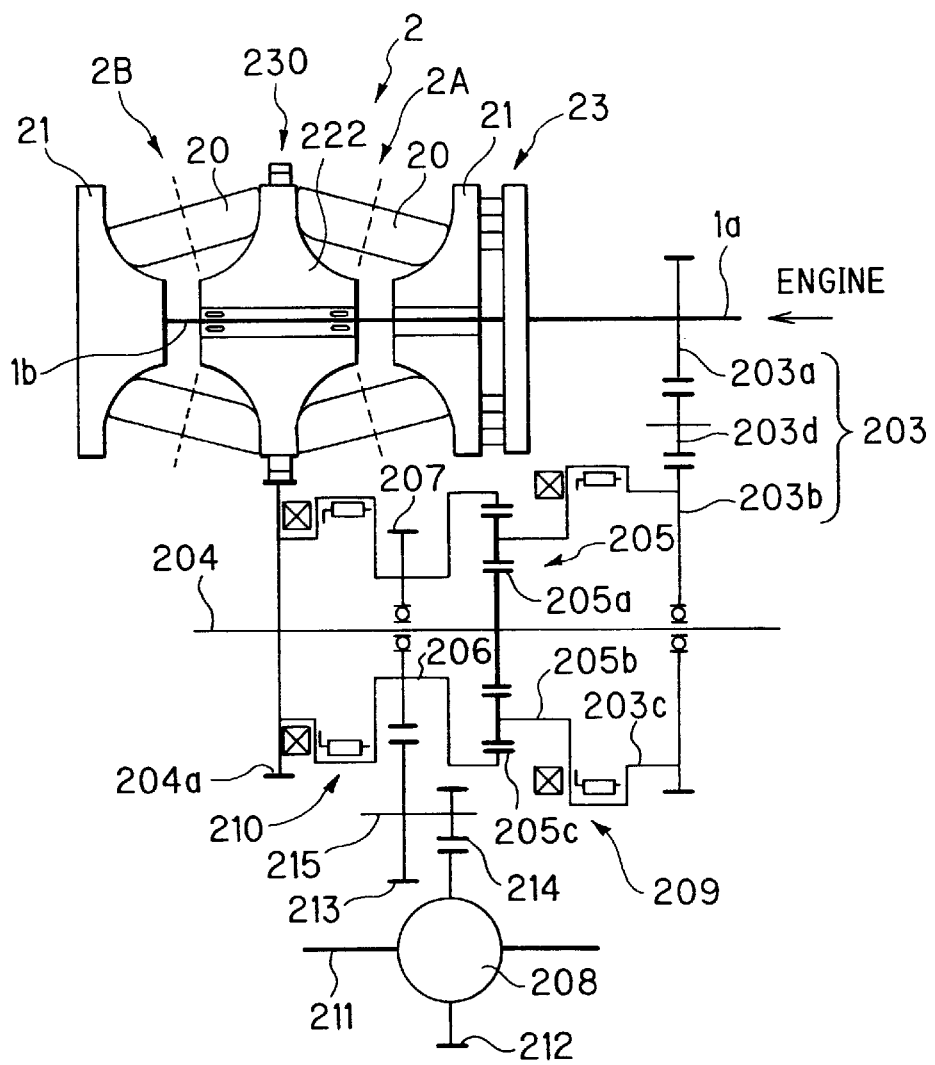
FIG. 10 is a section of essential parts of an infinite speed ratio continuously variable transmission showing a fourth embodiment.

FIG. 10 and FIG. 11 show a fourth embodiment of this invention wherein the two output disks 22 disposed back-to-back in the first embodiment are formed in one piece, and a CVT output gear 230 is provided on their outer circumference.

Describing the main parts of the construction of this embodiment using FIG. 10, the toroidal continuously variable transmission 2 whereof the speed ratio can be continuously varied, and a fixed transmission 203 (decelerating mechanism) comprising a gear 203a, counter gear 203d and gear 203a, are disposed in parallel on the unit output shaft 1a of the infinite speed ratio continuously variable transmission joined to the crank shaft of the engine. A CVT shaft 1b (input shaft) of the continuously variable transmission 2 is joined to the unit input shaft 1a, and the continuously variable transmission output shaft 204 which is the output shaft of the continuously variable transmission 2 is disposed parallel to the unit input shaft 1a and CVT shaft 1b.

A unit input shaft 206 which is the output shaft of the infinite speed ratio continuously variable transmission and an output shaft 203c of the fixed transmission 203 are supported coaxially and free to rotate relative to one another on this continuously variable transmission output shaft 204. A direct mode clutch 210 is interposed between the unit output shaft 206 provided with a transmission output gear 207, and the continuously variable transmission output shaft 204.

These output shafts 203c, 204,206 are joined by a planetary gear set 205. A sun gear 205a of the planetary gear set 205 is formed on the continuously variable transmission output shaft 204 of the toroidal continuously variable transmission 2. The continuously variable transmission output shaft 204 and output shaft 203c of the fixed transmission 203 which can rotate relative to it, are joined to a carrier 205b of the planetary gear set 205 via a power recirculation mode clutch 209. The unit output shaft 206 which is free to rotate relative to the continuously variable transmission output shaft 204 is joined to a ring gear 205c of the planetary gear set 205. The continuously variable transmission output shaft 204 is joined to the CVT output gear 230 of the continuously variable transmission 2 via a gear 204a. Motive force is transmitted to and from the unit output shaft 206 via a gear 205a of the planetary gear set 205 provided midway along the continuously variable transmission output shaft 204, or the direct mode clutch 210. When this direct mode clutch 210 is engaged, the continuously variable transmission output shaft 204 is joined to the unit output shaft 206.

The output shaft 203c of the fixed transmission 203 which is joined to the gear 203b is supported coaxially and free to rotate relative to the continuously variable transmission output shaft 204, and is joined to the carrier 205b of the planetary gear set 205 via a power recirculation mode clutch 209. A pinion of this carrier 205 meshes with the ring gear 205c of the planetary gear set 205. When the power recirculation mode clutch 209 is engaged, the fixed transmission output shaft 203c is joined to the ring gear 205c and sun gear 205a via the carrier 205b. The transmission output gear 207 is provided in the center of the unit output shaft 206 in the diagram, which is disposed between the gear 204a of the continuously variable transmission output shaft 204 and the planetary gear set 205. This transmission output gear 207 meshes with a gear 213 of a counter shaft 215. The counter shaft 215 meshes with a final gear 212 of a differential gear 208 via a gear 214. Drive force is transmitted at a predetermined overall gear ratio by the transmission output gear 207 to a drive shaft 211 joined to the differential gear 208.

This infinite speed ratio continuously variable transmission can also selectively use a direct mode and a power recirculation mode as in the case of the first embodiment.

The toroidal continuously variable transmission 2 is a double cavity half toroidal type comprising two sets of input disks 21, 21 and output disks 222 disposed coaxially on the CVT shaft 1b (input shaft), as shown in FIG. 10 and FIG. 11, these disks respectively gripping and pressing power rollers 20, 20. A first toroidal speed change unit 2A is disposed on the side of a loading cam 23 joined to the input shaft 1a, and a second toroidal speed change unit 2B is disposed on the opposite side. The output disks 222 of the first toroidal speed change unit 2 and second toroidal speed change unit 2 have toroidal curved surfaces formed on the side in contact with the power rollers 20.

The continuously variable transmission output shaft 204 is supported by a casing 240 and front casing 241 via bearings 218, 218 provided at both ends, as shown in FIG. 11.

The front casing 241 is a member which closes the casing 240 opening on the right-hand side of the figure.

A bearing 218, retainer 242, direct mode clutch 210, transmission output gear 207, the planetary gear set 205, power recirculation mode clutch 209, and the output shaft 203c and gear 203b of the fixed transmission 203 are disposed in order from the left-hand side of the diagram on the continuously variable transmission output shaft 204.

Next, the power recirculation mode clutch 209 comprising an electromagnetic two-way clutch will be described referring to FIG. 11 and FIG. 12. The power recirculation mode clutch 209 of this embodiment is the power recirculation mode clutch of the first embodiment comprising an electromagnetic coil which is coaxial with an outer race 291 of the output shaft 203c and disposed on its outer circumference.

Figure 12:
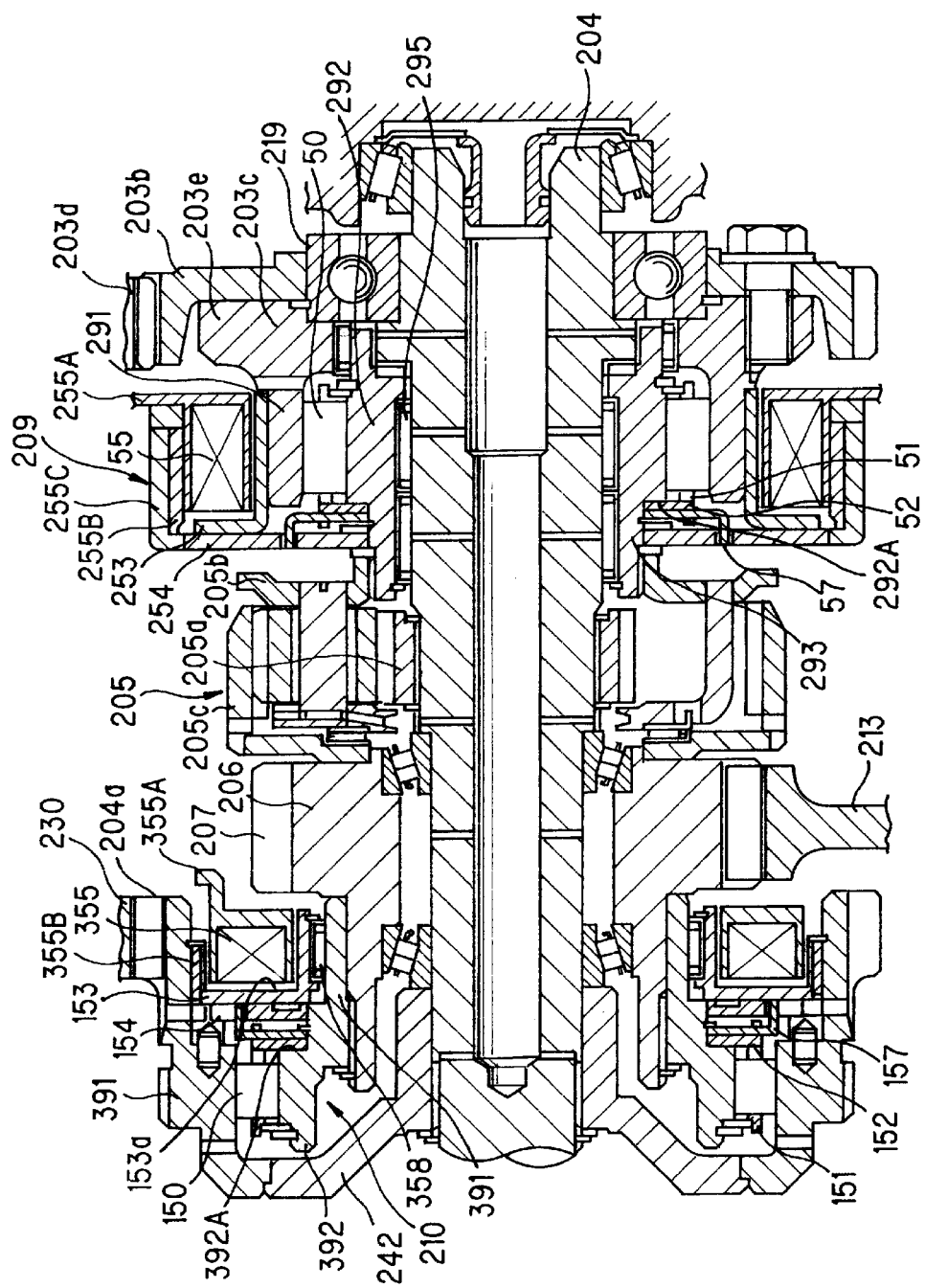
FIG. 12 is a sectional view of the power recirculation mode clutch and direct clutch comprising an electromagnetic two-way clutch.

In FIG. 11 and FIG. 12, a flange 203e is formed at the end on the right-hand side of the output shaft 203c in the drawing. The gear 203b is engaged with this flange 203e, a bearing 219 is inserted in its inner circumference, and it is free to rotate relative to the continuously variable transmission output shaft 204. The output shaft 203c has one end facing the planetary gear set 205 on the left-hand side of the drawing which is open, and this open part is formed cylindrically in an axial direction of the continuously variable transmission output shaft 204 (hereafter, this upper part is referred to as the outer race 291). An envelope-shaped inner race 292, whereof the outer circumference is polygonal and the continuously variable transmission output shaft 204 is inserted in its inner circumference, is disposed between the outer race 291 and continuously variable transmission output shaft 204. The shape of the inner race is identical to that of the first embodiment.

A needle bearing 295 is interposed between the inner circumference of the inner race 292 and continuously variable transmission output shaft 204, and the inner race 292 is supported free to rotate relative to the continuously variable transmission output shaft 204.

The outer circumference of the inner race 292 is formed for example in an octagonal shape, and rollers 50 are respectively disposed on its flat surfaces, as shown in FIG. 5. The positions of the rollers 50 are limited in the circumferential direction by the retainer 51 so that they have predetermined positions on the flat surfaces.

As shown in FIG. 5B, when the roller 50 is in the center of the flat surface on the outer circumference of the inner race 292, the roller 50 does not come in contact with the outer race 291, so relative rotation of the inner race 292 and outer race 291 is permitted as in the case of the first embodiment. Here, the inner race 92 is provided with a cylindrical part 293 of smaller diameter further towards the planetary gear set 205 than the position in contact with the roller 50 (left-hand side of the diagram). The switch spring 52, connecting member 57 and an armature 254 are disposed in order from an end face 292 of the inner race 92 on the outer circumference of the cylindrical part 293. A spline is further formed on the outer circumference of the end of this cylindrical part 293, and is joined to the carrier 205b of the planetary gear set 205.

A rotor 253 as a frictional member in the claim is fixed to the outer circumference of the outer race 291, and an end of the rotor 53 on the side of the armature 254 extends radially in a perpendicular direction to the continuously variable transmission output shaft 204. The rotor 253 has a L-shaped cross-section.

An electromagnetic coil 255 is disposed with a predetermined clearance in the radial direction on the outside of the rotor 53. The electromagnetic coil 255 is fixed to the casing 240 via a supporting member 255A. Further, a magnetic body 255C is fixed to the outer circumference of the electromagnetic coil 255 via a magnetic shield piece 255B comprising aluminium or the like.

In the power recirculation mode clutch 209 having the aforesaid construction, the armature 254 comes in contact with and separates from the rotor 253 according to the excitation of the electromagnetic coil 255. Therefore, a drive force is transmitted between the inner race 292 and outer race 291.

The function of the roller 50, retainer 51, switch spring 52, rotor 253, armature 254 and connecting member 57 forming the power recirculation mode clutch 209, and the way in which torque is transmitted by the power recirculation mode clutch 209, are identical to those of the aforesaid first embodiment, and their description will therefore not be repeated.

The planetary gear set 205 is disposed on the left-hand side of the power recirculation mode clutch 209 in the diagram, and the carrier 205b is joined to the inner race 292 by a spline as described above. The sun gear 205a which meshes with the carrier 205b is joined to the continuously variable transmission output shaft 204 via a spline provided on the continuously variable transmission output shaft 204. Likewise, the ring gear 205c which meshes with the carrier 205b is fixed to the unit output shaft 206. The unit output shaft 206 is supported free to rotate relative to the continuously variable transmission output shaft 204, and the transmission output gear 207 which meshes with the gear 213 of the counter shaft 205 is provided on its outer circumference.

Next, the direct mode clutch 210 interposed between the continuously variable transmission output shaft 204 and unit output shaft 206 will be described referring to FIG. 12.

The direct mode clutch 210 of this embodiment comprises an electromagnetic two-way clutch identical to the direct mode clutch of the first embodiment, but its installation position and input/output members are different. The direct mode clutch 210 is housed in the inner circumference of an outer race 391 formed in an envelope shape. One end of the outer race 391 is joined to the continuously variable transmission output shaft 204 via a retainer 242, the other end facing the transmission output gear 207 on the right-hand side of the diagram is open, and an annular rotor 153 is fixed to the inner circumference of this other end via a magnetic shield piece 355B.

The gear 204a for continuously variable transmission output which meshes with the CVT output gear 230 is also formed on the outer circumference of the other end. The rotor 153 has a U-shaped cross-section which opens towards the transmission output gear 207, and a circular electromagnetic coil 355 housed with a clearance in an annular depression 153a inside this cross-section. The electromagnetic coil 355 is fixed to the casing 240 via a supporting member 355a.

The outer diameter of a part facing the electromagnetic coil 355 of the unit output shaft 206 is narrowed, a spline is provided on its outer circumference, and the inner race 392 is fixed to it. A needle bearing 158 is interposed between the outer circumference of the inner race 392 and the rotor 153, and the rotor 103 and inner race 392 are supported free to rotate relative to the continuously variable transmission output shaft 204.

A roller 150 is disposed between the outer race 391 and inner race 392 in a perpendicular direction to the continuously variable transmission output shaft 204. The roller 150 is held by the retainer 151, and when it is in a neutral position in the center of the plane of the outer circumference of the inner race 392, the roller 150 does not come in contact with the outer race 391, so relative rotation of the inner race 392 and outer race 391 is permitted which is the same as in the first embodiment.

The outer diameter of the inner race is divided into three stages. A needle bearing 358 is interposed in the smallest outer diameter part, the roller 150 is disposed in the largest outer diameter part, and an outer diameter part having an intermediate outer diameter is formed between them. A switch spring 152, connecting member 157 and armature 154, described later, are disposed in order from a step 392A formed from the difference between this outer diameter part and the largest outer diameter part. As a result, the armature 154 is disposed adjacent to the rotor 153, and comes in contact with and separates from it due to the excitation of the electromagnetic coil 355.

Due to this construction, drive force can be transmitted between the inner race 392 and outer race 391.

The shape and function of the retainer 151, switch spring 152, rotor 153, armature 154 and connecting member 157, and the method of torque transmission by the direct mode clutch 210, are identical to those of the first embodiment and their description will therefore not be repeated.

The continuously variable transmission output shaft 4 has a hollow construction open on the engine side. A hole through which the continuously variable transmission output shaft 4 passes is also formed in the diameter direction at a predetermined position, and lubricating oil is introduced to this throughhole via an opening lubricating oil supply source, not shown, so that, for example, the needle bearing 295 can be supplied with lubricating oil from the through hole. As described above, according to the fourth embodiment, an electromagnetic two-way clutch is used for the power recirculation mode clutch 209, and comprises electromagnetic clutch parts of an electromagnetic two-way clutch such as the engaging parts of the electromagnetic coil 255, rotor 253 and armature 254 on the outer circumference of the outer race 291. Hence, the axial dimensions of the power recirculation mode clutch 209 can be shortened, and the power recirculation mode clutch 209 can be fitted to vehicle easily.

Further, a structure was adopted wherein the magnetic body 255C was fixed on either side of the magnetic shield 255B of aluminum, etc., to the outer circumference of the electromagnetic two-way clutch used for the power recirculation mode clutch 209. Hence, a magnetic part can be formed without fail, and the performance of the electromagnetic two-way clutch is enhanced.

The outer race 291 of this electromagnetic two-way clutch has a cantilever construction, so it has a relatively simple shape, the electromagnetic coil 255 fixed to the outer race 291 can be removed from the rotation shaft, the axial dimensions of the power recirculation mode clutch 209 can be shortened and the strength of the structural components can be easily maintained.

On the other hand, in the construction of the direct mode clutch 210, the outer race 391 is formed in one piece with the gear 204a, while the electromagnetic coil 355 of the electromagnetic two-way clutch is disposed on the inner circumference side of the outer race 391 and is sandwiched between a roller 350 and the transmission output gear 207. Further, the supporting member 355A of the electromagnetic coil 355 is fixed to the casing 240 avoiding the mesh part. Due to this construction, the structure of the electromagnetic two-way clutch applied to the direct mode clutch 210 can be simplified, and the axial dimensions of the infinite speed ratio continuously variable transmission unit can be shortened.

By using an electromagnetic two-way clutch for the power circulation clutch 209 and direct clutch 210, the clutch can be used effectively, for example by connecting an oil pump to one end of the continuously variable transmission output shaft 204 on the side of the continuously variable transmission.

In the overall construction of the infinite speed ratio continuously variable transmission, the gear 203a of the fixed transmission 203 and the toroidal continuously variable transmission 2 formed on the engine side are disposed on the unit input shaft 1a and CVT shaft 1b of the continuously variable transmission 2 connected to the engine crank shaft, and the gear 203b of the fixed transmission 203, power circulation clutch 209, planetary gear set 205, transmission output gear 207 and direct clutch 210 are disposed on the continuously variable transmission output shaft 204 arranged parallel to the unit input shaft 1a. The output from the CVT output gear 230 provided on the outer circumference of the output disk 22 is transmitted to the direct clutch 210, the armature 54 of the power circulation clutch 209 is joined to the carrier 205b of the planetary gear set 205, and the ring gear 205c of the planetary gear set 205 is joined to the transmission output gear 207. Due to this construction, the oil pump which is an obstacle to shortening of the unit input shaft 1a and CVT shaft 1b drives a separate shaft, and the transmission output gear 207 can be disposed between the fixed transmission 203 and gear 204a of the continuously variable transmission output shaft 204. Therefore, the axial dimensions of the infinite speed ratio continuously variable transmission unit can be shortened.

Figure 35:
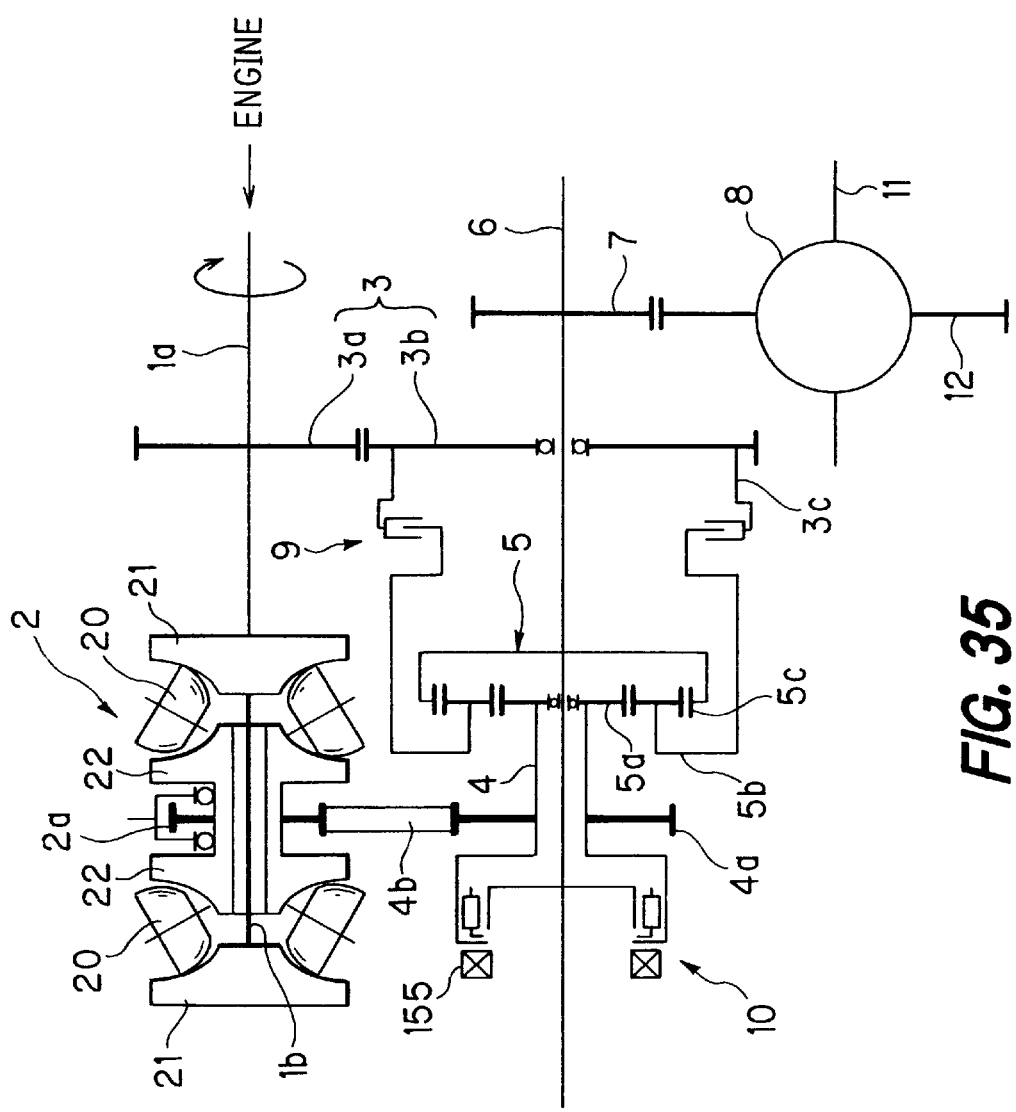
FIG. 35 shows a fifth embodiment, showing a schematic view of the infinite speed ratio continuously variable transmission.
Figure 36:
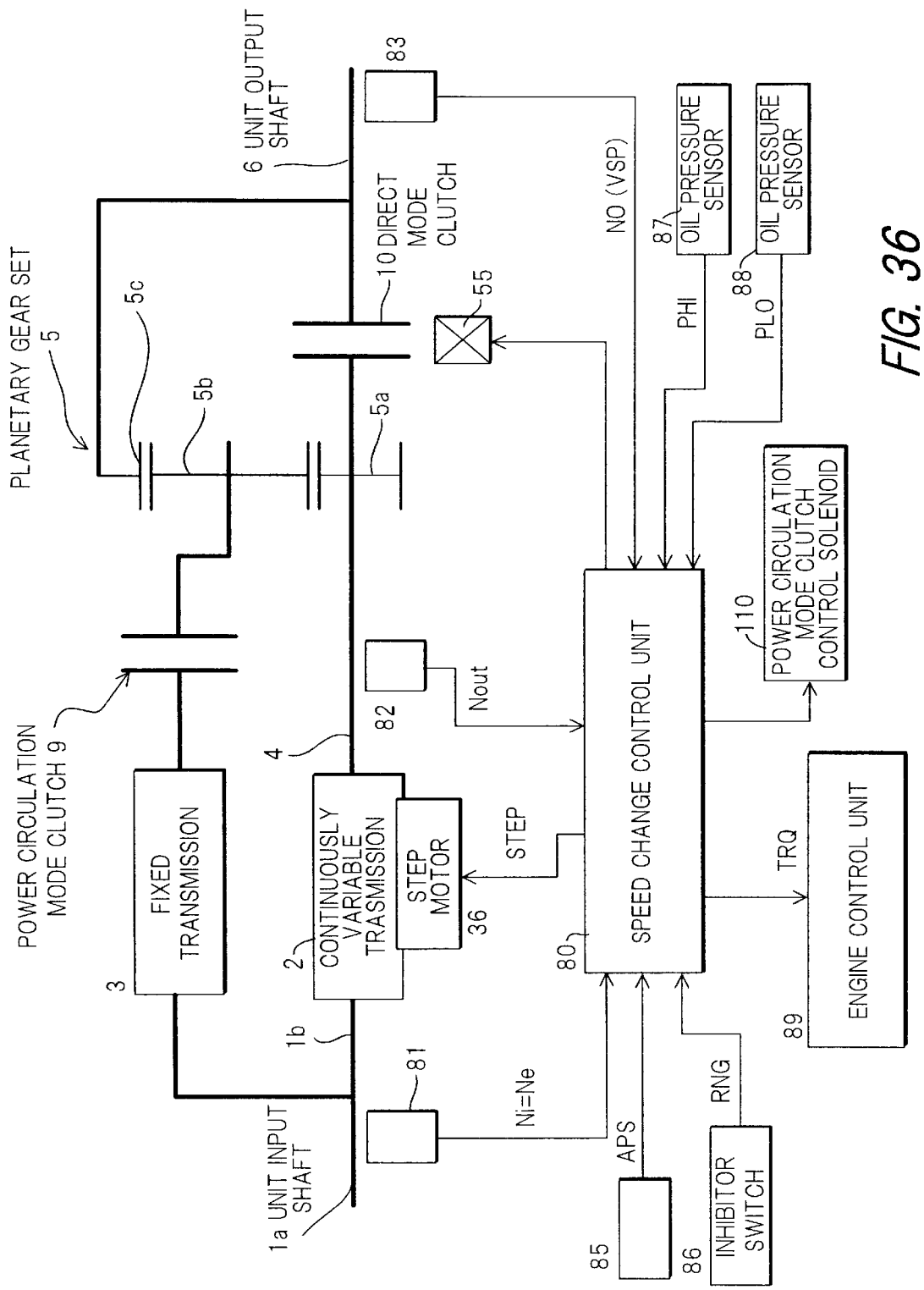
FIG. 36 is a schematic view showing a controller of the infinite speed ratio continuously variable transmission according to the fifth embodiment.

FIG. 35, FIG. 36 show a fifth embodiment of this invention, wherein the power recirculation mode clutch 9 is an oil pressure clutch instead of an electromagnetic two-way clutch, the power recirculation mode clutch control solenoid 110 (oil pressure control means) driven by the speed change control unit 80 for example changes the supply oil pressure by duty ratio control, and the engaging capacity of the power recirculation mode clutch 9' can be freely modified as desired.

Regarding the direct mode clutch 10 comprising an electromagnetic two-way clutch, the engaging control (mode change over control or mode maintenance control) is identical to that described above, only the oil pressure power recirculation mode clutch 9 being different as shown in FIG. 37, FIG. 38.

Figure 37A:
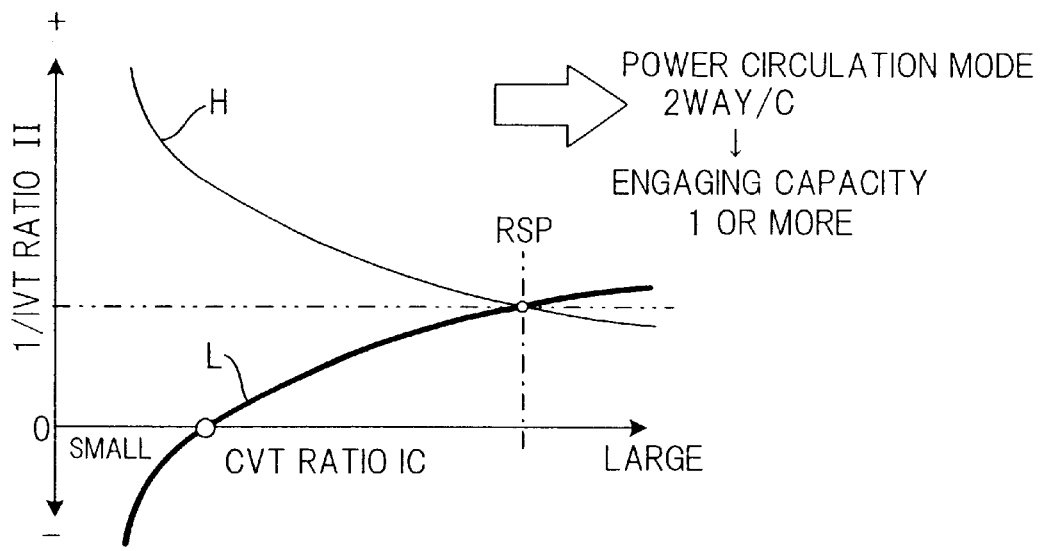
FIGS. 37A and 37B is a characteristic diagram of the inverse 1/II of the IVT ratio II and the CVT ratio IC.

First, in FIG. 37A, when the oil pressure power recirculation mode clutch 9 is engaged, when the aforesaid operating point corresponding to the real speed ratio 1/rII and real CVT ratio rIC is plotted on the map of FIG. 16, the operating point is situated on the power recirculation mode line L of FIG. 16, as shown in FIG. 37A. At this time, the supply oil pressure is controlled so that the engaging capacity of the power recirculation mode clutch 9' is equal to 1 or more, and the direct mode clutch 10 which is an electromagnetic two-way clutch is not energized.

In this way, while torque is transmitted due to the power recirculation mode clutch 9' which is engaged with an engaging capacity of 1 or more, the direct mode clutch 10 which is not energized is disengaged, and the power recirculation mode is realized.

Figure 37B:
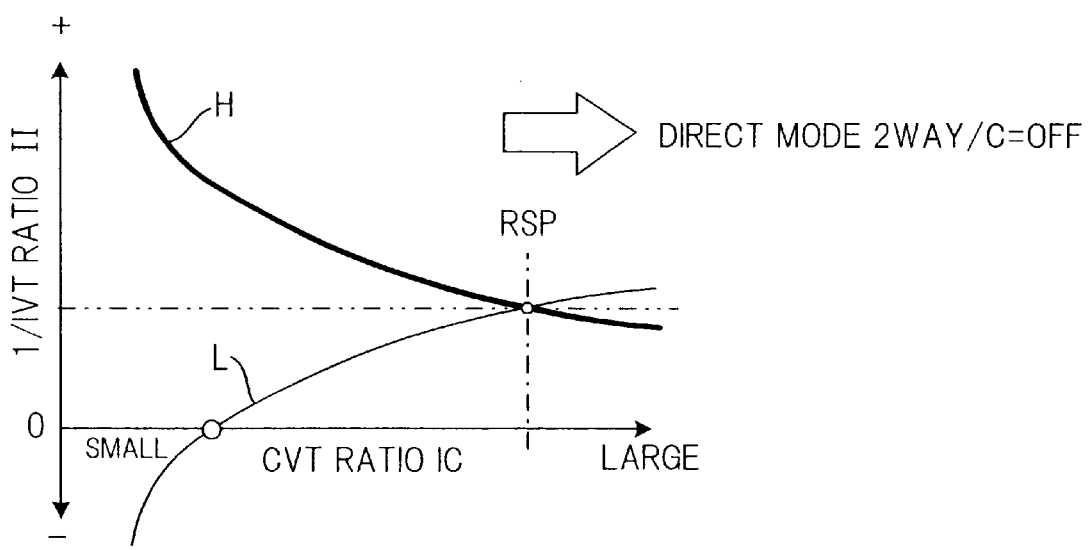

On the other hand, if the direct mode clutch 10 which is an electromagnetic two-way clutch is engaged, and the power recirculation mode clutch 9' is disengaged, the above operating point is situated on the direct mode line H in FIG. 16, and the direct mode is realized as shown in FIG. 37B.

In the case of this FIG. 37B, the direct mode clutch 10 can be maintained in the engaged state without excitation after temporarily energizing, after a change over of running mode is performed in a fixed running state at the rotation synchronous point RSP shown in FIG. 16, so re-excitation is unnecessary.

Figure 38A:
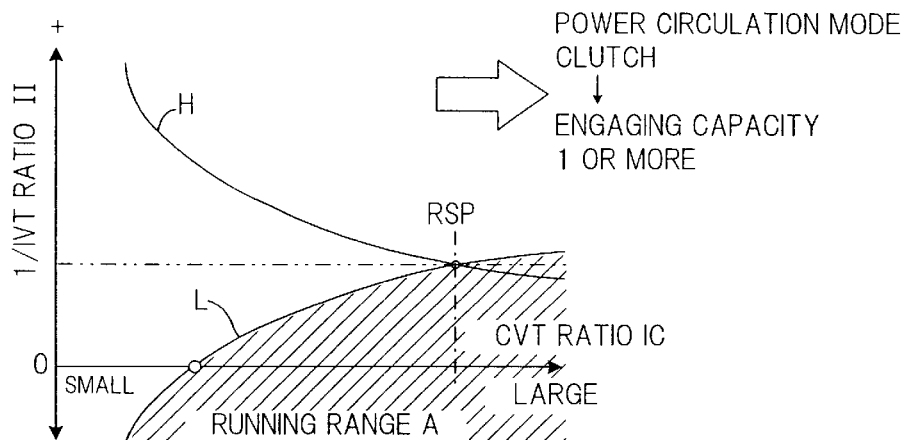
FIGS. 38A–C shows running regions according to the characteristic diagram of the inverse 1/II of the IVT ratio II and the CVT ratio IC.

However, when the operating point corresponding to the real speed ratio 1/rII and real CVT ratio rIC lies below the power recirculation mode line L, it is determined that the running region is A, as shown in FIG. 38A. In the case of this running region A, it is assumed that the power recirculation mode clutch 9' is engaged with an engaging capacity of 1 or more. The engaging capacity shows the transmission capacity, and if it is 1 or more, slip does not occur in the oil pressure clutch, and input torque which varies according to the running state is transmitted as it is. On the other hand, if the engaging capacity is less than 1, the transmitted torque can be controlled with the oil pressure clutch in the half clutch state.

Figure 38B:
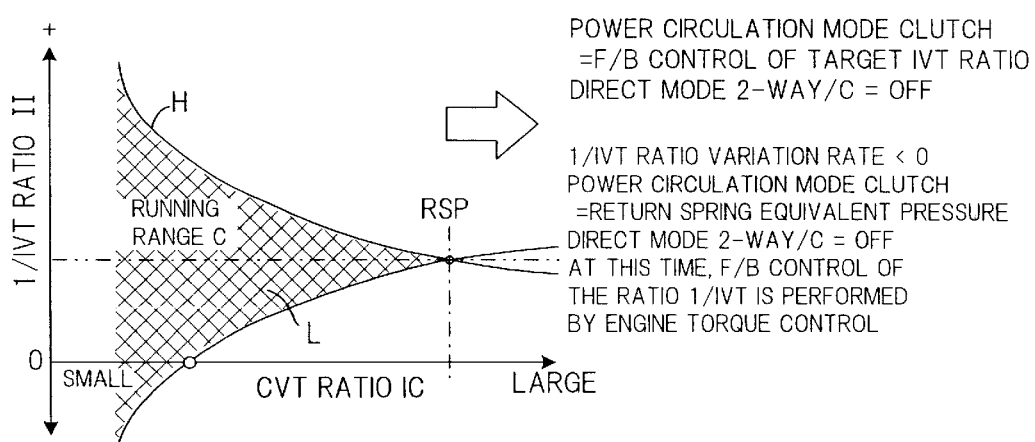

Next, when the operating point corresponding to the real speed ratio 1/rII and real CVT ratio rIC lies between the power recirculation mode line L and direct mode line H, it is determined that the running region is C, as shown in FIG. 38B.

In the case of this running region C, if the difference from the variation rate of the real speed ratio 1/rII =value on immediately preceding occasion is positive, i.e., larger than 0, the direct mode clutch 10 is not energized, the engaging capacity of the power recirculation mode clutch 9' is controlled, and feedback control to the final target speed ratio 1/tII is performed.

On the other hand, if the difference from the variation rate of the real speed ratio 1/rII=value on immediately preceding occasion is negative, i.e., smaller than 0, the direct mode clutch 10 is not energized, the engaging capacity of the power recirculation mode clutch 9' is taken as a return spring equivalent value, and feedback control to the final target speed ratio 1/tII is performed by controlling the engine torque as described above.

Figure 38C:
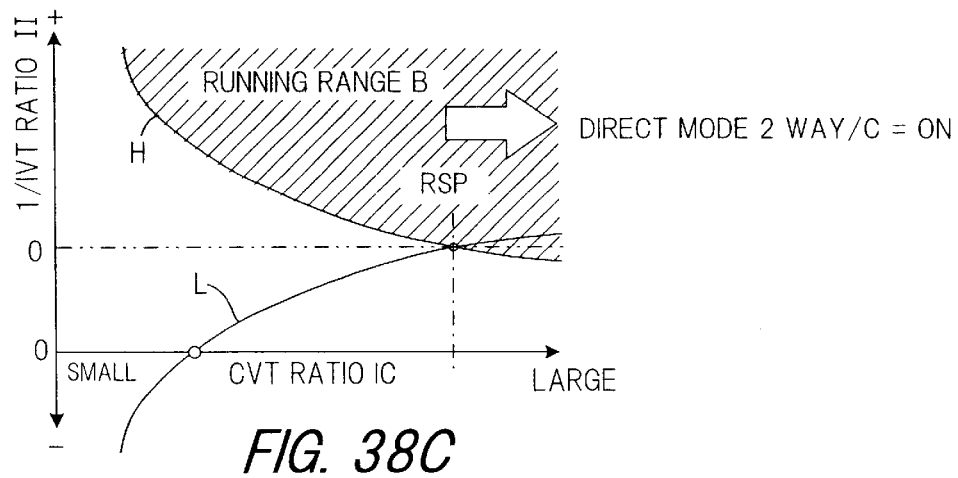

When the operating point corresponding to the real speed ratio 1/rII and real CVT ratio rIC lies above the direct mode line H, it is determined that the running region is B, as shown in FIG. 38C.

When it is determined than the running region is B, if the final target speed ratio 1/tII is the direct mode, the direct mode clutch 10 is temporarily energized (ON) in the engaged state, the power recirculation mode clutch 9' is disengaged and there is a shift to the direct mode.

In this way, by comparing the power recirculation mode line L and direct mode line H with the current operating point, the engaged state of the power recirculation mode clutch 9' or direct mode clutch 10 can be known, the running regions A–C, the excitation state of the electromagnetic two-way clutches and the engaging capacity of the power recirculation mode clutch 9' can be preset as maps or the like, and the engaging state of the clutches can easily be controlled according to the variation of running state.

Next, the action will be described when the power recirculation mode clutch 9' is an oil pressure clutch, and the direct mode clutch 10 is an electromagnetic two-way clutch.

Figure 39:
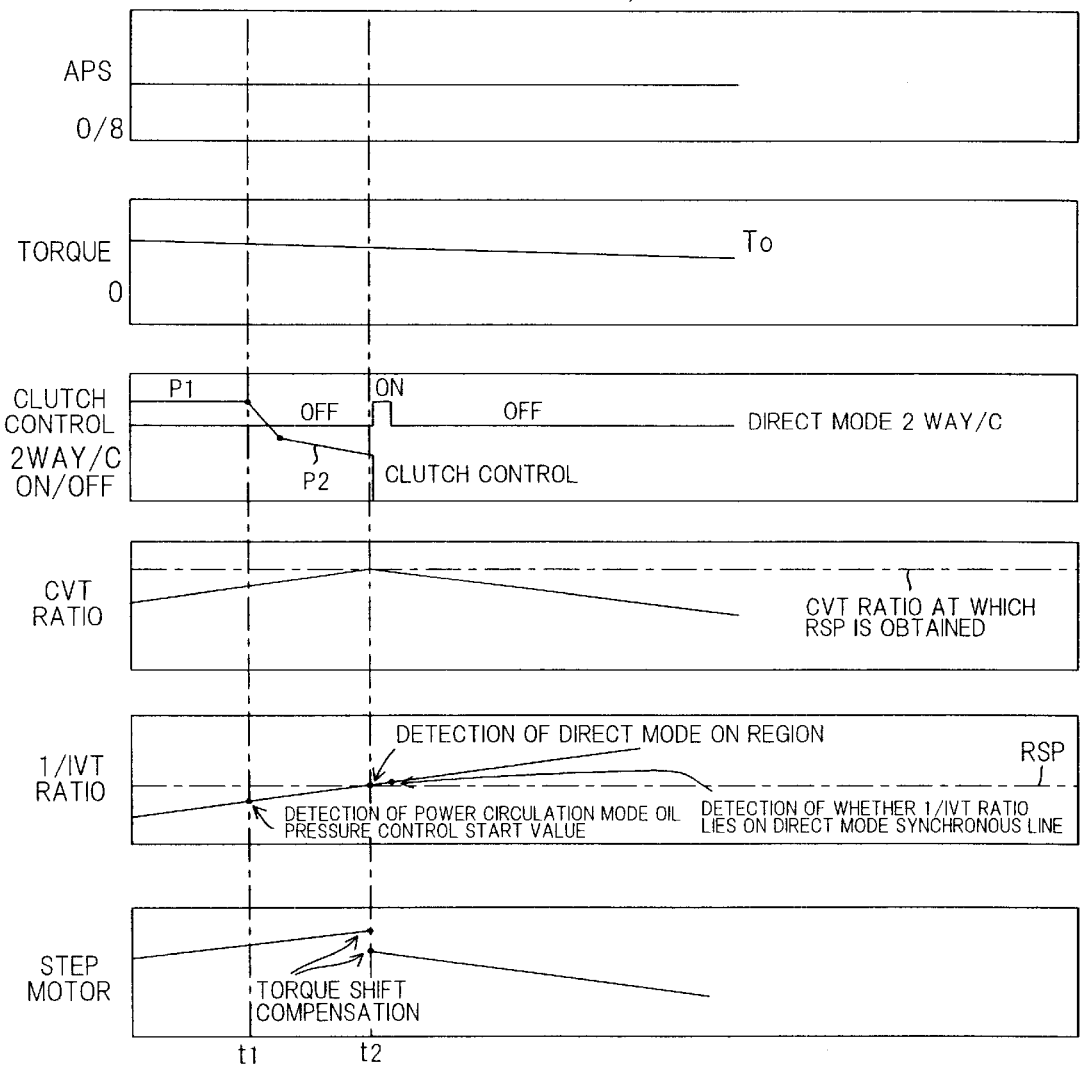
FIG. 39 is a graph during auto-up, showing a relation between the accelerator pedal depression amount APS, torque, clutch energizing state, CVT ratio, 1/IVT ratio, step number of the step motor and time.

FIG. 39 is an example of auto-up (power ON up-shift) where the vehicle accelerates with the accelerator pedal depression amount APS constant, and an up-shift is performed from the power recirculation mode to the direct mode.

At the time t1 in FIG. 39, the oil pressure supplied to the power recirculation mode clutch 9' is gradually increased from an engaging oil pressure P1 (engaging capacity of 1 or more, obtained by multiplying the capacity required for engaging by a predetermined value of 1 or more) due to the real speed ratio 1/rII exceeding the preset speed ratio, and decreased to a predetermined shelf pressure P2, then the system waits until the running region B in FIG. 38C is reached.

At the time t2, when the operating point determined by the real speed ratio 1/rII and real CVT ratio rIC has entered the running region B, the direct mode clutch 10 is energized and engaged, the power recirculation mode clutch 9' is disengaged, and there is a change-over from the power recirculation mode to the direct mode.

Immediately after the time t2 at which engaging of the direct mode clutch 10 is completed, the operating point determined by the real speed ratio 1/rII and real CVT ratio rIC coincides with the direct mode line H in FIG. 26B, so mode change-over is terminated without energizing the direct mode clutch 10.

Figure 40:
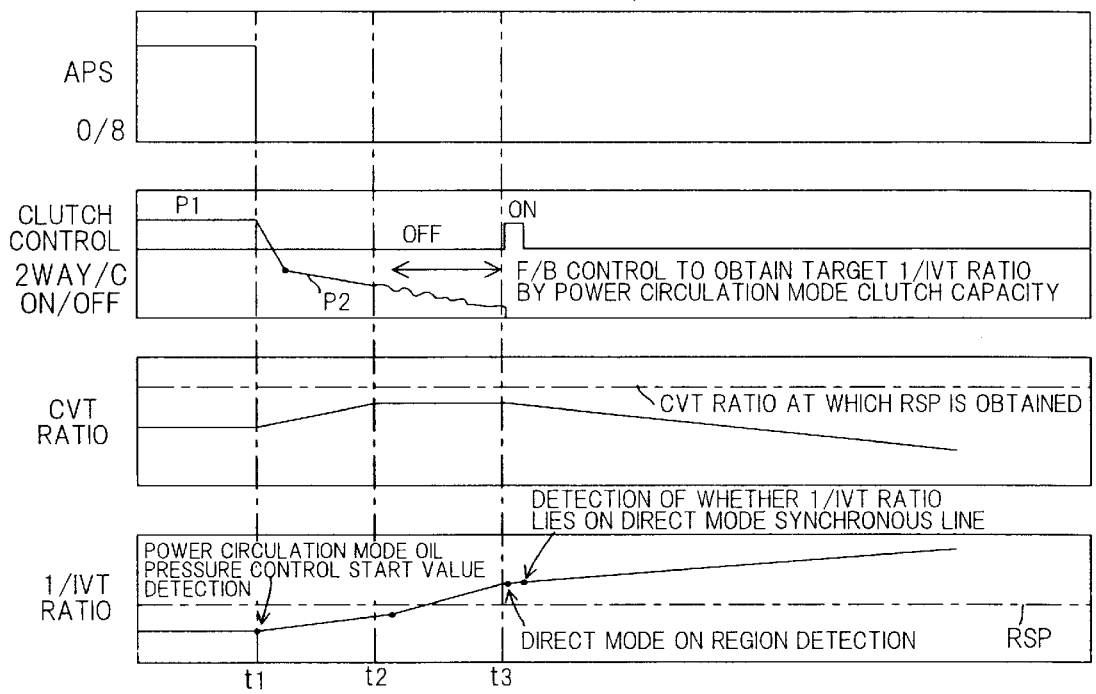
FIG. 40 is a graph during foot release up-shift, showing a relation between the accelerator pedal depression amount APS, torque, clutch energizing state, CVT ratio, 1/IVT ratio, step number of the step motor and time.

FIG. 40 shows an example where the accelerator pedal is released after it was depressed, and a foot release up-shift (power OFF up-shift) occurs which performs an up-shift from the power recirculation mode to the direct mode.

At the time t1 in FIG. 40, the accelerator pedal is released from the depressed state in the power recirculation mode, and the final target speed ratio 1/tII is the direct mode.

At this time t1, the oil pressure is gradually decreased from the engaging oil pressure P1 (equal to or greater than the engaging capacity 1) due to the real speed ratio 1/rII exceeding the preset speed ratio, and further decreased from the shelf pressure P2. From the time t2, the power recirculation mode clutch 9' is in the half clutch state, the operating point determined by the real speed ratio 1/rII and real CVT ratio rIC lies in the running region C of FIG. 38B, and the IVT ratio II is feedback controlled to the direct mode by controlling the engaging capacity of the power recirculation mode clutch 9'.

At the time t3, as the running mode is B in FIG. 38C, the power recirculation mode clutch 9' is disengaged, and the direct mode clutch 10 is energized.

The direct mode clutch 10 is engaged due to excitation, and immediately after the time t2 when this engaging is complete, the operating point determined by the real speed ratio 1/rII and real CVT ratio rIC coincides with the direct mode line H in FIG. 37B, so mode change-over is terminated without excitation of the direct mode clutch 10.

Figure 41:
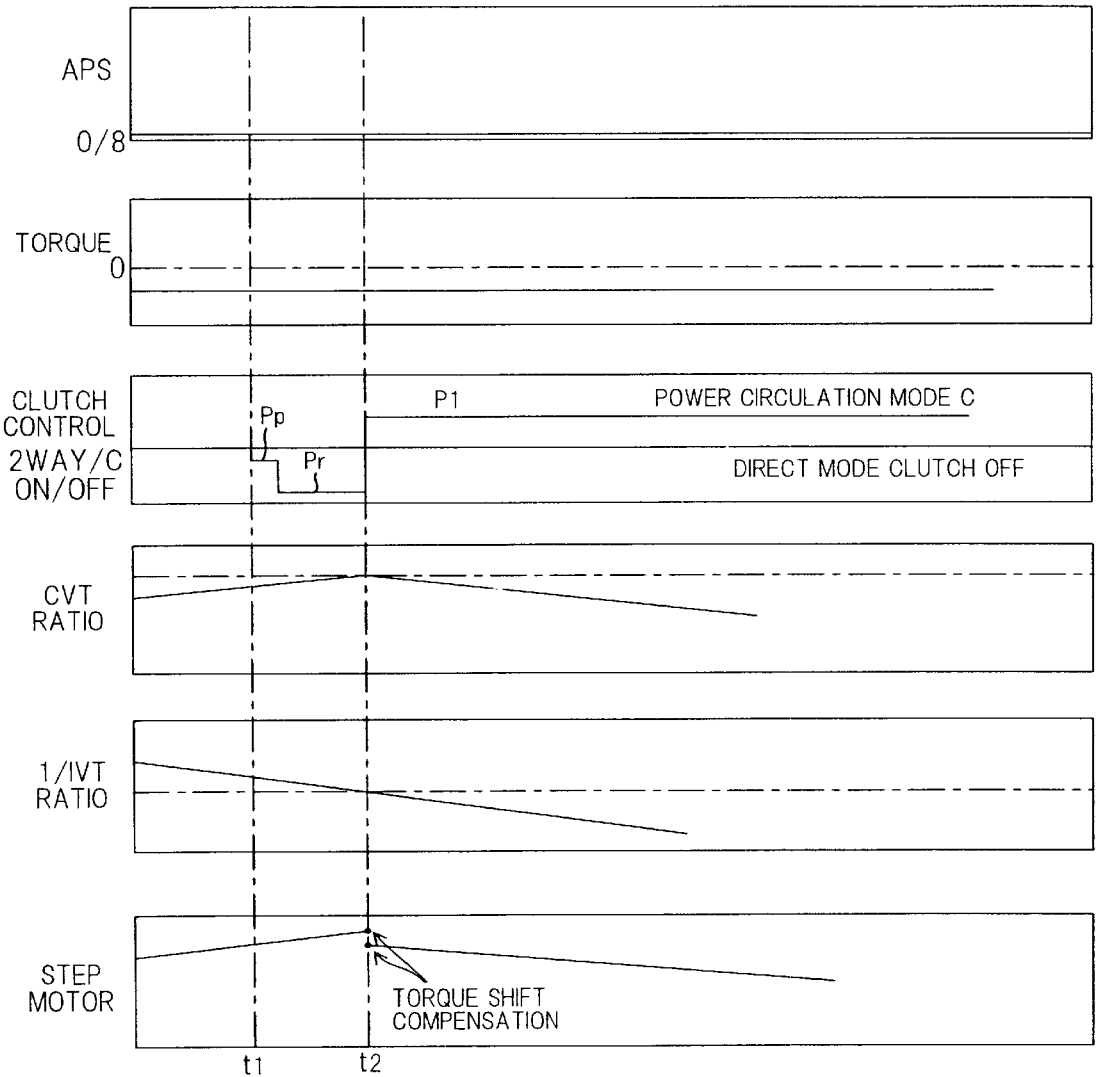
FIG. 41 is a graph during coast down, showing a relation between the accelerator pedal depression amount APS, torque, clutch energizing state, CVT ratio, 1/IVT ratio, step number of the step motor and time.

FIG. 41 is an example of coast down (power OFF downshift) which performs a downshift from the direct mode to the power recirculation mode with the accelerator pedal released.

At the time t1 of FIG. 41, as the real speed ratio 1/rII exceeds the preset speed ratio, engaging of the power recirculation mode clutch 9', which was in the disengaged state, is started.

First, after a precharge pressure Pp is supplied, the system waits until the operating point determined by the real speed ratio 1/rII and real CVT ratio rIC is in the running region A of FIG. 38A in the state where there has been a decrease to the return spring equivalent pressure Pr.

At the time t2, it is determined that the running region is A, the engaging oil pressure P1 is supplied to the power recirculation mode clutch 9', and there is a shift to the power recirculation mode. At this time, the direct mode clutch 10 which is in the non-energized state is disengaged due to reverse of the torque transmission direction as a result of change-over of running mode.

Figure 42:
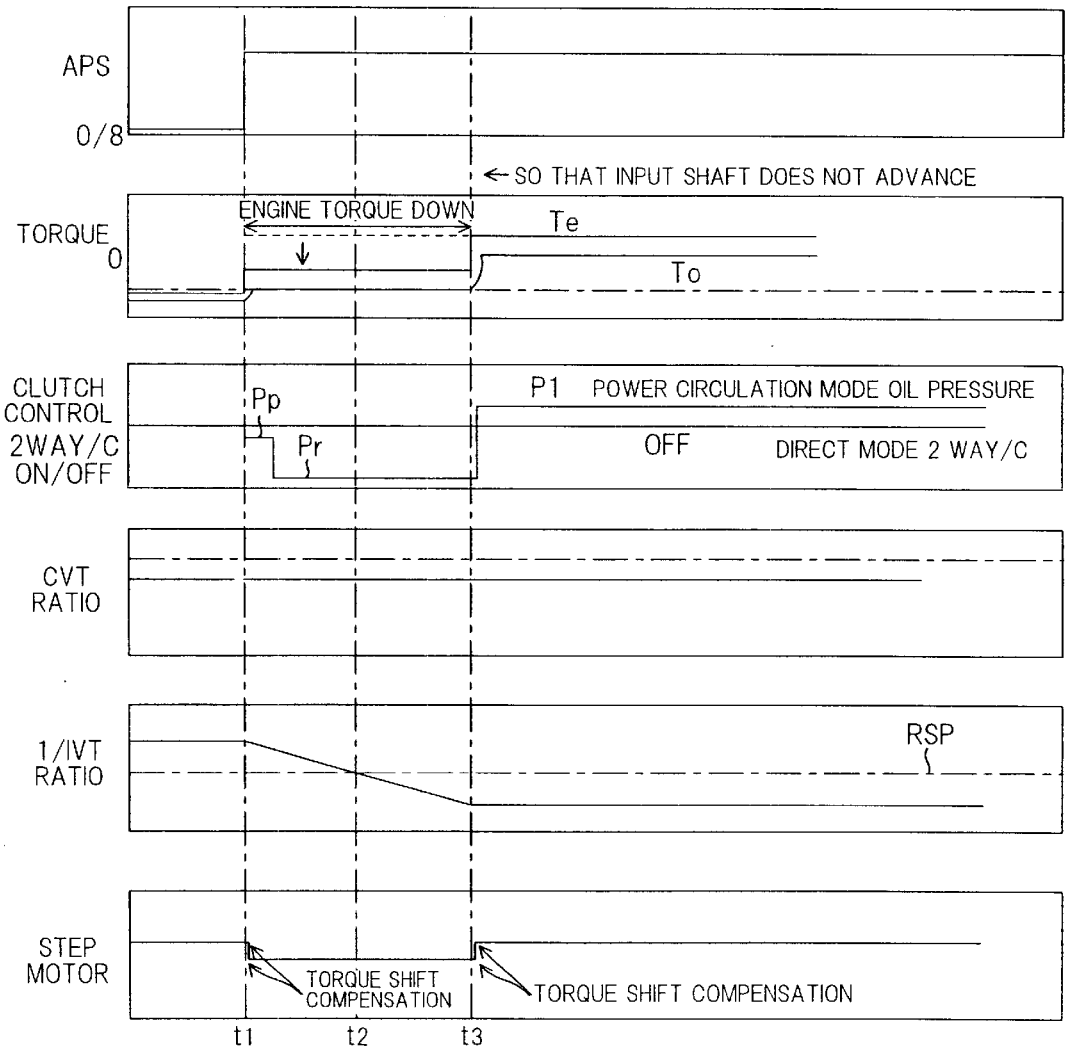
FIG. 42 is a graph during depression down, showing a relation between the accelerator pedal depression amount APS, torque, clutch energizing state, CVT ratio, 1/IVT ratio, step number of the step motor and time.

FIG. 42 is an example of depression downshift (power ON downshift) which performs a downshift to the power recirculation mode by depressing the accelerator pedal from the coasting state where the accelerator pedal was released in the direct mode.

At the time t1 in FIG. 42, the accelerator pedal is depressed, the final target speed ratio 1/tII is set to the power recirculation mode, and due to the fact that the real speed ratio 1/rII exceeds the preset speed ratio, engaging of the power recirculation mode clutch 9' which was in the disengaged state, is started.

At this time t1, the direct mode clutch 10 which was in the non-energized state, is disengaged due to reverse of the torque transmission direction from the coasting side to the drive side, and the operating point determined by the real speed ratio 1/rII and the real CVT ratio rIC enters the running region C.

From the time t1 when the operating point entered the running region C, first, after the precharge pressure Pp is supplied to the power recirculation mode clutch 9', the system waits until the operating point determined by the real speed ratio 1/rII and the real CVT ratio rIC enters the running region A in FIG. 38A, in the state where the pressure decreased to the return spring equivalent pressure Pr.

From the time t1–t3, engine torque control is performed so that the engine rotation speed is not racing, at the intermediate time t2, the real speed ratio 1/rII is less than the speed ratio corresponding to the rotation synchronous point RSP, and at the time t3, the operating point determined by the real speed ratio 1/rII and the real CVT ratio rIC enters the running region C, the engaging oil pressure P1 is supplied to the power recirculation mode clutch 9' to engage it, and change-over to the power recirculation mode is terminated.

As described above, as the direct mode clutch is an electromagnetic two-way clutch, during a power OFF up-shift, the torque change around where speed change is complete, is decreased, and the quality of speed change is enhanced. During a power ON downshift, the direct mode clutch 10 is disengaged simultaneously with engagement of the power recirculation mode clutch 9', so the quality of speed change is enhanced. Further, during a power OFF up-shift or power ON downshift, the IVT ratio II and can be controlled according to the engaging capacity of the power recirculation mode clutch 9', so smooth control can be performed.

Further, when the vehicle is running in the direct mode, the engine is prevented from stalling simply by the disengaging of the direct mode clutch 10 due to reversal of torque even if the brake is applied suddenly.

Figure 43:
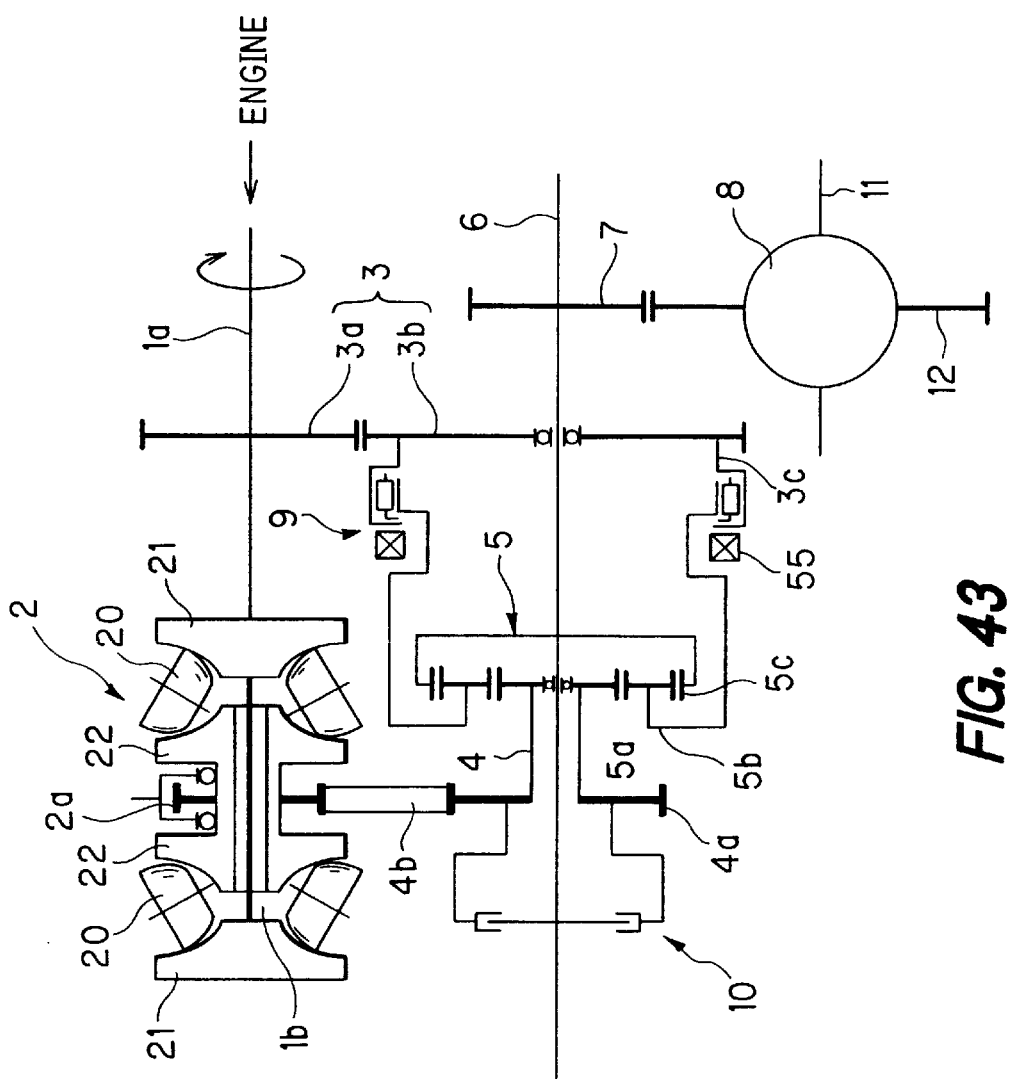
FIG. 43 shows a sixth embodiment, showing a schematic view of the infinite speed ratio continuously variable transmission.
Figure 44:
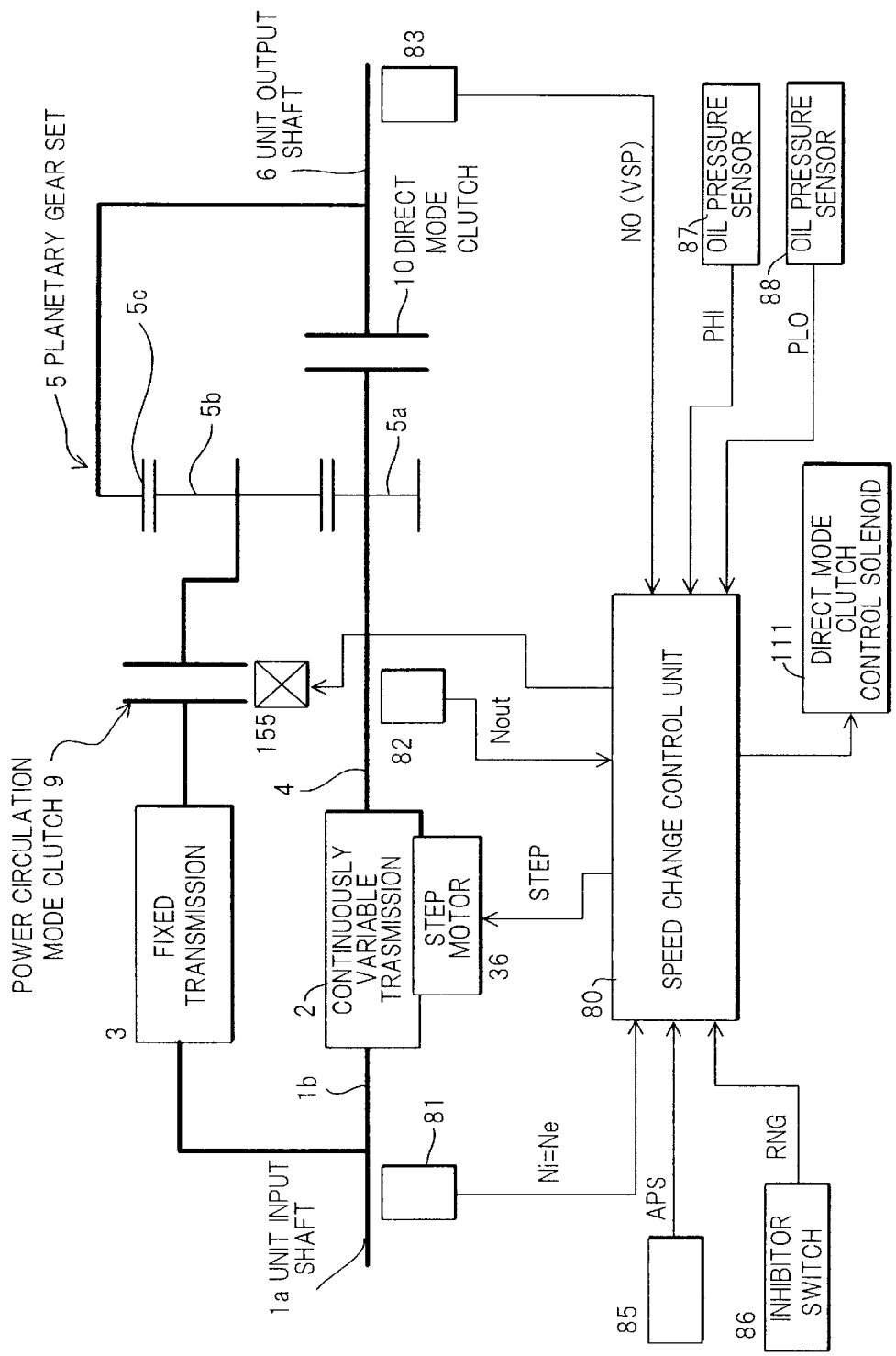
FIG. 44 is a schematic view showing a controller of the infinite speed ratio continuously variable transmission according to the sixth embodiment.

FIG. 43, FIG. 44 show a sixth embodiment wherein the direct mode clutch 10' is an oil pressure clutch instead of an electromagnetic two-way clutch, a direct mode clutch control solenoid 111 (oil pressure control means) driven by the speed change control unit 80 modifies the supply oil pressure by duty ratio control or the like, and the engaging capacity of the direct mode clutch 10 can be modified as desired.

Concerning the direct mode clutch 10, the engaging control is identical to the above, and only the oil pressure direct mode clutch 10 is different as shown in FIG. 45, FIG. 46.

Figure 45A:
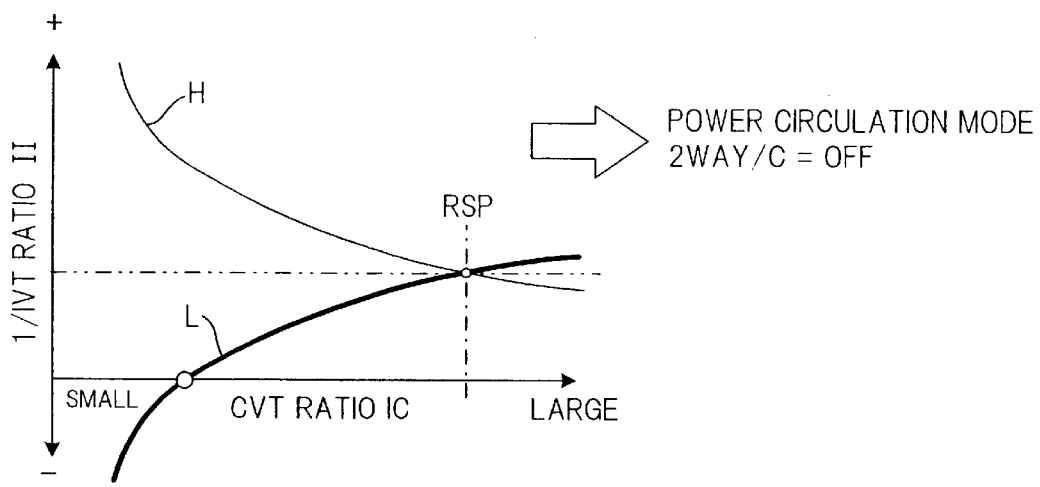
FIGS. 45A and B is a characteristic diagram of the inverse 1/II of the IVT ratio II and the CVT ratio IC.

First, in FIG. 45A, if the power recirculation mode clutch 9 which is an electromagnetic two-way clutch is in the engaged state, and the operating point corresponding to the real speed ratio 1/rII and the real CVT ratio rIC is plotted on the map of FIG. 16, the operating point is situated on the power recirculation mode line L of FIG. 16, and at this time, torque transmission is performed without energizing the power recirculation mode clutch 9.

In this FIG. 45A, the direct mode clutch 10 can be maintained in the engaged state without excitation after temporarily energizing, after a change-over of running mode is performed in a fixed running state at the rotation synchronous point RSP shown in FIG. 16, so re-excitation is unnecessary.

Figure 45B:
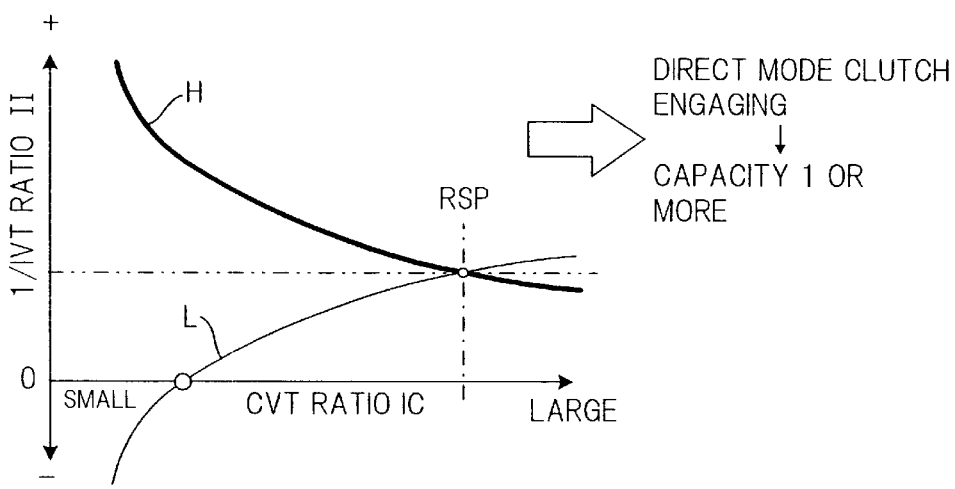
FIG. 45B shows the direct mode line H when the direct mode clutch is completely engaged.

However, if the oil pressure direct mode clutch 10 is engaged, this operating point is situated on the direct mode line H of FIG. 16, the situation is as shown in FIG. 45B, and the engaging capacity of the direct mode clutch 10' is set to 1 or more.

Figure 46A:
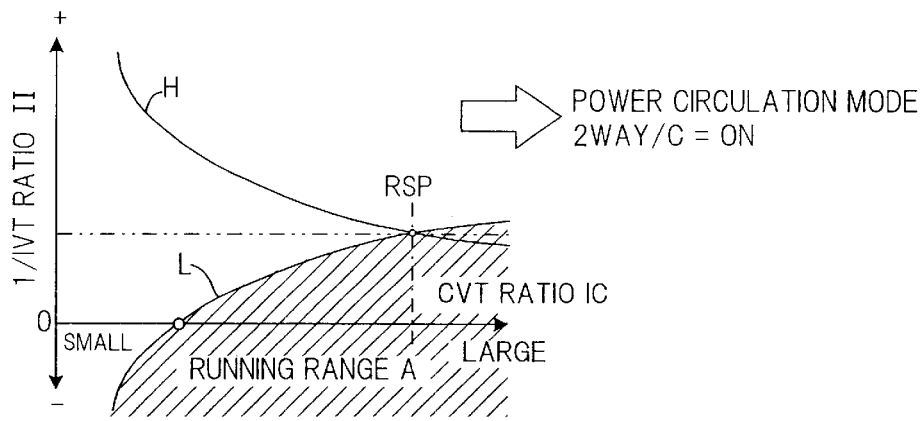
FIGS. 46A–C shows running regions according to the characteristic diagram of the inverse 1/II of the IVT ratio II and the CVT ratio IC.

When the operating point corresponding to the real speed ratio 1/rII and the real CVT ratio rIC is below the power recirculation mode line L, it is determined that the running region is A, as shown in FIG. 46A. In the case of this running region A, it is assumed that the power recirculation mode clutch 9 is engaged by excitation.

Figure 46B:
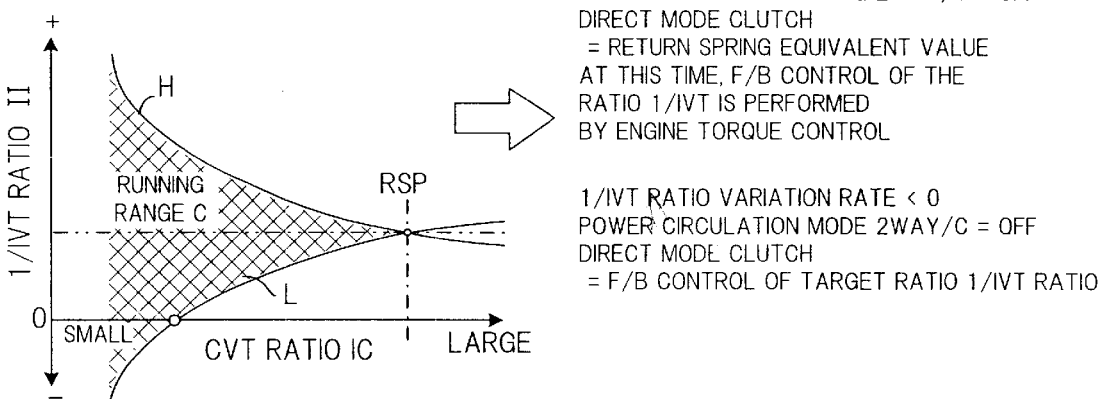

Next, when the operating point corresponding to the real speed ratio 1/rII and real CVT ratio rIC lies between the power recirculation mode line L and direct mode line H, it is determined that the running region is C, as shown in FIG. 46B.

In the case of this running region C, if the difference from the variation rate of the real speed ratio 1/rII=value on the immediately preceding occasion is larger than 0, the power recirculation mode clutch 9' is not energized, the engaging capacity of the direct mode clutch 10 is taken as a return spring equivalent value, and feedback control to the final target speed ratio 1/tII is performed by controlling the engine torque as described above.

Figure 46C:
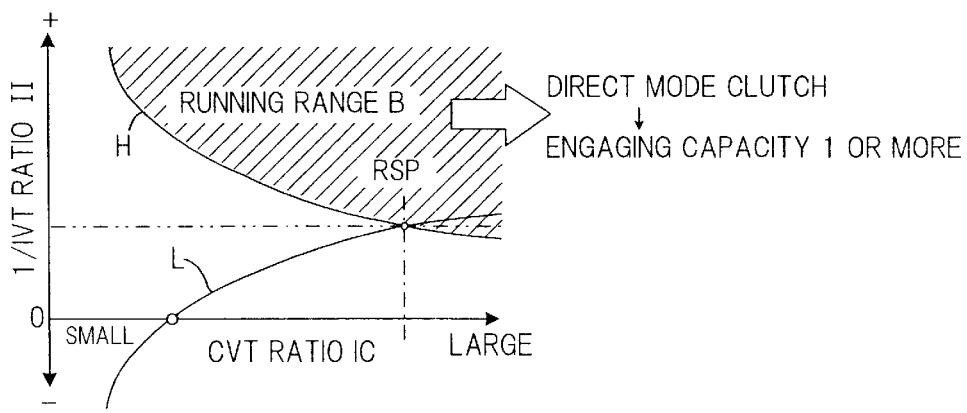

When the operating point corresponding to the real speed ratio 1/rII and real CVT ratio rIC lies above the direct mode line H, it is determined that the running region is B, as shown in FIG. 46C.

When it is determined than the running region is B, if the final target speed ratio 1/tII is the direct mode, the direct mode clutch 10 is fully engaged, the power recirculation mode clutch 9 is disengaged and there is a shift to the direct mode.

In this way, by presetting the running regions A–C, the excitation state of the electromagnetic two-way clutches and the engaging capacity of the oil pressure direct mode clutch 10' as maps or the like in addition to the power recirculation mode line L and direct mode line H, the engaging state of the clutches can easily be controlled according to the variation of running state.

Next, the action will be described when the direct mode clutch 10' is an oil pressure clutch, and the power recirculation mode clutch 9 is an electromagnetic two-way clutch.

Figure 47:
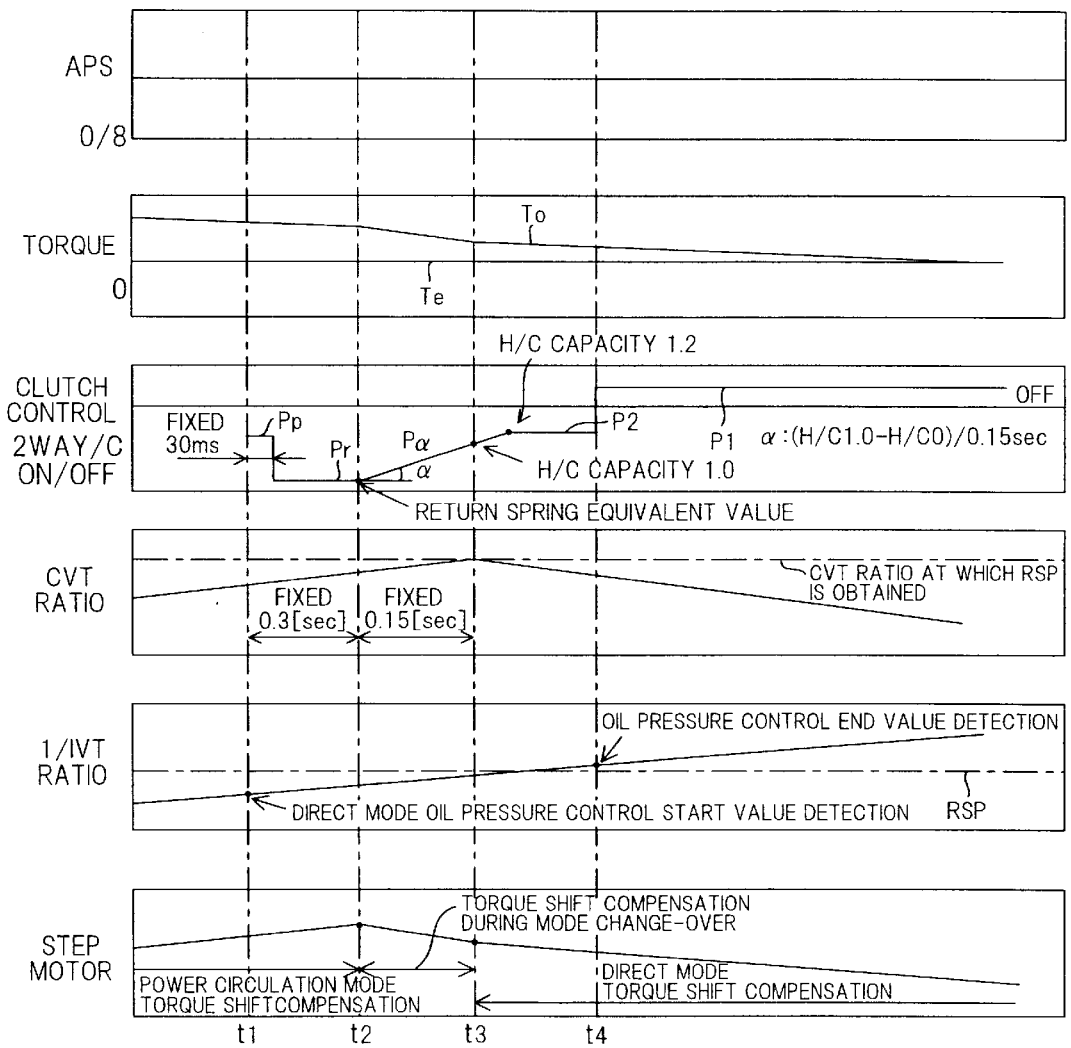
FIG. 47 is a graph during auto-up, showing a relation between the accelerator pedal depression amount APS, torque, clutch energizing state, CVT ratio, 1/IVT ratio, step number of the step motor and time.

FIG. 47 is an example of auto-up (power ON up-shift) where the vehicle accelerates with the accelerator pedal depression amount APS constant, and an up-shift is performed from the power recirculation mode to the direct mode.

At the time t1 in FIG. 47, when the real speed ratio 1/rII exceeds the preset speed ratio, after supplying the precharge pressure Pp to the direct mode clutch 10', a predetermined time is allowed to elapse when the pressure has decreased to the return spring equivalent pressure Pr.

At the time t2 when the predetermined time has elapsed, an oil pressure $P\alpha$ is gradually increased according to a predetermined ramp function $\alpha$. At the time t3 during this process, the real speed ratio 1/rII exceeds the speed ratio corresponding to the rotation synchronous point RSP, and at the time t4 after the oil pressure has reached the predetermined shelf pressure P2, as the vehicle enters the running region C, the oil pressure supplied to the direct mode clutch 10 is increased to the engaging oil pressure P1 so as to engage the direct mode clutch 10', and a change-over to the direct mode is performed. At this time, the power recirculation mode clutch 9 which is in the non-energized state changes over the running mode, and is automatically disengaged due to reversal of the torque transmission direction.

Hence, by using the oil pressure direct mode clutch 10', and auto-up speed change can be performed smoothly.

Figure 48:
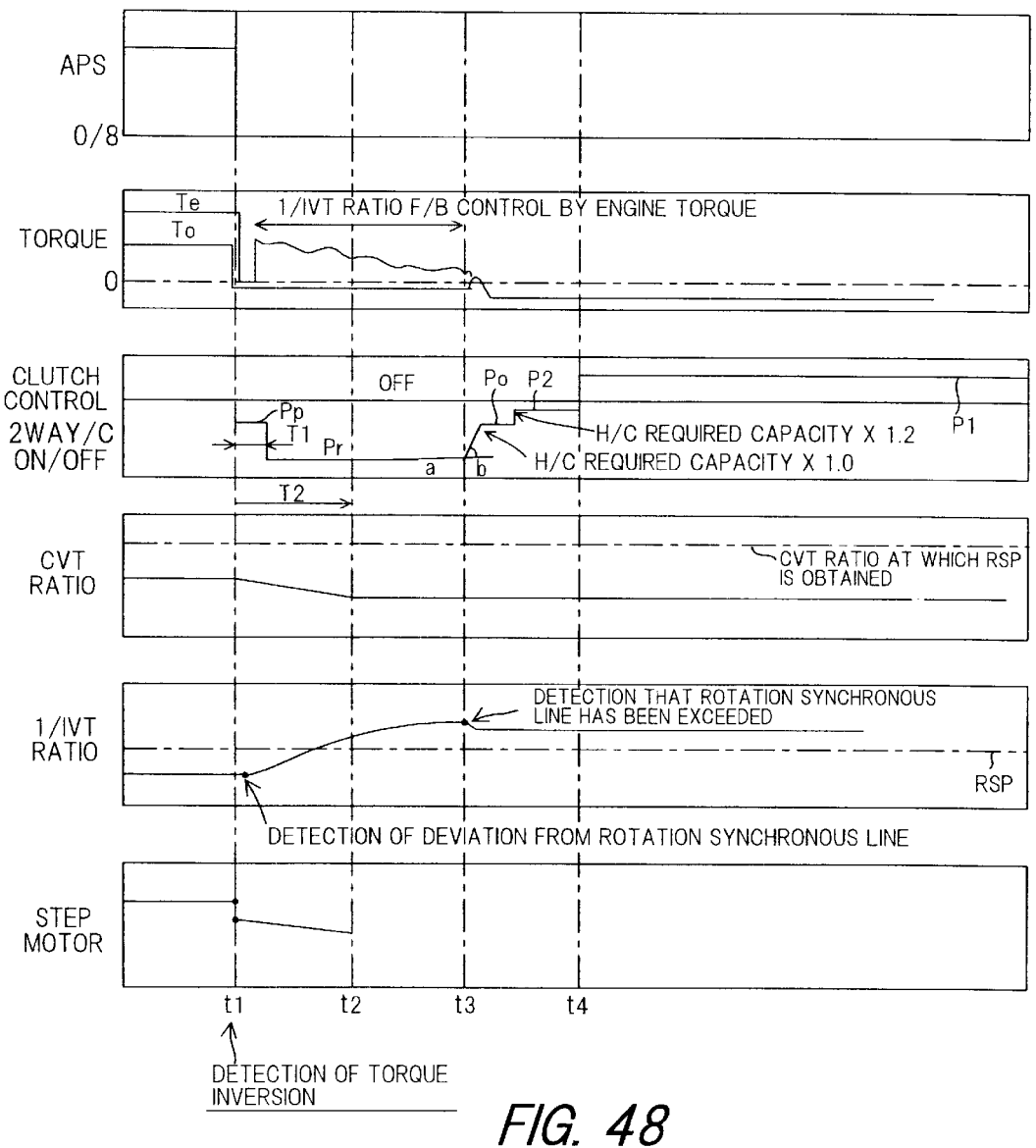
FIG. 48 is a graph during foot release up-shift, showing a relation between the accelerator pedal depression amount APS, torque, clutch energizing state, CVT ratio, 1/IVT ratio, step number of the step motor and time.

FIG. 48 shows an example where the accelerator pedal is released from the depressed state, and foot release up-shift (power OFF up-shift) occurs which performs an up-shift from the power recirculation mode to the direct mode.

At the time t1 in FIG. 48, the accelerator pedal is released from the depressed state in the power recirculation mode, and the final target speed ratio 1/tII is the direct mode.

At this time t1, the power recirculation mode clutch 9 is in the disengaged state as the torque transmission direction reverses from the drive side to the coasting side, and the vehicle enters the running region C in FIG. 46B.

Therefore, oil pressure control of the direct mode clutch 10' on the engaging side starts from the time t1.

First, at the time t1, the precharge pressure Pp is supplied to the direct mode clutch 10' for a predetermined time T1, and the system waits for the real speed ratio 1/rII to enter the running region B in FIG. 46C when pressure has decreased to the return spring equivalent pressure Pr.

During this interval, from the time t2 to the time t3, the oil pressure is gradually raised from the return spring equivalent pressure Pr at a predetermined gradient a.

On the other hand, when the pressure is the return spring equivalent pressure Pr during the time interval t1–t3, the real speed ratio 1/rII gradually shifts to the direct mode by controlling the engine torque as described above.

From the time t3 when the running region has reached the running region B in FIG. 46C, engine torque control is terminated. At the same time, after the supply oil pressure to the direct mode clutch 10' has been raised to an oil pressure P0 which gives the capacity required for engaging at a sharp gradient b, the pressure is increased to the shelf pressure P2 which gives a capacity equivalent to approximately 1.2 times the capacity required for engaging, and then increased to the engaging oil pressure P1 which is still larger at the time t4 so as to fully engage the direct mode clutch 10', and change over to the direct mode.

Figure 49:
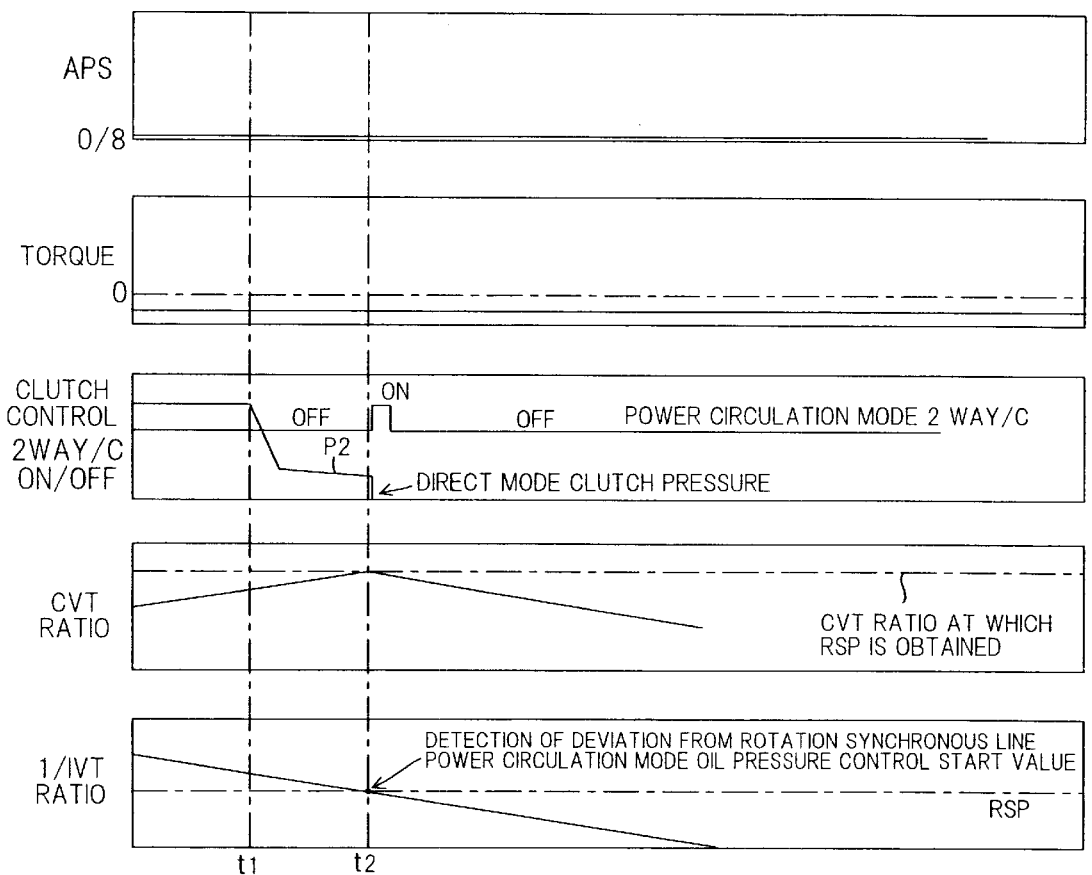
FIG. 49 is a graph during coast down, showing a relation between the accelerator pedal depression amount APS, torque, clutch energizing state, CVT ratio, 1/IVT ratio, step number of the step motor and time.

FIG. 49 shows an example of coast down (power OFF downshift) which performs a downshift from the direct mode to the power recirculation mode when the accelerator pedal remains released.

At a time t1 in FIG. 49, the real speed ratio 1/rII exceeds the preset speed ratio, and disengaging of the direct mode clutch 10 which was in the engaged state, is started.

First, from the time t1 the pressure is decreased to the shelf pressure P2, and the system waits until the running region determined by the real speed ratio 1/rII and the real CVT ratio rIC lies in the running region A in FIG. 46A.

At a time t2 when the system enters the running region A, the direct mode clutch 10' is disengaged, and the power recirculation mode clutch 9 is energized.

Immediately after excitation from the time t2, the running region determined by the real speed ratio 1/rII and the real CVT ratio rIC coincides with the power recirculation mode line L in FIG. 45A, so the power recirculation mode clutch 9 is not energized, and after temporarily energizing, torque transmission is performed in the non-energized state.

Figure 50:
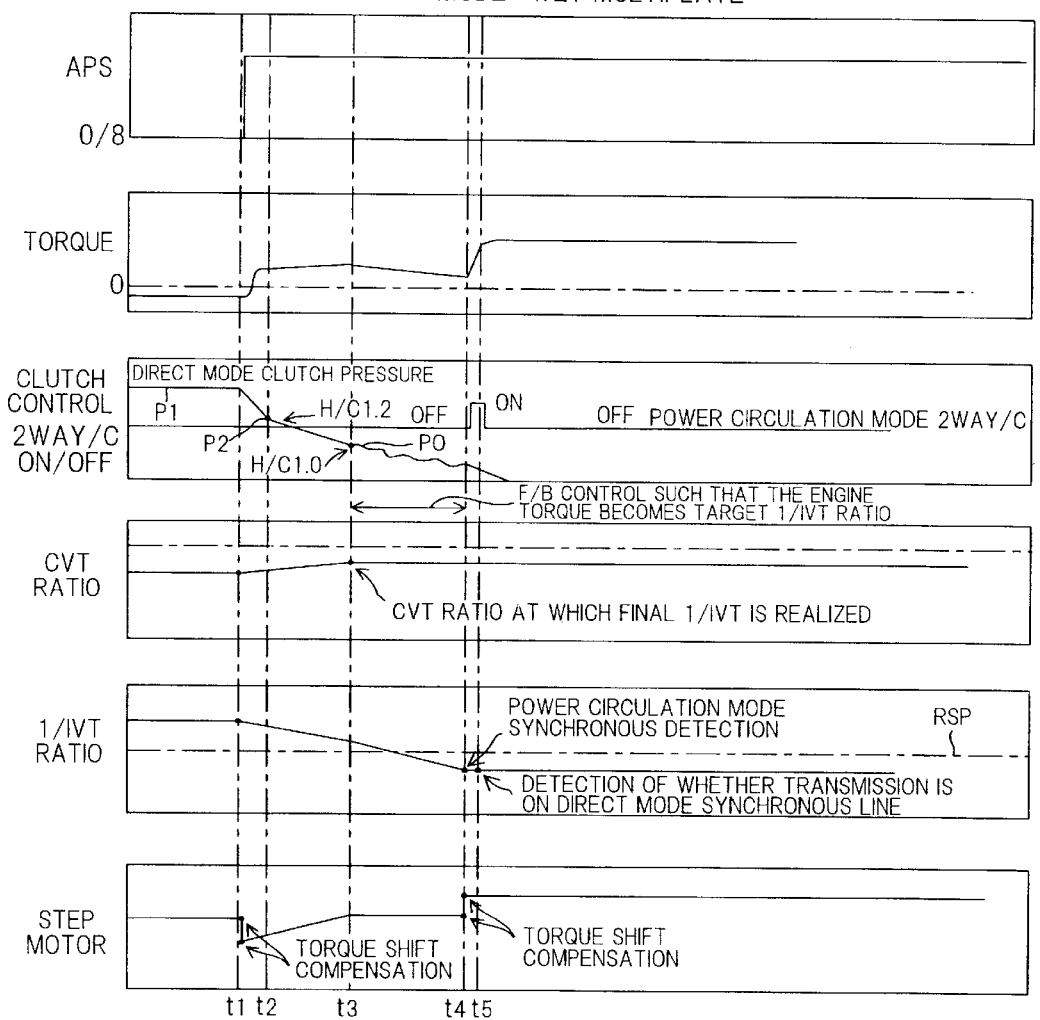
FIG. 50 is a graph during depression down, showing a relation between the accelerator pedal depression amount APS, torque, clutch energizing state, CVT ratio, 1/IVT ratio, step number of the step motor and time.

FIG. 50 is an example of a depression downshift (power ON downshift) which performs a downshift from the coasting state where the accelerator pedal is released in the direct mode, to the power recirculation mode where the accelerator pedal is depressed.

At a time t1 in FIG. 50, the accelerator pedal is depressed, the final target speed ratio 1/tII is set to the power recirculation mode, and as the real speed ratio 1/rII exceeds the preset speed ratio, disengagement of the direct mode clutch 10, which was in the engaged state, is started.

During the interval from the time t1 to a time t2, the oil pressure of the direct mode clutch 10 is decreased from P1 to the oil pressure P2 which is 1.2 times the capacity required for engaging, and the pressure is further gradually decreased from the oil pressure P2 to the oil pressure P0 equivalent to the capacity required for engaging.

From a time t3, the oil pressure of the direct mode clutch 10 is controlled, and the real speed ratio 1/rII is feedback controlled to the power recirculation mode.

At a time t4, when the operating point determined by the real speed ratio 1/rII and the real CVT ratio rIC enters the running region A in FIG. 46A, the power recirculation mode clutch 9 is energized and engaged, and the direct mode clutch 10 is disengaged as oil pressure control is terminated.

Further, as the running region coincides with the power recirculation mode line L at a time t5 immediately after the time t4, the power recirculation mode clutch 9 which was energized, is not energized, and torque transmission is subsequently performed in the non-energized state.

As described above, the power recirculation mode clutch 9 is an electromagnetic two-way clutch, and excitation/non-excitation of the electromagnetic two-way clutch is controlled by a map based on the CVT ratio-1/IVT ratio characteristics (power recirculation mode line L, direct mode line H) when the clutches are both fully engaged, so torque decrease around the end of speed change during a power on downshift can be prevented, and the quality of speed change is enhanced.

Further, when speed is decreased in the power recirculation mode, the engine is prevented from stalling simply by disengaging the power recirculation mode clutch 9 due to reversal of torque even when the brake is supplied suddenly.

Moreover, during a power OFF up-shift or power OFF downshift, the IVT ratio can be smoothly varied and quality of speed change enhanced by controlling the capacity of the direct mode clutch 10'.

The contents of Tokugan 2000-001510, with a filing date Jan. 7, 2000, Tokugan 2000-096518, with a filing date Mar. 31, 2000, Tokugan 2000-247397, with a filing date Aug. 17, 2000, Tokugan 2000-248252, with a filing date Aug. 18, 2000 and Tokugan 2000-287111, with a filing date Sep. 21, 2000 are hereby incorporated by reference.

The embodiments of this invention in which an exclusive property or privilege is claimed are defined as follows:

What is claimed is:

1. An infinite speed ratio continuously variable transmission, comprising:
    an unit input shaft;
    a continuously variable transmission which transmits a rotation of the unit input shaft to a first output shaft at an arbitrary speed ratio;
    a fixed speed ratio transmission which transmits the rotation of the unit input shaft to a second output shaft at a fixed speed ratio;
    a direct mode clutch;
    a power recirculation mode clutch, one of the direct clutch and the power recirculation mode clutch comprising an electromagnetic two-way clutch that, when energized, transmits a drive force in a first direction and in a second direction opposite to the first direction, and when changed from the energized state to the non-energized state, transmits the drive force only in the direction of a drive force transmission at the change-over to non-excitation, and when the direction of the drive force transmission changes to an opposite direction, disengages, wherein the first and second directions refer to directions of transmission of drive force between a drive side and a non drive side; and a planetary gear set comprising a first rotation element joined to the first output shaft via the direct mode clutch, a second rotation element joined to the second output shaft via the power recirculation mode clutch, and a third rotation element which varies a rotation direction and a rotation speed according to a difference between a rotation speed of the first rotation element and a rotation speed of the second rotation element.

2. The infinite speed ratio continuously variable transmission as defined in claim 1, wherein the power recirculation mode, clutch comprises the electromagnetic two-way clutch.

3. The infinite speed ratio continuously variable transmission as defined in claim 1, wherein the direct mode clutch comprises the electromagnetic two-way clutch.

4. The infinite speed ratio continuously variable transmission as defined in claim 1, wherein the electromagnetic two-way clutch comprises:

a cylindrical outer race;

plural rollers;

a polygonal inner race having flat surfaces corresponding to the plural rollers;

a retainer which supports the plural rollers on a circular orbit between the inner race and the outer race;

a frictional member attached to the outer race;

an electromagnetic coil; and an armature which transmits a rotation of the outer race to the retainer by contacting the frictional member from an axial direction according to excitation of the electromagnetic coil, and moves the retainer between a locking position which locks the relative rotation between the outer race and inner race by the rollers squeezed therebetween, and a non-locking position which allows a relative rotation between the outer race and the inner race.

5. The infinite speed ratio continuously variable transmission as defined in claim 4, wherein the electromagnetic coil is disposed outside the outer race coaxially therewith;

the frictional member having a frictional face which has disc shape extending in a radial direction from the outer race;

the frictional face being contacted by the armature to move the retainer according to excitation of the electromagnetic coil;

and wherein the infinite speed ratio continuously variable transmission further comprises:

a magnetic body and a magnetically shielding member, the magnetic body being disposed to contact with an outer circumference of the electromagnetic coil via the magnetically shielding member and transmitting an electromagnetic force of the electromagnetic coil to the armature.

6. The infinite speed ratio continuously variable transmission as defined in claim 2, wherein the infinite speed ratio continuously variable transmission further comprises:

a select lever which selects a travel range and a stationary range;

a sensor which detects a position of the select lever; and a speed change control unit which controls the direct mode clutch, power recirculation mode clutch and a transmission torque of the continuously variable transmission, wherein the speed change control unit is programmed to temporarily reverse a direction of the transmission torque of the continuously variable transmission when the select lever is changed over from the travel range to the stationary range in a state where the vehicle is stationary.

7. The infinite speed ratio continuously variable transmission as defined in claim 6, wherein the infinite speed ratio continuously variable transmission further comprises:

an oil pressure cylinder which varies the transmission torque according to an oil pressure, and wherein, the speed change control unit is further programmed to temporarily reverse the direction of the transmission torque of the continuously variable transmission by control of the oil pressure of the oil pressure cylinder.

8. The infinite speed ratio continuously variable transmission as defined in claim 4, wherein the power recirculation mode clutch comprises the electromagnetic two-way clutch, the infinite speed ratio continuously variable transmission further comprises:

a sensor which detects a rotation speed of the second output shaft;

a sensor which detects a rotation speed of the second rotation element; and a speed change control unit being programmed to temporarily energize the electromagnetic coil to move the retainer from the non-locking position to the locking position when the rotation speed of the second output shaft has become faster than the rotation speed of the second rotation element.

9. The infinite speed ratio continuously variable transmission as defined in claim 8, wherein the infinite speed ratio continuously variable transmission further comprises:

a select lever which detects a forward running range and a reverse running range; and a sensor which detects a position of the select lever, wherein the speed change control unit is further programmed to temporarily energize the electromagnetic coil to move the retainer from the non-locking position to the locking position when the rotation speed of the second output shaft has become faster than the rotation speed of the second rotation element in a state where the select lever is in the forward running range, and to temporarily de-energize the electromagnetic coil to move the retainer from the locking position to the non-locking position when the rotation speed of the second rotation element has become faster than the rotation speed of the second output shaft in the state where the select lever is in the reverse running range.

10. The infinite speed ratio continuously variable transmission as defined in claim 4, wherein the power recirculation mode clutch comprises the electromagnetic two-way clutch, and wherein the infinite speed ratio continuously variable transmission further comprises:

a sensor which detects a rotation speed of the second output shaft;

a sensor which detects a rotation.speed of the second rotation element;

a select lever which selects a forward running range and reverse running range;

a sensor which detects a position of the select lever; and a speed change control unit programmed to temporarily energize the electromagnetic coil to move the retainer from the non-locking position to the locking position when a condition has changed from N1<= N2−α to N1>N2−α in the state where the select lever is in the forward running range, and to temporarily energize the electromagnetic coil to move the retainer from the non-locking position to the locking position when a condition has changed from N1>= N2+α to N1<N2+α in the state where the select lever is in the reverse running range, wherein N1 is the rotation speed of the second output shaft, N2 is rotation speed of the second rotation element, and α is the permitted rotation speed.

11. The infinite speed ratio continuously variable transmission as defined in claim 2, wherein the infinite speed ratio continuously variable transmission further comprises:

a sensor which detects a rotation speed of the unit input shaft;

a sensor which detects a rotation speed of a third rotation element;

a sensor which detects a rotation speed of the first output shaft; and a speed change control unit which is programmed to energize the power recirculation mode clutch when an inverse of a first speed ratio that is equal to a ratio of the rotation speed of the unit input shaft and the rotation speed of the third rotation element has become smaller than an inverse of a second speed ratio in the state where the power recirculation mode clutch is engaged and the direct mode clutch is disengaged, the second speed ratio being equal to a ratio of the rotation speed of the unit input shaft and the rotation speed of the first output shaft.

12. The infinite speed ratio continuously variable transmission as defined in claim 3, wherein the infinite speed ratio continuously variable transmission further comprises:

a sensor which detects a rotation speed of the unit input shaft;

a sensor which detects a rotation speed of a third rotation element;

a sensor which detects a rotation speed of the first output shaft; and a speed change control unit which is programmed to energize the power recirculation mode clutch when an inverse of a first speed ratio that is equal to a ratio of the rotation speed of the unit input shaft and the rotation speed of the third rotation element has become bigger than an inverse of a second speed ratio in the state where the direct mode clutch is engaged and the power recirculation mode clutch is disengaged, the second speed ratio being equal to a ratio of the rotation speed of the unit input shaft and the rotation speed of the first output shaft.

13. The infinite speed ratio continuously variable transmission as defined in claim 2, wherein the infinite speed ratio continuously variable transmission further comprises:

a sensor which detects a rotation speed of the unit input shaft;

a sensor which detects a rotation speed of a third rotation element;

a sensor which detects a rotation speed of the first output shaft; and a speed change control unit which is programmed to stop energizing the power recirculation mode clutch when an inverse of a first speed ratio that is equal to a ratio of the rotation speed of the unit input shaft and the rotation speed of the third rotation element has become bigger than an inverse of a second speed ratio in the state where the power recirculation mode clutch is engaged and the direct mode clutch is disengaged, the second speed ratio being equal to a ratio of the rotation speed of the unit input shaft and the rotation speed of the first output shaft, and when the inverse of the first speed ratio has become smaller than an inverse of the second speed ratio in the state where the direct mode clutch is engaged and the power recirculation mode clutch is disengaged.

14. The infinite speed ratio continuously variable transmission as defined in claim 2, wherein the infinite speed ratio continuously variable transmission further comprises:

a sensor which detects a rotation speed of the unit input shaft;

a sensor which detects a rotation speed of a third rotation element;

a sensor which detects a rotation speed of the first output shaft; and a speed change control unit which is programmed to not energize the power recirculation mode clutch when an inverse of a first speed ratio that is defined as a ratio of the rotation speed of the unit input shaft and the rotation speed of the third rotation element has become bigger than an inverse of a second speed ratio in the state where the power recirculation mode clutch is engaged and the direct mode clutch is disengaged, the second speed ratio being equal to a ratio of the rotation speed of the unit input shaft and the rotation speed of the first output shaft, and when the inverse of the first speed ratio has become smaller than the inverse of the second speed ratio in the state where the direct mode clutch is engaged and the power recirculation mode clutch is disengaged.

15. The infinite speed ratio continuously variable transmission as defined in claim 3, wherein the infinite speed ratio continuously variable transmission further comprises:

a sensor which detects a rotation speed of the unit input shaft;

a sensor which detects a rotation speed of a third rotation element;

a sensor which detects a rotation speed of the first output shaft; and a speed change control unit which is programmed to stop energizing the direct mode clutch when an inverse of a first speed ratio that is equal to a ratio of the rotation speed of the unit input shaft and the rotation speed of the third rotation element has become bigger than an inverse of a second speed ratio in the state where the power recirculation mode clutch is engaged and the direct mode clutch is disengaged, the second speed ratio being equal to a ratio of the rotation speed of the unit input shaft and the rotation speed of the first output shaft, and when the inverse of the first speed ratio has become smaller than an inverse of the second speed ratio in the state where the direct mode clutch is engaged and the power recirculation mode clutch is disengaged.

16. The infinite speed ratio continuously variable transmission as defined in claim 3, wherein the infinite speed ratio continuously variable transmission further comprises:

a sensor which detects a rotation speed of the unit input shaft;

a sensor which detects a rotation speed of a third rotation element;

a sensor which detects a rotation speed of the first output shaft; and a speed change control unit which is programmed to not energize the direct mode clutch when an inverse of a first speed ratio that is defined by a ratio of the rotation speed of the unit input shaft and the rotation speed of the third rotation element has become bigger than an inverse of a second speed ratio in the state where the power recirculation mode clutch is engaged and the direct mode clutch is disengaged, the second speed ratio being equal to a ratio of the rotation speed of the unit input shaft and the rotation speed of the first output shaft, and when the inverse of first speed ratio has become smaller than an inverse of the second speed ratio in the state where the:direct mode clutch is engaged and the power recirculation mode clutch is disengaged.

* * * * *